US012739382B2

(12) United States Patent
Ma et al.

(10) Patent No.: US 12,739,382 B2
(45) Date of Patent: Sep. 15, 2026

(54) VIDEO PICTURE ENCODING AND DECODING METHOD AND RELATED DEVICE

(71) Applicant: HUAWEI TECHNOLOGIES CO., LTD., Shenzhen (CN)

(72) Inventors: Xiang Ma, Moscow (RU); Jue Mao, Hangzhou (CN); Haitao Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 264 days.

(21) Appl. No.: 18/368,683

(22) Filed: Sep. 15, 2023

(65) Prior Publication Data

US 2024/0007637 A1 Jan. 4, 2024

Related U.S. Application Data

(63) Continuation of application No. PCT/CN2022/080900, filed on Mar. 15, 2022.

(30) Foreign Application Priority Data

Mar. 17, 2021 (CN) ......................... 202110289642.8

(51) Int. Cl.

| | |
|---|---|
| ***H04N 19/13*** | (2014.01) |
| ***H04N 19/132*** | (2014.01) |
| ***H04N 19/172*** | (2014.01) |
| ***H04N 19/91*** | (2014.01) |

(52) U.S. Cl.

CPC ........... *H04N 19/13* (2014.11); *H04N 19/132* (2014.11); *H04N 19/172* (2014.11); *H04N 19/91* (2014.11)

(58) Field of Classification Search

CPC ...... H04N 19/13; H04N 19/61; H04N 19/176; H04N 19/91; H04N 19/124; H04N 19/157;

(Continued)

(56) References Cited

U.S. PATENT DOCUMENTS

| | | | | |
|---|---|---|---|---|
| 2021/0014531 A1* | 1/2021 | Pfaff | .................... | H04N 19/176 |
| 2022/0014735 A1* | 1/2022 | Chen | .................... | H04N 19/105 |

FOREIGN PATENT DOCUMENTS

| | | |
|---|---|---|
| CN | 111432211 A | 7/2020 |
| CN | 111464815 A | 7/2020 |
| EP | 3562162 A1 | 10/2019 |

OTHER PUBLICATIONS

David Minnen et al:"Joint Autoregressive and Hierarchical Priors for Learned Image Compression", arXiv:1809.02736v1 [cs.CV] Sep. 8, 2018, total 22 pages.

(Continued)

*Primary Examiner* — Masum Billah
(74) *Attorney, Agent, or Firm* — WOMBLE BOND DICKINSON (US) LLP

(57) ABSTRACT

This application relates to the field of artificial intelligence (AI)-based video or picture compression technologies. The decoding method includes: performing probability estimation on input data by using a neural network, to obtain probability distribution of residual values of a plurality of samples and included in a residual of a current picture, where the input data includes at least a residual of a reference picture, and the reference picture is a decoded picture obtained before the current picture is decoded; performing arithmetic entropy decoding on a bitstream based on the probability distribution of the residual values of the plurality of samples and included in the residual of the current picture, to obtain first entropy decoding data, where the first entropy decoding data represents the residual of the (Continued)

current picture; and obtaining a reconstructed sample value of the current picture based on the residual of the current picture.

27 Claims, 22 Drawing Sheets

(58) Field of Classification Search
CPC ...... H04N 19/18; H04N 19/44; H04N 19/122; H04N 19/625
USPC .......................................................... 375/240
See application file for complete search history.

(56) References Cited

OTHER PUBLICATIONS

Zongyu Guo et al:"3-D Context Entropy Model for Improved Practical Image Compression", Apr. 2020, total 4 pages.
David Minnen et al:"Image-Dependent Local Entropy Models for Learned Image Compression", arXiv:1805.12295v1 [cs.CV] May 31, 2018, total 5 pages.
David Minnen et al:"Variational Image Compression With a Scale Hyperprior", arXiv:1802.01436v2 [eess.IV] May 1, 2018, total 23 pages.
Amirhossein Habibian et al:"Video Compression With Rate-Distortion Autoencoders", arXiv:1908.05717v2 [eess.IV] Nov. 13, 2019, total 14 pages.

* cited by examiner

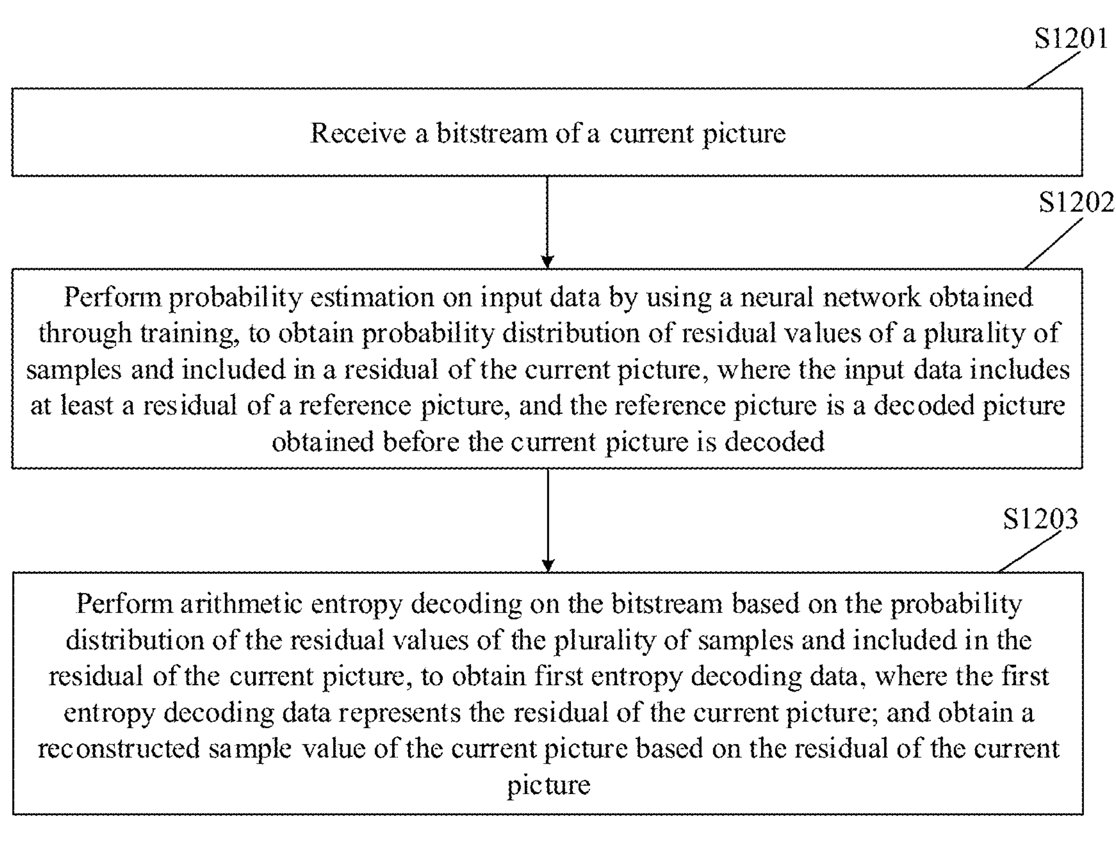

Extract feature information of input data by using a convolutional network

S1202a

Perform, based on an average pooling layer and a Softmax layer, probability estimation on the feature information extracted by the convolutional network, and output probability distribution of residual values of a plurality of samples and included in a residual of a current picture

FIG. 12A

Original residual of a current picture
X
Transformation
Quantization
Y'
Arithmetic encoder
Bitstream
Neural network for probability estimation
Arithmetic decoder
Input data
Reconstructed residual of the current picture
X'
Inverse transformation
Inverse quantization

VIDEO PICTURE ENCODING AND DECODING METHOD AND RELATED DEVICE

CROSS-REFERENCE TO RELATED APPLICATIONS

This application is a continuation of International Application No. PCT/CN2022/080900, filed on Mar. 15, 2022, which claims priority to Chinese Patent Application No. 202110289642.8, filed on Mar. 17, 2021. The disclosures of the aforementioned applications are hereby incorporated by reference in their entireties.

TECHNICAL FIELD

This application relates to the field of video encoding and decoding, and in particular, to a video picture encoding and decoding method and a related device.

BACKGROUND

Video coding (video encoding and decoding) is used in a wide range of digital video applications, for example, digital video broadcasting, video transmission over internet and mobile networks, live session applications such as video chatting and video conferencing, DVD and Blu-ray discs, video content acquisition and editing systems, and camcorders of security applications.

A large amount of video data needs to be described even for a relatively short video, which may result in difficulties when the data is to be sent or otherwise transmitted over a network with a limited bandwidth capacity. Thus, video data is generally compressed before being transmitted over modern telecommunication networks. A size of a video may also be an issue when the video is stored on a storage device because memory resources may be limited. Video compression devices often use software and/or hardware on a signal source side to encode the video data prior to transmission or storage, thereby decreasing an amount of data needed to represent digital video pictures. Compressed data is then received on a destination side by a video decompression device. With limited network resources and ever increasing demands of higher video quality, improved compression and decompression techniques that can improve compression ratio with little sacrifice in picture quality are desirable.

In recent years, applying deep learning to the field of picture and video encoding and decoding gradually becomes a trend. A deep neural network can provide a powerful non-linear processing capability. Currently, in main neural network-based picture or residual encoding methods, a neural network (for example, AutoEncoder) is usually used to transform a picture into a feature domain, and then quantization and entropy encoding (for example, arithmetic entropy encoding) are performed on a feature value in the feature domain. A decoder side performs entropy decoding and inverse quantization on a received bitstream to obtain a value in the feature domain, and then the value is restored by using a decoder network to obtain a reconstructed picture.

SUMMARY

Embodiments of this application provide a video picture encoding and decoding method and a related device, to improve encoding and decoding efficiency and precision.

The foregoing and other objectives are achieved by the subject matter of the independent claims. Further implementations are apparent from the dependent claims, the description of embodiments, and the accompanying drawings.

Particular embodiments are outlined in the attached independent claims, with other embodiments in the dependent claims.

According to a first aspect, this application relates to a video picture decoding method. The method is performed by a decoding apparatus, and the method includes:

receiving a bitstream of a current picture; performing probability estimation on input data by using a neural network (which may also be referred to as a probability estimation network) obtained through training, to obtain probability distribution of residual values of a plurality of samples and included in a residual of the current picture, where the input data includes at least a residual of a reference picture, and the reference picture is a decoded picture obtained before the current picture is decoded; performing arithmetic entropy decoding on the bitstream based on the probability distribution of the residual values of the plurality of samples and included in the residual of the current picture, to obtain first entropy decoding data, where the first entropy decoding data represents the residual of the current picture; and obtaining a reconstructed sample value of the current picture based on the residual of the current picture.

The operation of "receiving a bitstream of a current picture" and the operation of "performing probability estimation on input data by using a neural network, to obtain probability distribution of residual values of a plurality of samples and included in a residual of the current picture" are not subject to a specific sequence. Either operation may be performed first, or the two operations may be simultaneously performed.

The reference picture includes a plurality of samples. On a decoder side, the residual of the reference picture is a plurality of differences between reconstructed values of the plurality of samples included in the reference picture and predicted values of the plurality of samples. The current picture includes a plurality of samples, and the residual of the current picture is a plurality of differences between reconstructed values of the plurality of samples included in the current picture and predicted values of the plurality of samples. In other words, both the residual of the current picture and the residual of the reference picture on the decoder side are reconstructed residuals.

The first entropy decoding data is partial entropy decoding data obtained by decoding a bitstream, and the first entropy decoding data is used to represent the residual of the current picture. It should be understood that other entropy decoding data may be further obtained by decoding the bitstream. This is not limited herein.

When the bitstream is decoded, the reference picture is first obtained by decoding, and then the current picture is obtained by decoding. For example, in a bitstream decoding process, a picture 1 is first obtained by decoding, and then a picture 2 is obtained by decoding. The picture 1 is a reference picture of the picture 2.

In one embodiment, the reference picture and the current picture may be consecutive frames, or may be nonconsecutive frames. For example, the reference picture is an $(n-1)^{th}$ picture frame, and the current picture is an $n^{th}$ picture frame; or the reference picture is an $(n-2)^{th}$ picture frame, and the current picture is an $n^{th}$ picture frame. When the reference picture and the current picture are nonconsecutive frames, a difference between a timestamp of the current picture and a timestamp of the reference picture is less than a preset threshold, so as to ensure that there is a correlation between the residual of the reference picture and the residual of the current picture.

The probability estimation is performed, by using the neural network obtained through training, on the residual values of the plurality of samples and included in the residual of the reference picture, to obtain the probability distribution of the residual values of the plurality of samples and included in the residual of the current picture, and the correlation between the residual of the current picture and the residual of the reference picture is fully mined by using a computing capability of the neural network, so that high-precision probability distribution of the residual values of the plurality of samples and included in the residual of the current picture can be obtained. Further, when the arithmetic entropy decoding is performed on the bitstream by using the probability distribution of the residual values of the plurality of samples and included in the residual of the current picture, decoding efficiency and decoding precision can be improved.

In one embodiment, the neural network is a neural network obtained through training in the following process, and the method in this embodiment further includes: obtaining the input data for the training, where the input data for the training includes a decoded picture obtained before a sample picture is decoded, and the sample picture is a known decoded picture; performing, by using the neural network, probability estimation on the input data for the training, to obtain estimated probability distribution of residual values of a plurality of samples and included in a residual of the sample picture; obtaining a loss value based on known probability distribution of the residual values of the plurality of samples and included in the residual of the sample picture and the estimated probability distribution; and when the loss value converges to a first threshold, or a current quantity of training times of the neural network is greater than or equal to a second threshold, determining that a current neural network is a corresponding neural network obtained after the training of the neural network is completed.

In one embodiment, the input data for the training includes:

- residual values of a plurality of samples and included in a residual of a first reference picture;
- residual values of a plurality of samples and included in a residual of the first reference picture and residual values of a plurality of samples and included in a residual of a second reference picture;
- predicted values of a plurality of samples and included in a prediction of the sample picture, residual values of a plurality of samples and included in a residual of the first reference picture, and predicted values of a plurality of samples and included in a prediction of the first reference picture; or
- predicted values of a plurality of samples and included in a prediction of the sample picture, residual values of a plurality of samples and included in a residual of the first reference picture, predicted values of a plurality of samples and included in a prediction of the first reference picture, predicted values of a plurality of samples and included in a prediction of a second reference picture, and residual values of a plurality of samples and included in a residual of the second reference picture, where
- the first reference picture and the second reference picture are decoded pictures obtained before the sample picture is decoded.

During the training of the neural network, data such as residuals of a plurality of reference pictures (for example, the first reference picture and the second reference picture) is used as training samples, so that the neural network obtained through the training can estimate more accurate probability distribution. When decoding is performed by using the probability distribution, decoding efficiency and decoding precision are improved.

In one embodiment, the neural network may be trained online or offline. When the neural network is trained in an online manner, the decoding apparatus can obtain a high-precision neural network in a timely manner, to obtain a high-precision probability distribution. Further, decoding efficiency and decoding precision can be improved when arithmetic entropy decoding is performed on the bitstream by using the high-precision probability distribution.

In one embodiment, the probability distribution represents probability distribution of a plurality of differences between reconstructed values of the plurality of samples and included in the residual of the current picture and predicted values of the plurality of samples, or represents probability distribution of residual values of all samples in a plurality of samples of the current picture, or represents the probability distribution of the residual values of the plurality of samples of the current picture.

In one embodiment, the first entropy decoding data includes the residual of the current picture, or a feature map of the residual of the current picture, or a transformed and quantized residual of the current picture.

In one embodiment, the first entropy decoding data is the feature map of the residual of the current picture, and the decoding method in this application further includes:

- obtaining the residual of the current picture based on the feature map of the residual of the current picture by using a decoder network. The residual of the current picture is transformed into a feature domain, the feature map of the residual of the current picture is first obtained by decoding, and then the residual of the current picture is obtained based on the feature map of the residual of the current picture by using the decoder network, so as to improve decoding efficiency.

In one embodiment, the first entropy decoding data is the transformed and quantized residual of the current picture, and the decoding method in this application further includes:

- performing inverse quantization and inverse transformation on the transformed and quantized residual of the current picture, and then obtain the residual of the current picture.

A possible inverse transformation method is inverse discrete cosine transform (DCT). In addition, inverse discrete sine transform (DST), inverse discrete wavelet transform (DWT), or the like may be further performed.

In one embodiment, the input data further includes hyper prior information. The hyper prior information is used to represent a deeper feature of the residual of the current picture, and may be obtained by performing feature extraction on the feature map of the residual of the current picture by using a convolutional neural network. The neural network includes a convolutional network, an average pooling layer, a first convolutional layer, a concatenate layer, and a normalized exponential function (Softmax) layer, and the convolutional network includes a plurality of convolutional layers and an activation (ReLU) layer. The performing probability estimation on input data by using a neural network, to obtain probability distribution of residual values of a plurality of samples and included in a residual of the current picture includes:

extracting, by using the convolutional network, feature information from the residual of the reference picture and the hyper prior information; and performing, by using the average pooling layer, the first convolutional layer, the concatenate layer, and the Softmax layer, probability estimation on the feature information extracted by the convolutional network, and outputting the probability distribution of the residual values of the plurality of samples and included in the residual of the current picture.

When the foregoing probability distribution is estimated by using the neural network, because the hyper prior information is introduced, to comprehensively extract a feature from the hyper prior information and other information (for example, the residual of the reference picture), the first convolutional layer and the concatenate layer are introduced, and the feature information of the residual of the reference picture and the hyper prior information is extracted by using the convolutional network, and then probability estimation is performed on the extracted feature information by using the average pooling layer, the first convolutional layer, the concatenate layer, and the Softmax layer, so that more accurate probability distribution can be obtained. When arithmetic entropy decoding is performed on the bitstream by using the probability distribution, decoding efficiency and decoding precision are improved.

In one embodiment, the input data further includes a prediction of the reference picture and a prediction of the current picture. The neural network includes a convolutional network, an average pooling layer, and a Softmax layer, and the convolutional network includes a plurality of convolutional layers and an activation ReLU layer. The performing probability estimation on input data by using a neural network, to obtain probability distribution of residual values of a plurality of samples and included in a residual of the current picture includes:

extracting, by using the convolutional network, feature information of the residual of the reference picture, the prediction of the reference picture, and the prediction of the current picture, performing, by using the average pooling layer and the Softmax layer, probability estimation on the feature information extracted by the convolutional network, and outputting the probability distribution of the residual values of the plurality of samples and included in the residual of the current picture.

When the foregoing probability distribution is estimated by using the neural network, the prediction of the reference picture and the prediction of the current picture are introduced. The feature information of the residual of the reference picture, the prediction of the reference picture, and the prediction of the current picture is extracted by using the convolutional network, and the probability estimation is performed on the foregoing extracted feature information by using the average pooling layer and the Softmax layer, so that more accurate probability distribution can be obtained. When arithmetic entropy decoding is performed on the bitstream by using the probability distribution, decoding efficiency and decoding precision are improved.

In one embodiment, the input data includes residuals of a plurality of reference pictures, and the plurality of reference pictures are a plurality of decoded pictures obtained before the current picture is decoded. The neural network includes a convolutional network, an average pooling layer, and a Softmax layer, and the convolutional network includes a plurality of convolutional layers and a ReLU layer.

The performing probability estimation on input data by using a neural network, to obtain probability distribution of residual values of a plurality of samples and included in a residual of the current picture includes:

extracting, by using the convolutional network, feature information of the residuals of the plurality of reference pictures, performing, by using the average pooling layer and the Softmax layer, probability estimation on the feature information extracted by the convolutional network, and outputting the probability distribution of the residual values of the plurality of samples and included in the residual of the current picture.

When the foregoing probability distribution is estimated by using the neural network, the residuals of the plurality of reference pictures are introduced. The feature information of the residuals of the plurality of reference pictures is extracted by using the convolutional network, and more accurate probability distribution can be obtained by performing probability estimation on the feature information by using the average pooling layer and the Softmax layer. When arithmetic entropy decoding is performed on the bitstream by using the probability distribution, decoding efficiency and decoding precision are improved.

In one embodiment, the input data includes residuals of a plurality of reference pictures, predictions of the plurality of reference pictures, and a prediction of the current picture, and the plurality of reference pictures are a plurality of decoded pictures obtained before the current picture is decoded. The neural network includes a convolutional network, an average pooling layer, and a Softmax layer, and the convolutional network includes a plurality of convolutional layers and a ReLU layer. The performing probability estimation on input data by using a neural network, to obtain probability distribution of residual values of a plurality of samples and included in a residual of the current picture includes:

extracting, by using the convolutional network, feature information of the residuals of the plurality of reference pictures, the predictions of the plurality of reference pictures, and the prediction of the current picture, performing, by using the average pooling layer and the Softmax layer, probability estimation on the feature information extracted by the convolutional network, and outputting the probability distribution of the residual values of the plurality of samples and included in the residual of the current picture.

When the foregoing probability distribution is estimated by using the neural network, the residuals and the predictions of the plurality of reference pictures and the prediction of the current picture are introduced. The feature information of the residuals of the plurality of reference pictures, the predictions of the plurality of reference pictures, and the prediction of the current picture is extracted by using the convolutional network, and the probability estimation is performed on the feature information by using the average pooling layer and the Softmax layer, so that more accurate probability distribution can be obtained. When arithmetic entropy decoding is performed on the bitstream by using the probability distribution, decoding efficiency and decoding precision are improved.

The prediction of the current picture is obtained by predicting the current picture by using a reconstructed sample value of the reference picture, or is obtained by performing upsampling on a reconstructed sample value of a low-resolution picture of the current picture, and resolution of a picture obtained through the sampling is the same as resolution of the current picture. The low-resolution picture of the current picture may be obtained by performing downsampling on the current picture.

Similarly, the prediction signal of the reference picture is obtained by predicting the reference picture by using a reconstructed sample value of the picture obtained before the reference is decoded, or is obtained by performing upsampling on a reconstructed sample value of a low-resolution picture of the reference picture, and resolution of a picture obtained by performing upsampling on a reconstructed picture of the low-resolution picture of the reference picture is the same as resolution of the reference picture. The low-resolution picture of the reference picture may be obtained by performing downsampling on the reference picture.

According to a second aspect, this application relates to a video picture encoding method. The method is performed by an encoding apparatus, and the method includes:

obtaining a residual of a current picture, where the current picture includes a plurality of samples, and the residual of the current picture is a plurality of differences between original values of the plurality of samples and predicted values of the plurality of samples; performing probability estimation on input data by using a neural network (which may also be referred to as a probability estimation network) obtained through training, to obtain probability distribution of residual values of the plurality of samples and included in the residual of the current picture, where the input data includes at least a residual of a reference picture, and the reference picture is an encoded picture obtained before the current picture is encoded; and performing arithmetic entropy encoding on first entropy encoding data based on the probability distribution of the residual values of the plurality of samples and included in the residual of the current picture, to obtain a bitstream of the current picture, where the first entropy encoding data represents the residual of the current picture.

There is no sequence for performing the operation of "obtaining a residual of a current picture" and the operation of "performing probability estimation on input data by using a neural network, to obtain probability distribution of a residual of the current picture". The former operation may be performed first, or the latter operation may be performed first, or the two operations may be simultaneously performed.

The reference picture includes a plurality of samples. On an encoder side, the residual of the reference picture is a plurality of differences between reconstructed values of the plurality of samples included in the reference picture and predicted values of the plurality of samples. In other words, the residual of the reference picture on the encoder side is a reconstructed residual. On the encoder side, the current picture includes a plurality of samples, and the residual of the current picture is the plurality of differences between the original values of the plurality of samples included in the current picture and the predicted values of the plurality of samples. In other words, the residual of the current picture on the encoder side is an original residual.

The prediction of the current picture includes the predicted values of the plurality of samples. In one embodiment, the prediction of the current picture may be obtained by predicting the current picture by using a reconstructed sample value of the reference picture, or may be obtained by performing upsampling on a reconstructed sample value of a low-resolution picture of the current picture, and resolution of the picture obtained through the sampling is the same as resolution of the current picture. The low-resolution picture of the current picture may be obtained by performing downsampling on the current picture.

The reference picture is an encoded picture obtained before the current picture is encoded, and means that encoding of the reference picture is completed before the current picture is encoded. For example, during encoding, a picture 1 is first encoded, and then a picture 2 is encoded. The picture 1 is a reference picture of the picture 2.

In one embodiment, the current picture and the reference picture may be consecutive frames, or may be nonconsecutive frames. When the reference picture and the current picture are nonconsecutive frames, a difference between a timestamp of the current picture and a timestamp of the reference picture is less than a preset threshold, so as to ensure that there is a correlation between the residual of the reference picture and the residual of the current picture.

The probability estimation is performed, by using the neural network obtained through training, on the residual values of the plurality of samples and included in the residual of the reference picture, to obtain the probability distribution of the residual values of the plurality of samples and included in the residual of the current picture, and the correlation between the residual of the current picture and the residual of the reference picture is fully mined by using a computing capability of the neural network, so that high-precision probability distribution of the residual values of the plurality of samples and included in the residual of the current picture can be obtained. Further, when the arithmetic entropy encoding is performed on the first entropy encoding data by using the probability distribution of the residual values of the plurality of samples and included in the residual of the current picture, encoding efficiency and encoding precision can be improved.

In one embodiment, the neural network is a neural network obtained through training, and the method in this implementation further includes:

obtaining the input data for the training, where the input data for the training includes an encoded picture obtained before a sample picture is encoded, and the sample picture is a known encoded picture; performing, by using the neural network, probability estimation on the input data for the training, to obtain estimated probability distribution of residual values of a plurality of samples and included in a residual of the sample picture; obtaining a loss value based on known probability distribution of the residual values of the plurality of samples and included in the residual of the sample picture and the estimated probability distribution; and when the loss value converges to a first threshold, or a current quantity of training times of the neural network is greater than or equal to a second threshold, determining that a current neural network is a corresponding neural network obtained after the training of the neural network is completed.

In one embodiment, the input data for the training includes:

residual values of a plurality of samples and included in a residual of a first reference picture;

residual values of a plurality of samples and included in a residual of the first reference picture and residual values of a plurality of samples and included in a residual of a second reference picture;

predicted values of a plurality of samples and included in a prediction of the sample picture, residual values of a plurality of samples and included in a residual of the first reference picture, and predicted values of a plurality of samples and included in a prediction of the first reference picture; or predicted values of a plurality of samples and included in a prediction of the sample picture, residual values of a plurality of samples and included in a residual of the first reference picture, predicted values of a plurality of samples and included in a prediction of the first reference picture, predicted values of a plurality of samples and included in a prediction of a second reference picture, and residual values of a plurality of samples and included in a residual of the second reference picture, where the first reference picture and the second reference picture are encoded pictures obtained before the sample picture is encoded.

During the training of the neural network, data such as residuals of a plurality of reference pictures (the first reference picture and the second reference picture) is used as training samples, so that the neural network obtained through the training can estimate more accurate probability distribution. When arithmetic entropy encoding is performed on the first entropy encoding data by using the probability distribution, encoding efficiency and encoding precision are improved.

In one embodiment, the neural network may be trained online or offline. When the neural network is trained in an online manner, the encoding apparatus can obtain a high-precision neural network in a timely manner, to obtain a high-precision probability distribution. Further, encoding efficiency and encoding precision can be improved when arithmetic entropy encoding is performed on the first entropy encoding data by using the probability distribution.

In one embodiment, the probability distribution represents probability distribution of a plurality of differences between original values of the plurality of samples and included in the residual of the current picture and predicted values of the plurality of samples, or represents probability distribution of residual values of all sample points in a plurality of samples of the current picture, or represents the probability distribution corresponding to the residual values of the plurality of samples of the current picture.

In one embodiment, the first entropy encoding data includes the residual of the current picture, or a feature map of the residual of the current picture, or a transformed and quantized residual of the current picture.

In one embodiment, the first entropy encoding data is the feature map of the residual of the current picture, and the encoding method in this application further includes: obtaining the feature map of the residual of the current picture from the residual of the current picture by using an encoder network. The residual of the current picture is transformed into a feature domain, so as to improve encoding efficiency.

It should be noted that the foregoing encoder network may be considered as a feature extraction network.

In one embodiment, the first entropy encoding data is the transformed and quantized residual of the current picture, and the encoding method in this application further includes: transforming and quantizing the residual of the current picture to obtain a transformed and quantized residual of the current picture.

A possible transformation method is DCT. In addition, DST, DWT, or the like may be further performed. A method such as uniform quantization or non-uniform quantization may be used for quantization.

In one embodiment, to improve encoding precision, the input data further includes hyper prior information. The hyper prior information is used to represent a deeper feature of the current picture, and may be obtained by performing feature extraction on the feature map of the residual of the current picture by using a convolutional neural network. The neural network includes a convolutional network, an average pooling layer, a first convolutional layer, a concatenate layer, and a normalized exponential function (Softmax) layer, and the convolutional network includes a plurality of convolutional layers and an activation (ReLU) layer. The performing probability estimation on input data by using a neural network, to obtain probability distribution of residual values of a plurality of samples and included in a residual of the current picture includes:

extracting, by using the convolutional network, feature information from the residual of the reference picture and the hyper prior information; and performing, by using the average pooling layer, the first convolutional layer, the concatenate layer, and the Softmax layer, probability estimation on the feature information extracted by the convolutional network, and outputting the probability distribution of the residual values of the plurality of samples and included in the residual of the current picture.

When the foregoing probability distribution is estimated by using the neural network, because the hyper prior information is introduced, to comprehensively extract a feature from the hyper prior information and other information (for example, the residual of the reference picture), the first convolutional layer and the concatenate layer are introduced. Then, the feature information of the residual of the reference picture and the hyper prior information is extracted by using the convolutional network, and then probability estimation is performed on the extracted feature information by using the average pooling layer, the first convolutional layer, the concatenate layer, and the Softmax layer, so that more accurate probability distribution can be obtained. When arithmetic entropy encoding is performed on the first entropy encoding data by using the probability distribution, encoding efficiency and encoding precision are improved.

In one embodiment, the input data further includes a prediction of the reference picture and a prediction of the current picture. The neural network includes a convolutional network, an average pooling layer, and a Softmax layer, and the convolutional network includes a plurality of convolutional layers and an activation ReLU layer. The performing probability estimation on input data by using a neural network, to obtain probability distribution of residual values of a plurality of samples and included in a residual of the current picture includes:

extracting, by using the convolutional network, feature information of the residual of the reference picture, the prediction of the reference picture, and the prediction of the current picture, performing, by using the average pooling layer and the Softmax layer, probability estimation on the feature information extracted by the convolutional network, and outputting the probability distribution of the residual values of the plurality of samples and included in the residual of the current picture.

When the foregoing probability distribution is estimated by using the neural network, the prediction of the reference picture and the prediction of the current picture are introduced. The feature information of the residual of the reference picture, the prediction of the reference picture, and the prediction of the current picture is extracted by using the convolutional network, and the probability estimation is performed on the foregoing extracted feature information by using the average pooling layer and the Softmax layer, so that more accurate probability distribution can be obtained. When arithmetic entropy encoding is performed on the first entropy encoding data by using the probability distribution, encoding efficiency and encoding precision are improved.

In one embodiment, the input data includes residuals of a plurality of reference pictures, and the plurality of reference pictures are a plurality of encoded pictures obtained before the current picture is encoded. The neural network includes a convolutional network, an average pooling layer, and a Softmax layer, and the convolutional network includes a plurality of convolutional layers and a ReLU layer.

The performing probability estimation on input data by using a neural network, to obtain probability distribution of residual values of a plurality of samples and included in a residual of the current picture includes:

When the foregoing probability distribution is estimated by using the neural network, the residuals of the plurality of reference pictures are introduced. The feature information of the residuals of the plurality of reference pictures is extracted by using the convolutional network, and more accurate probability distribution can be obtained by performing probability estimation on the feature information by using the average pooling layer and the Softmax layer. When arithmetic entropy encoding is performed on the first entropy encoding data by using the probability distribution, encoding efficiency and encoding precision are improved.

When the foregoing probability distribution is estimated by using the neural network, the residuals of the plurality of reference pictures are introduced, so that more accurate probability distribution can be estimated, to improve encoding efficiency and encoding precision.

In one embodiment, the input data includes residuals of a plurality of reference pictures, predictions of the plurality of reference pictures, and a prediction of the current picture, and the plurality of reference pictures are a plurality of encoded pictures obtained before the current picture is encoded. The neural network includes a convolutional network, an average pooling layer, and a Softmax layer, and the convolutional network includes a plurality of convolutional layers and a ReLU layer. The performing probability estimation on input data by using a neural network, to obtain probability distribution of residual values of a plurality of samples and included in a residual of the current picture includes:

extracting, by using the convolutional network, feature information of the residuals of the plurality of reference pictures, the predictions of the plurality of reference pictures, and the prediction of the current picture, performing, by using the average pooling layer and the Softmax layer, probability estimation on the feature information extracted by the convolutional network, and outputting the probability distribution of the residual values of the plurality of samples and included in the residual of the current picture.

When the foregoing probability distribution is estimated by using the neural network, the residuals and the predictions of the plurality of reference pictures and the prediction of the current picture are introduced. The feature information of the residuals of the plurality of reference pictures, the predictions of the plurality of reference pictures, and the prediction of the current picture is extracted by using the convolutional network, and the probability estimation is performed on the feature information by using the average pooling layer and the Softmax layer, so that more accurate probability distribution can be obtained. When arithmetic entropy encoding is performed on the first entropy encoding data by using the probability distribution, encoding efficiency and encoding precision are improved.

It should be noted herein that, in this application, except that a residual of a current picture to be encoded on the encoder side is obtained based on a difference between an original value and a predicted value of a sample of the picture, residuals at other locations of the encoder side and a residual on a decoder side are all reconstructed residuals.

In one embodiment, on the encoder side, the reconstructed residual of the reference picture may be obtained by decoding the bitstream of the reference picture. For a specific decoding process, refer to the decoding method in the first aspect. The reconstructed residual of the reference picture may alternatively be obtained in the following manner:

The residual of the reference picture is quantized to obtain a quantized residual of the reference picture; and then inverse quantization is performed on the quantized residual of the reference picture to obtain a reconstructed residual of the reference picture. In an encoding process, after a residual (denoted as R) of the reference picture is obtained, the residual of the reference picture is quantized to obtain a residual (denoted as R1) of the reference second picture, and then entropy encoding is performed on R1 to obtain a bitstream (denoted as R3). Because entropy encoding is lossless, inverse quantization may be directly performed on R1 to obtain a reconstructed residual of the reference picture. This reconstructed residual is the same as a result obtained by performing entropy decoding on R3 and then performing inverse quantization on a decoding result and is the same as the foregoing reconstructed residual of the reference picture.

According to a third aspect, this application relates to a video picture decoding apparatus. For beneficial effects, refer to descriptions of the first aspect. Details are not described herein again. The decoding apparatus has a function of implementing an action in the method example in the first aspect. The function may be implemented by hardware, or may be implemented by hardware by executing corresponding software. The hardware or the software includes one or more modules corresponding to the foregoing function.

According to a fourth aspect, this application relates to a video picture encoding apparatus. For beneficial effects, refer to descriptions of the second aspect. Details are not described herein again. The encoding apparatus has a function of implementing an action in the method example in the second aspect. The function may be implemented by hardware, or may be implemented by hardware by executing corresponding software. The hardware or the software includes one or more modules corresponding to the foregoing function.

The method according to the first aspect of this application may be performed by the apparatus according to the third aspect of this application. Other features and implementations of the method according to the first aspect of this application directly depend on functionalities and implementations of the apparatus according to the third aspect of this application.

The method according to the second aspect of this application may be performed by the apparatus according to the fourth aspect of this application. Other features and implementations of the method according to the second aspect of this application directly depend on functionalities and implementations of the apparatus according to the fourth aspect of this application.

According to a fifth aspect, this application relates to a video stream decoding apparatus, including a processor and a memory. The memory stores instructions, and the instructions cause the processor to perform the method according to the first aspect.

According to a sixth aspect, this application relates to a video stream encoding apparatus, including a processor and a memory. The memory stores instructions, and the instructions cause the processor to perform the method according to the second aspect.

According to a seventh aspect, a computer-readable storage medium having stored thereon instructions that when executed cause one or more processors to encode video data is provided. The instructions cause the one or more processors to perform the method according to the first or second aspect or any possible embodiment of the first or second aspect.

According to an eighth aspect, this application relates to a computer program product including program code, and the program code is used for performing the method according to the first or second aspect or any possible embodiment of the first or second aspect when the program code runs.

Details of one or more embodiments are set forth in the accompanying drawings and the description below. Other features, objects, and advantages are apparent from the description, the accompanying drawings, and the claims.

BRIEF DESCRIPTION OF DRAWINGS

To describe technical solutions in embodiments of this application or in the conventional technology more clearly, the following briefly describes accompanying drawings used for describing embodiments or the conventional technology. It is clear that the accompanying drawings in the following descriptions show merely some embodiments of this application, and a person of ordinary skill in the art may still derive other drawings from these accompanying drawings without creative efforts.

FIG. 12 is a flowchart of a process 1200 of a decoding method according to an embodiment of this application;

FIG. 12A is a flowchart of a probability distribution estimation process according to this application;

DESCRIPTION OF EMBODIMENTS

Figure 1:
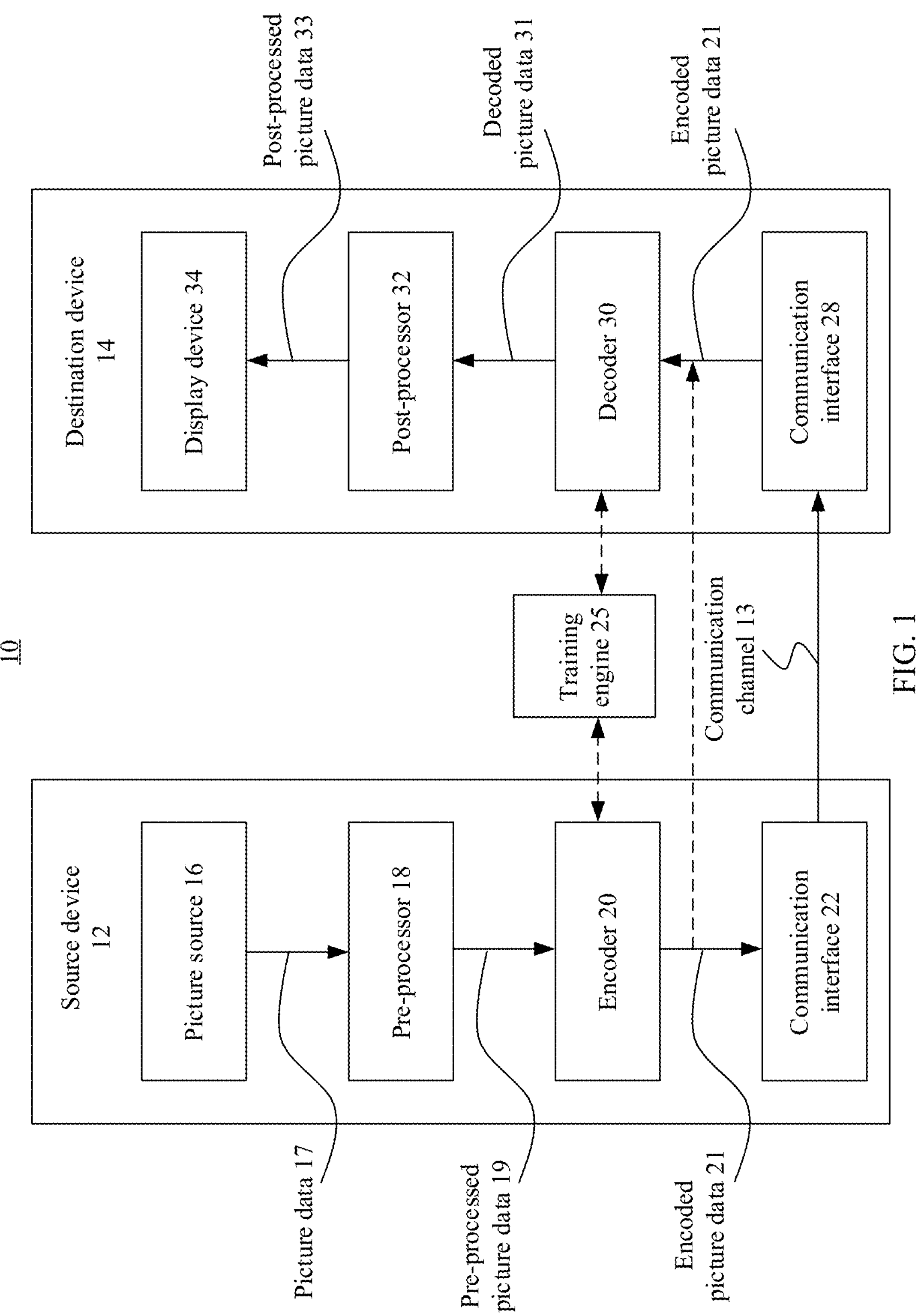
FIG. 1 is a block diagram of an example of a video decoding system configured to implement an embodiment of this application.

Embodiments of this application provide an AI-based video picture compression technology, and in particular, provide a neural network-based video compression technology, and specifically provide an entropy encoding and decoding technology of a video picture, to improve a conventional hybrid video encoding and decoding system.

Video coding typically refers to processing of a sequence of pictures, where the sequence of pictures forms a video or a video sequence. In the field of video coding, terms "picture", "frame", and "image" may be used as synonyms. Video coding (or coding in general) includes two parts: video encoding and video decoding. Video encoding is performed on a source side, and usually includes processing (for example, by compressing) an original video picture to reduce an amount of data required for representing the video picture (for more efficient storage and/or transmission). Video decoding is performed on a destination side, and usually includes inverse processing in comparison with processing of an encoder to reconstruct the video picture. "Encoding" of a video picture (or usually referred to as a picture) in embodiments should be understood as "encoding" or "decoding" of a video picture or a video sequence. A combination of an encoding part and a decoding part is also referred to as coding and decoding (CODEC).

In case of lossless video coding, an original video picture can be reconstructed, to be specific, a reconstructed video picture has the same quality as the original video picture (if it is assumed that no transmission loss or other data loss during storage or transmission). In case of lossy video coding, further compression, for example, by quantization, is performed, to reduce an amount of data representing a video picture. A video picture cannot be completely reconstructed on a decoder side, to be specific, quality of the reconstructed video picture is lower or worse than quality of the original video picture.

Because embodiments of this application relate to massive application of a neural network, for ease of understanding, the following first describes terms and concepts related to the neural network that may be used in embodiments of this application.

(1) Neural Network

A neural network may include a neuron. The neuron may be an operation unit that uses $x_s$ and an intercept of 1 as an input. An output of the operation unit may be as follows:

$$h_{W,b}(x) = f(W^T x) = f\left(\sum_{s=1}^{n} W_s x_s + b\right), \tag{1-1}$$

where s=1, 2, . . . , or n, n is a natural number greater than 1, $W_s$ is a weight of $x_s$, and b is a bias of the neuron; f is an activation function (activation function) of the neuron, which is used to introduce a nonlinear feature into the neural network, to convert an input signal in the neuron into an output signal. The output signal of the activation function may be used as an input of a next convolutional layer. The activation function may be a sigmoid function. The neural network is a network formed by a plurality of single neurons that are connected together. To be specific, an output of a neuron may be an input to another neuron. An input of each neuron may be connected to a local receptive field of a previous layer to extract a feature of the local receptive field. The local receptive field may be a region including several neurons.

(2) Deep Neural Network

A deep neural network (DNN), also referred to as a multi-layer neural network, may be understood as a neural network having a plurality of hidden layers. The DNN is divided based on locations of different layers, so that the neural network in the DNN can be divided into three types: an input layer, hidden layers, and an output layer. Generally, a first layer is the input layer, a last layer is the output layer, and middle layers are the hidden layer. Layers are fully connected. To be specific, any neuron at an $i^{th}$ layer is necessarily connected to any neuron at an (i+1)th layer.

Although the DNN seems to be complex, the DNN is actually not complex in terms of work at each layer, and is simply expressed as the following linear relationship expression: $\vec{y}=a(W\vec{x}+\vec{b})$, where $\vec{x}$ is an input vector, $\vec{y}$ is an output vector, $\vec{b}$ is a bias vector, W is a weight matrix (also referred to as a coefficient), and a( ) is an activation function. At each layer, the output vector $\vec{y}$ is obtained by performing such a simple operation on the input vector $\vec{x}$. Because the DNN has a large quantity of layers, there are also relatively large quantities of coefficients W and bias vectors $\vec{b}$. These parameters are defined in the DNN as follows: The coefficient W is used as an example. It is assumed that in a three-layer DNN, a linear coefficient from the fourth neuron at the second layer to the second neuron at the third layer is defined as $$W_{24}^{3}.$$

A superscript 3 represents a layer at which the coefficient W is located, and a subscript corresponds to an index 2 of a third layer as an output and an index 4 of a second layer as an input.

In conclusion, a coefficient from a $k^{th}$ neuron at an (L−1)th layer to a $j^{th}$ neuron at an $L^{th}$ layer is defined as $$W_{jk}^{L}.$$

It should be noted that there is no parameter W at the input layer. In the deep neural network, more hidden layers make the network more capable of describing a complex case in the real world. Theoretically, a model with more parameters has higher complexity and a larger "capacity". It indicates that the model can complete a more complex learning task. Training the deep neural network is a process of learning a weight matrix, and a final objective of the training is to obtain a weight matrix (a weight matrix formed by vectors W at a plurality of layers) of all layers of the deep neural network obtained through training.

(3) Convolutional Neural Network

A convolutional neural network (CNN) is a deep neural network with a convolutional structure. The convolutional neural network includes a feature extractor that includes a convolutional layer and a sampling sublayer, and the feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some rectangularly arranged neurons. Neurons on a same feature plane share a weight, and the weight shared herein is a convolution kernel. Weight sharing may be understood as that a picture information extraction manner is irrelevant to a location. The convolution kernel may be initialized in a form of a matrix of a random size. In a training process of the convolutional neural network, the convolution kernel may obtain a proper weight through learning. In addition, benefits directly brought by weight sharing are that connections among layers of the convolutional neural network are reduced, and an overfitting risk is reduced.

(4) A recurrent neural network (RNN) is used for processing sequence data. A conventional neural network model starts from an input layer to a hidden layer and then to an output layer, and the layers are fully connected, while nodes at each layer are unconnected. Such a common neural network resolves many problems, but is still incapable of resolving many other problems. For example, if a word in a sentence is to be predicted, a previous word usually needs to be used, because adjacent words in the sentence are related. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN. The RNN is intended to make a machine capable of memorizing like a human. Therefore, an output of the RNN needs to depend on current input information and historical memorized information.

(5) Loss Function

In a process of training a deep neural network, because it is expected that an output of the deep neural network is as close as possible to a value that is actually expected to be predicted, a current predicted value of the network may be compared with a target value that is actually expected, and then a weight vector at each layer of the neural network is updated based on a difference between the current predicted value and the target value (there is usually an initialization process before the first update, that is, a parameter is preconfigured for each layer of the deep neural network). For example, if the predicted value of the network is large, the weight vector is adjusted to lower the predicted value until the deep neural network can predict the target value that is actually expected or a value very close to the target value that is actually expected. Therefore, "how to obtain, through comparison, the difference between the predicted value and the target value" needs to be predefined. This is the loss function or an objective function. The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(6) Back Propagation Algorithm

A neural network may correct a size of a parameter in an initial neural network model in a training process by using an error back propagation (back propagation, BP) algorithm, so that a reconstruction error loss of the neural network model becomes smaller. Specifically, an input signal is transferred forward until an error loss occurs at an output, and the parameter in the initial neural network model is updated through back propagation of error loss information, to make the error loss converge. The back propagation algorithm is an error-loss-centered back propagation motion intended to obtain a parameter, such as a weight matrix, of an optimal neural network model.

In the following embodiment of a decoding system 10, an encoder 20 and a decoder 30 are described based on FIG. 1 and FIG. 2.

FIG. 1 is a schematic block diagram of an example decoding system 10, for example, a video decoding system 10 (or a decoding system 10 for short) that may utilize techniques of this application. The video encoder 20 (or the encoder 20 for short) and the video decoder 30 (or the decoder 30 for short) of the video decoding system 10 represent examples of devices that may be configured to perform techniques in accordance with various examples described in this application.

As shown in FIG. 1, the decoding system 10 includes a source device 12. The source device 12 is configured to provide encoded picture data 21 such as an encoded picture to a destination device 14 configured to decode the encoded picture data 21.

The source device 12 includes an encoder 20, and may additionally, that is, in one embodiment, include a picture source 16, a pre-processor (or pre-processing unit) 18, for example, a picture pre-processor, and a communication interface or (communication unit) 22.

The picture source 16 may include or be any type of picture capturing device for capturing a real-world picture or the like, and/or any type of picture generating device, for example, a computer-graphics processor for generating a computer animated picture, or any type of device for obtaining and/or providing a real-world picture, a computer generated picture (for example, a screen content, a virtual reality (VR) picture), and/or any combination thereof (for example, an augmented reality (AR) picture). The picture source may be any type of memory or storage storing any of the foregoing pictures.

To distinguish from processing performed by the pre-processor (or the pre-processing unit) 18, a picture (or picture data) 17 may also be referred to as an original picture (or original picture data) 17.

The pre-processor 18 is configured to receive the (original) picture data 17 and to perform pre-processing on the picture data 17 to obtain a pre-processed picture (or pre-processed picture data) 19. For example, pre-processing performed by the pre-processor 18 may include trimming, color format conversion (for example, from RGB to YCbCr), color correction, or de-noising. It can be understood that the pre-processing unit 18 may be an optional component.

The video encoder (or encoder) 20 is configured to receive the pre-processed picture data 19 and provide the encoded picture data 21.

The communication interface 22 of the source device 12 may be configured to receive the encoded picture data 21 and transmit the encoded picture data 21 (or any other processed version thereof) over a communication channel 13 to another device, for example, the destination device 14 or any other device, for storage or direct reconstruction.

The destination device 14 includes a decoder 30, and may additionally, that is, in one embodiment, include a communication interface (or communication unit) 28, a post-processor (or post-processing unit) 32, and a display device 34.

The communication interface 28 of the destination device 14 is configured to receive the encoded picture data 21 (or any other processed version thereof), for example, directly from the source device 12 or from any other source device, for example, a storage device, and provide the encoded picture data 21 to the decoder 30. For example, the storage device is an encoded picture data storage device.

The communication interface 22 and the communication interface 28 may be configured to send or receive the encoded picture data (or encoded data) 21 via a direct communication link between the source device 12 and the destination device 14, for example, a direct wired connection or wireless connection, or via any type of network, for example, a wired network or wireless network or any combination thereof, or any type of private network and public network, or any type of combination thereof.

The communication interface 22 may be, for example, configured to encapsulate the encoded picture data 21 into an appropriate format, for example, packets, and/or process the encoded picture data using any type of transmission encoding or processing for transmission over a communication link or communication network.

The communication interface 28 corresponds to the communication interface 22, may be, for example, configured to receive the transmitted data and process the transmitted data using any type of corresponding transmission decoding or processing and/or decapsulation to obtain the encoded picture data 21.

Both the communication interface 22 and the communication interface 28 may be configured as unidirectional communication interfaces as indicated by the arrow corresponding to the communication channel 13 in FIG. 1 pointing from the source device 12 to the destination device 14, or bi-directional communication interfaces, and may be configured, for example, to send and receive messages, for example, to set up a connection, to acknowledge and exchange any other information related to the communication link and/or data transmission, for example, encoded picture data transmission.

The video decoder (or decoder) 30 is configured to receive the encoded picture data 21 and provide decoded picture data (or decoded picture data) 31 (which will be further described below based on FIG. 9A, FIG. 9E, FIG. 9F, and the like).

The post-processor 32 is configured to post-process the decoded picture data 31 (also referred to as reconstructed picture data), for example, a decoded picture, to obtain post-processed picture data 33, for example, a post-processed picture. The post-processing performed by the post-processing unit 32 may include, for example, color format conversion (for example, from YCbCr to RGB), color correction, trimming, or re-sampling, or any other processing, for example, for preparing the decoded picture data 31 for display, for example, by display device 34.

The display device 34 is configured to receive the post-processed picture data 33 for displaying the picture, for example, to a user or viewer. The display device 34 may be or include any type of display for representing a reconstructed picture, for example, an integrated or external display. For example, the display may include a liquid crystal display (LCD), an organic light emitting diode (OLED) display, a plasma display, a projector, a micro LED display, a liquid crystal on silicon (LCoS), a digital light processor (DLP), or any type of other display.

The decoding system 10 further includes a training engine 25. The training engine 25 is configured to train a neural network in the encoder 20 or the decoder 30, to process a reconstructed residual of an input encoded picture or a reconstructed residual of a decoded picture, to obtain probability distribution of residual values of a plurality of samples and included in a residual of a current picture. In one embodiment, input data further includes hyper prior information.

Training data may be stored in a database (not shown in the figure), and the training engine 25 obtains a neural network through training based on the training data. The neural network is used to estimate the probability distribution of the residual values of the plurality of samples and included in the residual of the current picture. It should be noted that, a source of the training data is not limited in embodiments of this application. For example, the training data may be obtained from a cloud or another place to perform neural network training used for probability estimation.

The neural network obtained by the training engine 25 through training may be applied to the decoding systems 10 and 40, for example, applied to the source device 12 (for example, the encoder 20) or the destination device 14 (for example, the decoder 30) shown in FIG. 1. The training engine 25 may obtain the neural network on the cloud through training, and then the decoding system 10 downloads the neural network from the cloud and uses the neural network. Alternatively, the training engine 25 may obtain the neural network on the cloud through training, and use the neural network to obtain the probability distribution of the residual values of the plurality of samples and included in the residual of the current picture, and the decoding system 10 directly obtains the probability distribution from the cloud.

Although FIG. 1 shows the source device 12 and the destination device 14 as separate devices, embodiments of devices may also include both the source device 12 and the destination device 14 or both functions of the source device 12 and the destination device 14, in other words, include the source device 12 or a corresponding function and the destination device 14 or a corresponding function. In these embodiments, the source device 12 or corresponding function and the destination device 14 or corresponding function may be implemented by using the same hardware and/or software or by separate hardware and/or software or any combination thereof.

As will be apparent for the skilled person based on the description, existence and (exact) split of different units or functions within the source device 12 and/or destination device 14 shown in FIG. 1 may vary depending on the actual device and application.

Figure 2:
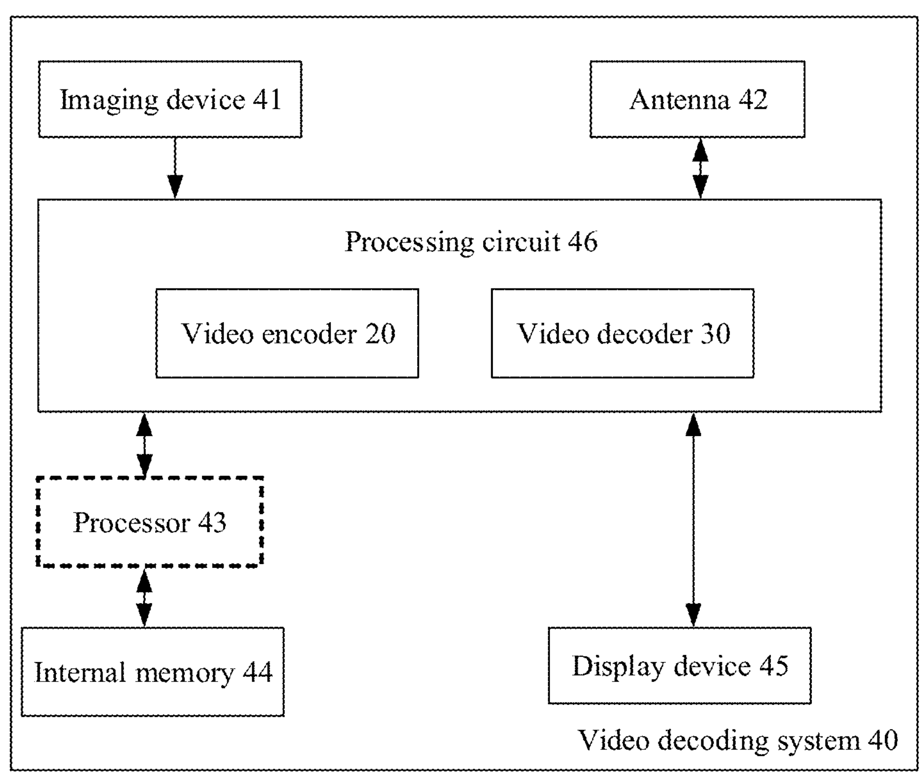
FIG. 2 is a block diagram of another example of a video decoding system configured to implement an embodiment of this application.

The encoder 20 (for example, the video encoder 20) or the decoder 30 (for example, the video decoder 30) or both the encoder 20 and the decoder 30 may be implemented by using a processing circuit shown in FIG. 2, such as one or more microprocessors, digital signal processors (digital signal processor, DSP), application-specific integrated circuits (application-specific integrated circuit, ASIC), field-programmable gate arrays (field-programmable gate array, FPGA), discrete logic, hardware, video coding dedicated processor, or any combination thereof. The encoder 20 may be implemented by using a processing circuit 46 to include various modules discussed with reference to the encoder 20 of FIG. 2 and/or any other decoder system or subsystem described herein. The decoder 30 may be implemented by using the processing circuit 46 to include various modules discussed with reference to the decoder 30 of FIG. 3 and/or any other decoder system or subsystem described herein. The processing circuit 46 may be configured to perform the various operations discussed below. As shown in FIG. 4, if the techniques are implemented partially in software, a device may store instructions for the software in a suitable non-transitory computer-readable storage medium and may execute the instructions in hardware using one or more processors to perform the techniques of this application. As shown in FIG. 2, either of the video encoder 20 and the video decoder 30 may be integrated as part of a combined encoder/decoder (encoder/decoder, CODEC) in a single device.

The source device 12 and the destination device 14 may include any of a wide range of devices, including any type of handheld or stationary devices, for example, notebook or laptop computers, mobile phones, smart phones, tablets or tablet computers, cameras, desktop computers, set-top boxes, televisions, display devices, digital media players, video gaming consoles, video streaming devices (such as content service servers or content delivery servers), broadcast receiver devices, broadcast transmitter devices, or the like and may use no or any type of operating system. In some cases, the source device 12 and the destination device 14 may be equipped with components for wireless communication. Therefore, the source device 12 and the destination device 14 may be wireless communication devices.

In some cases, the video decoding system 10 shown in FIG. 1 is merely an example and the techniques of this application may apply to video coding settings (for example, video encoding or video decoding), and these settings do not necessarily include any data communication between an encoding device and a decoding device. In other examples, data is retrieved from a local memory, sent over a network, or the like. A video encoding device may encode data and store encoded data into the memory, and/or a video decoding device may retrieve data from the memory and decode the data. In some examples, encoding and decoding are performed by devices that do not communicate with one another, but simply encode data to a memory and/or retrieve data from a memory and decode the data.

FIG. 2 is an explanatory diagram of an example of a video decoding system 40 including a video encoder 20 and/or a video decoder 30 according to an example embodiment. The video decoding system 40 may include an imaging device 41, the video encoder 20, the video decoder 30 (and/or a video encoder/decoder implemented by the processing circuit 46), an antenna 42, one or more processors 43, one or more internal memories 44, and/or a display device 45.

As shown in FIG. 2, the imaging device 41, the antenna 42, the processing circuit 46, the video encoder 20, the video decoder 30, the processor 43, the internal memory 44, and/or the display device 45 can communicate with each other. The video decoding system 40 may include only the video encoder 20 or only the video decoder 30 in different examples.

In some examples, the antenna 42 may be configured to send or receive an encoded bitstream of video data. Further, in some examples, the display device 45 may be configured to present the video data. The processing circuit 46 may include application-specific integrated circuit (application-specific integrated circuit, ASIC) logic, a graphics processing unit, a general-purpose processor, or the like. The video decoding system 40 may alternatively include the optional processor 43. The optional processor 43 may similarly include application-specific integrated circuit (application-specific integrated circuit, ASIC) logic, a graphics processing unit, a general-purpose processor, or the like. In addition, the internal memory 44 may be a memory of any type, for example, a volatile memory (for example, a static random access memory (static random access memory, SRAM), a dynamic random access memory (dynamic random access memory, DRAM)), or a non-volatile memory (for example, a flash memory). In a non-limitative example, the internal memory 44 may be implemented by a cache memory. In other examples, the processing circuit 46 may include a memory (for example, a cache) for implementing a picture buffer.

In some examples, the video encoder 20 implemented by using a logic circuit may include a picture buffer (which is implemented by using, for example, the processing circuit 46 or the internal memory 44) and a graphics processing unit (which is implemented by using, for example, the processing circuit 46). The graphics processing unit may be communicatively coupled to the picture buffer. The graphics processing unit may include a video encoder 20 implemented by using the processing circuit 46, to implement various modules discussed with reference to the video decoder 20 of FIG. 2 and/or any other encoder system or subsystem described herein. The logic circuit may be configured to perform various operations described herein.

In some examples, the video decoder 30 may be implemented by using the processing circuit 46 in a similar manner, to implement various modules described with reference to the video decoder 30 of FIG. 2 and/or any other decoder system or subsystem described herein. In some examples, the video decoder 30 implemented by using the logic circuit may include a picture buffer (which is implemented by using the processing circuit 46 or the internal memory 44) and a graphics processing unit (which is implemented by using, for example, the processing circuit 46). The graphics processing unit may be communicatively coupled to the picture buffer. The graphics processing unit may include the video decoder 30 implemented by using the processing circuit 46.

In some examples, the antenna 42 may be configured to receive an encoded bitstream of video data. As described, the encoded bitstream may include data, an indicator, an index value, mode selection data, or the like related to video frame encoding described herein, for example, data related to coding partitioning (for example, a transform coefficient or a quantized transform coefficient, an optional indicator (as described), and/or data defining the coding partitioning). The video decoding system 40 may further include the video decoder 30 that is coupled to the antenna 42 and that is configured to decode the encoded bitstream. The display device 45 is configured to present a video frame.

It should be understood that in this embodiment of this application, for the example described with reference to the video encoder 20, the video decoder 30 may be configured to perform an opposite process. With regard to a signaling syntax element, the video decoder 30 may be configured to receive and parse such a syntax element and correspondingly decode related video data. In some examples, the video encoder 20 may entropy encode the syntax element into an encoded video bitstream. In such examples, the video decoder 30 may parse such a syntax element and correspondingly decode related video data.

It should be noted that the encoding and decoding process described in this application exists in a majority of video codecs, for example, a codec corresponding to H.263, H.264, MPEG-2, MPEG-4, VP8, VP9, or AI-based end-to-end picture encoding.

Figure 3:
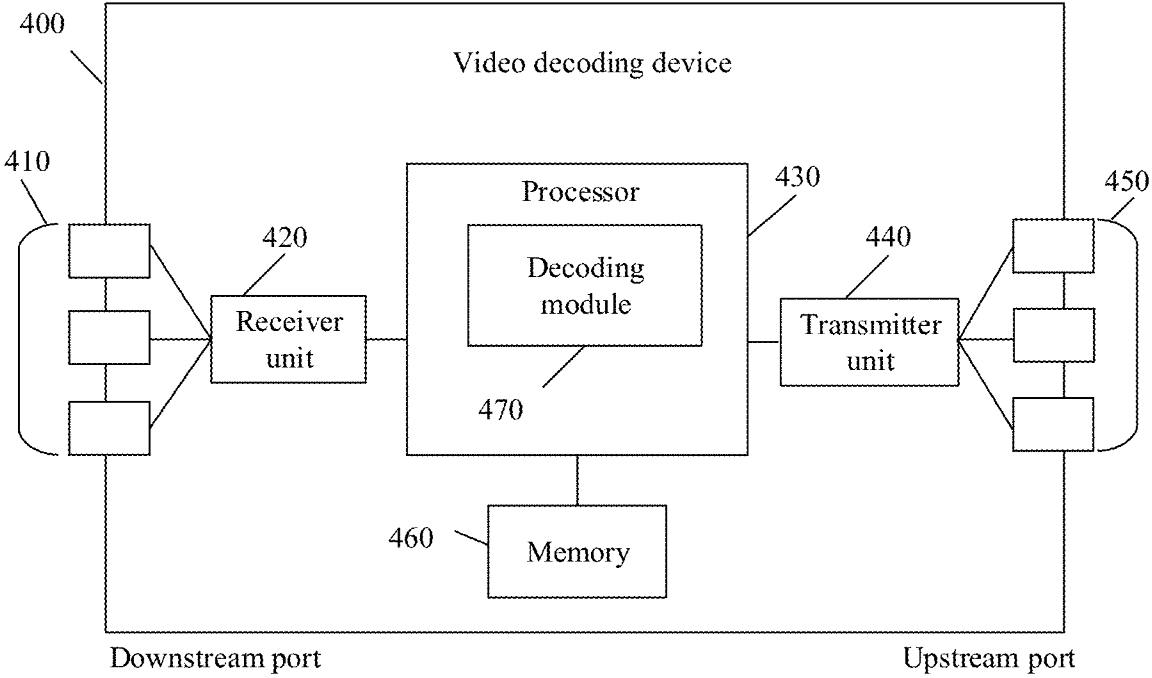
FIG. 3 is a schematic block diagram of a video decoding apparatus configured to implement an embodiment of this application.
Figure 4:
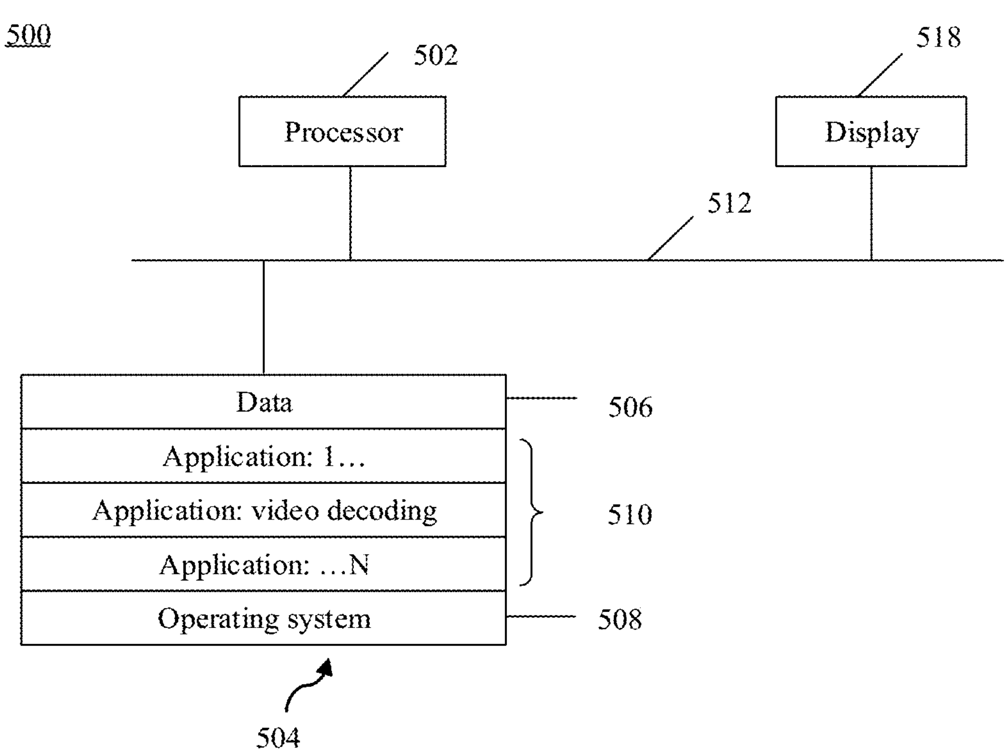
FIG. 4 is a schematic block diagram of a video decoding apparatus configured to implement an embodiment of this application.

FIG. 3 is a schematic diagram of a video decoding device 400 according to an embodiment of this application. The video decoding device 400 is suitable for implementing the disclosed embodiments described herein. In an embodiment, the video decoding device 400 may be a decoder such as the video decoder 30 of FIG. 2 or an encoder such as the video encoder 20 of FIG. 2.

The video decoding device 400 includes ingress ports 410 (or input ports 410) and a receiver unit (Rx) 420 for receiving data; a processor, a logic unit, or a central processing unit (CPU) 430 for processing the data, for example, the processor 430 herein may be a neural network processing unit 430; a transmitter unit (Tx) 440 and egress ports 450 (or output ports 450) for sending the data; and a memory 460 for storing the data. The video decoding device 400 may further include optical-to-electrical (OE) components and electrical-to-optical (EO) components coupled to the ingress ports 410, the receiver unit 420, the transmitter unit 440, and the egress ports 450 for egress or ingress of optical signals or electrical signals.

The processor 430 is implemented by hardware and software. The processor 430 may be implemented as one or more processor chips, cores (for example, a multi-core processor), FPGAs, ASICs, and DSPs. The processor 430 is in communication with the ingress ports 410, the receiver unit 420, the transmitter unit 440, the egress ports 450, and the memory 460. The processor 430 includes a decoding module 470 (for example, a neural network NN-based decoding module 470). The decoding module 470 implements embodiments disclosed above. For example, the decoding module 470 implements, processes, prepares, or provides various coding operations. Therefore, the decoding module 470 provides a substantial improvement to functions of the video decoding device 400 and affects switching of the video decoding device 400 to a different state. Alternatively, the decoding module 470 is implemented as instructions stored in the memory 460 and executed by the processor 430.

The memory 460 may include one or more disks, tape drives, and solid-state drives and may be used as an overflow data storage device, to store programs when such programs are selected for execution, and to store instructions and data that are read during program execution. The memory 460 may be volatile and/or non-volatile and may be a read-only memory (read-only memory, ROM), a random access memory (RAM), a ternary content-addressable memory (TCAM), and/or a static random-access memory (SRAM).

FIG. 4 is a simplified block diagram of an apparatus 500 according to an example embodiment. The apparatus 500 may be used as either or both of the source device 12 and the destination device 14 in FIG. 1.

A processor 502 in the apparatus 500 can be a central processing unit. Alternatively, the processor 502 may be any other type of device, or a plurality of devices, capable of manipulating or processing information now-existing or hereafter developed. Although the disclosed implementations can be practiced with a single processor shown in the figure, such as the processor 502, a higher speed and higher efficiency can be achieved using more than one processor.

A memory 504 in the apparatus 500 may be a read-only memory (ROM) device or a random access memory (RAM) device in an implementation. Any other suitable type of storage device may be used as the memory 504. The memory 504 may include code and data 506 that are accessed by the processor 502 by using a bus 512. The memory 504 may further include an operating system 508 and an application program 510, and the application program 510 includes at least one program that allows the processor 502 to perform the methods described herein. For example, the application program 510 may include applications 1 to N, which further include a video decoding application that performs the methods described herein.

The apparatus 500 may further include one or more output devices, such as a display 518. In one example, the display 518 may be a touch sensitive display that combines a display with a touch sensitive element that can be used to sense touch inputs. The display 518 may be coupled to the processor 502 via the bus 512.

Although the bus 512 of the apparatus 500 is depicted herein as a single bus, the bus 512 may include a plurality of buses. Further, a secondary storage may be directly coupled to other components of the apparatus 500 or may be accessed via a network and may include a single integrated unit such as a memory card or a plurality of units such as a plurality of memory cards. Therefore, the apparatus 500 may be implemented in a wide variety of configurations.

Figure 5:
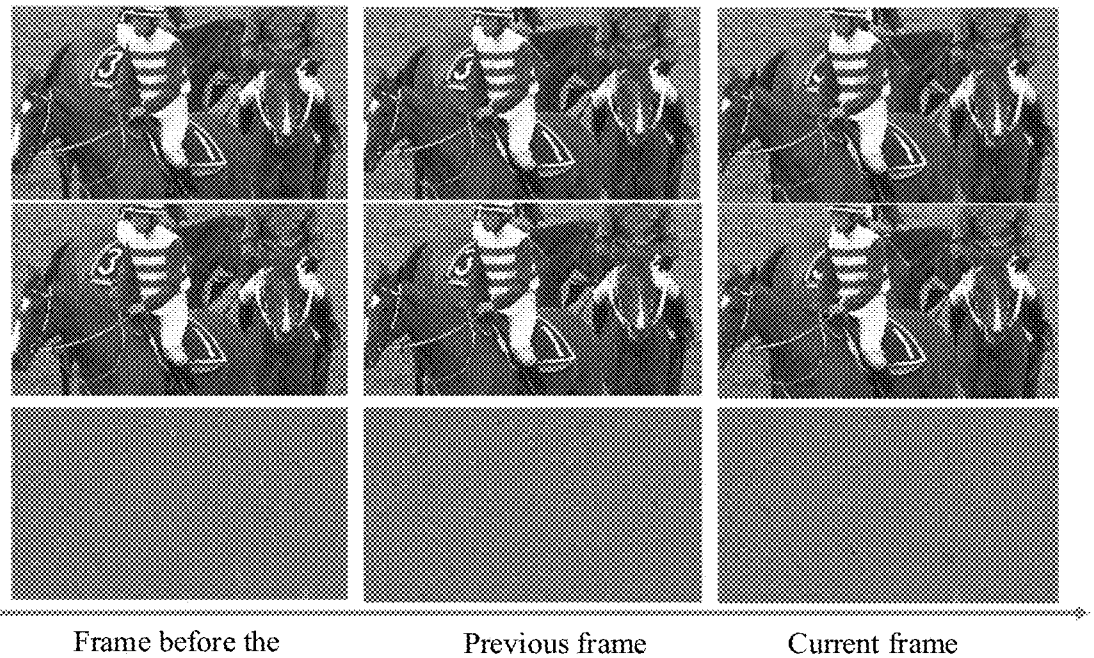
FIG. 5 is a schematic diagram of comparison between an original picture, a prediction picture, and a residual.

As shown in FIG. 5, a first row is an original picture, a second row is a prediction of the original picture, and a third row is a residual of the original picture. It can be learned from the figure that there is an obvious correlation between residuals of consecutive pictures, and a residual of a current picture may be encoded and a bitstream of the current picture may be decoded based on the correlation, so as to improve encoding and decoding efficiency.

It should be understood that there is also a correlation between residuals of nonconsecutive pictures, but a difference between timestamps of the nonconsecutive pictures is less than a preset threshold, so that most content in the nonconsecutive pictures is the same, thereby ensuring that there is an obvious correlation between the residuals of the nonconsecutive pictures.

Encoder and Encoding Method

Figure 6A:
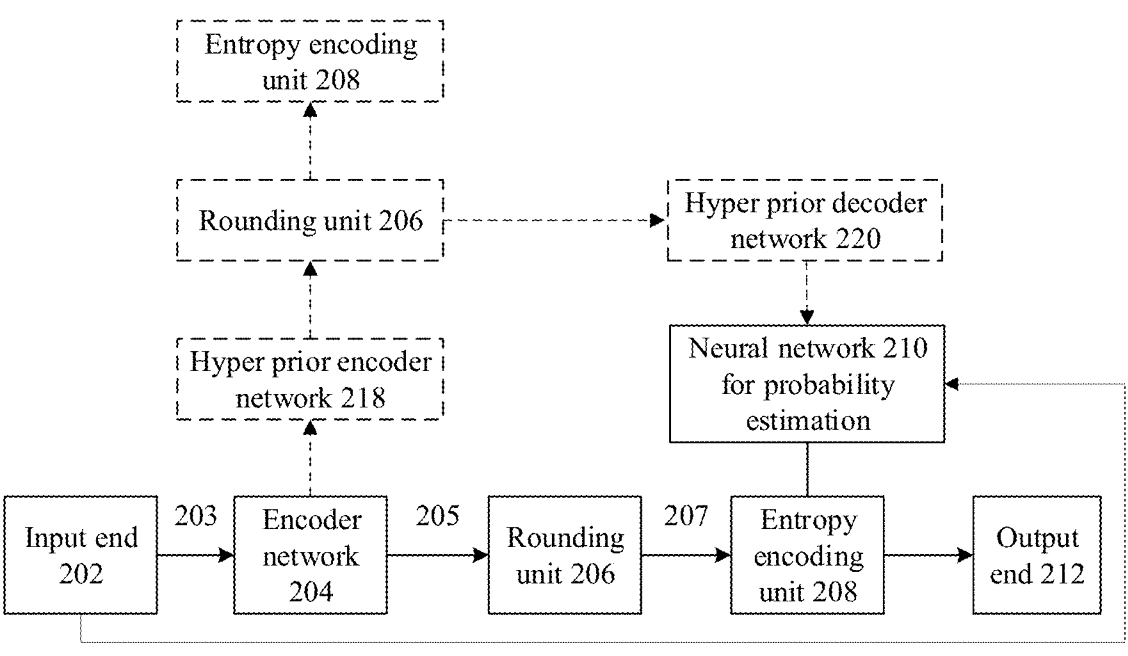
FIG. 6A is a schematic diagram of a structure of a video encoder according to an embodiment of this application.

FIG. 6A is a schematic block diagram of an example of a video encoder used to implement a technology of this application. In an example in FIG. 6A, a video encoder 20 includes an input end (or an input interface) 202, an encoder network 204, a rounding unit 206, an entropy encoding unit 208, a neural network 210 for probability estimation, and an output end (or an output interface) 212. The video encoder 20 shown in FIG. 6A may also be referred to as an end-to-end video encoder or a video encoder based on an end-to-end video encoder.

The encoder 20 may receive input data 203 by using the input end 202 or the like, and a picture of the input data includes a residual of a current picture and is used as an input to the encoder network 204.

The input data 203 further includes a residual of a reference picture;

residuals of a plurality of reference pictures;

residuals of a plurality of reference pictures and a prediction of the current picture; or residuals of a plurality of reference pictures, predictions of the plurality of reference pictures, and a prediction of the current picture, as an input to the neural network 210 for probability estimation.

A (digital) picture is or may be considered as a two-dimensional array or matrix of pixel samples with intensity values. A pixel sample in the array may also be referred to as pixel (pixel or pel) (short for picture element). A quantity of pixel samples in a horizontal direction and a vertical direction (or axis) of the array or picture defines a size and/or resolution of the picture. For representation of color, three color components are usually used, to be specific, the picture may be represented as or include three pixel sample arrays. In an RBG format or color space, a picture includes a corresponding red, green, and blue pixel sample array. However, in video or picture coding, each pixel is usually represented in a luminance/chrominance format or color space, for example, YCbCr, which includes a luminance component indicated by Y (or may be represented by L sometimes) and two chrominance components represented by Cb and Cr. The luminance (luma for short) component Y represents brightness or gray level intensity (for example, the brightness and the gray level intensity are the same in a grayscale picture), while the two chrominance (chroma for short) components Cb and Cr represent the chromaticity or color information components. Accordingly, a picture in a YCbCr format includes a luminance pixel sample array of luminance pixel sample values (Y) and two chrominance pixel sample arrays of chrominance values (Cb and Cr). Pictures in an RGB format may be converted or transformed into the YCbCr format and vice versa. The process is also known as color transformation or conversion. If a picture is monochrome, the picture may include only a luminance pixel sample array. Accordingly, a picture may be, for example, a luminance pixel sample array in a monochrome format or a luminance pixel sample array and two corresponding chrominance pixel sample arrays in a 4:2:0, 4:2:2, and 4:4:4 color format.

The residual of the current picture is obtained based on the current picture and the prediction of the current picture. Specifically, the current picture includes original values of a plurality of samples (pixel samples), and the prediction of the current picture includes predicted values of the plurality of samples (pixel samples). The original values of the samples (pixel samples) in the current picture are obtained by subtracting, one by one, predicted values of samples at corresponding locations in the prediction of the current picture, to obtain the residual of the current picture.

Figure 6B:
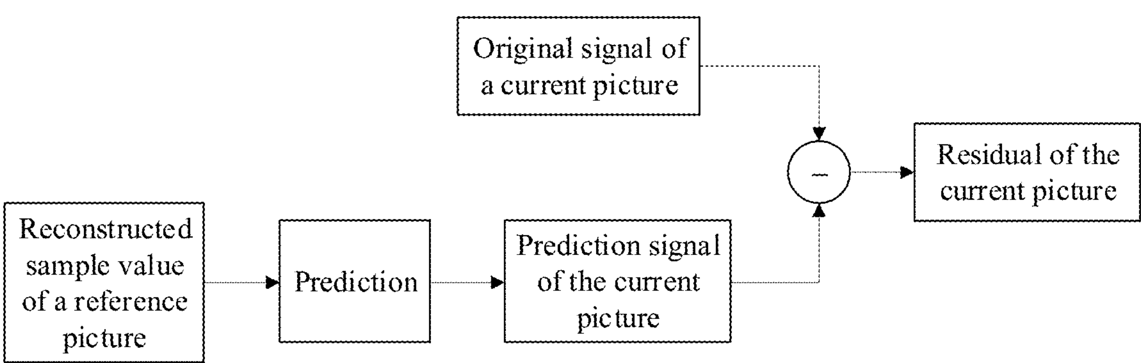
FIG. 6B is a schematic diagram of a residual signal obtaining principle according to an embodiment of this application.
Figure 6C:
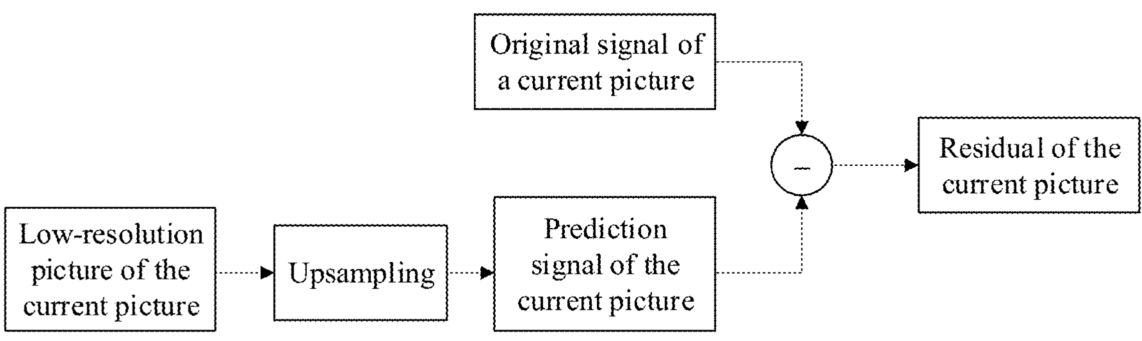
FIG. 6C is a schematic diagram of another residual signal obtaining principle according to an embodiment of this application.

In an example, as shown in FIG. 6B, a reconstructed sample value of an encoded picture is predicted to obtain a prediction signal of the current picture; and then an original signal of the current picture and the prediction of the current picture are processed based on the foregoing method, to obtain the residual of the current picture. In another example, as shown in FIG. 6C, upsampling is performed on a low-resolution picture of the current picture to obtain the prediction of the current picture, and then an original signal of the current picture and the prediction of the current picture are processed in the foregoing manner to obtain the residual of the current picture. The low-resolution picture of the current picture is obtained by performing downsampling on the current picture.

It should be noted herein that in this application, the prediction signal of the current picture may also be referred to as a prediction of the current picture, and a prediction signal of the reference picture may also be referred to as a prediction of the reference picture. The original signal of the current picture is the current picture. In this application, the residual of the current picture may also be referred to as a residual signal of the current picture.

Encoder Network 204

As shown in FIG. 6A, the encoder network 204 is configured to process the residual of the current picture by using the encoder network, to obtain a feature map 205 of the residual of the current picture.

Figure 6D:
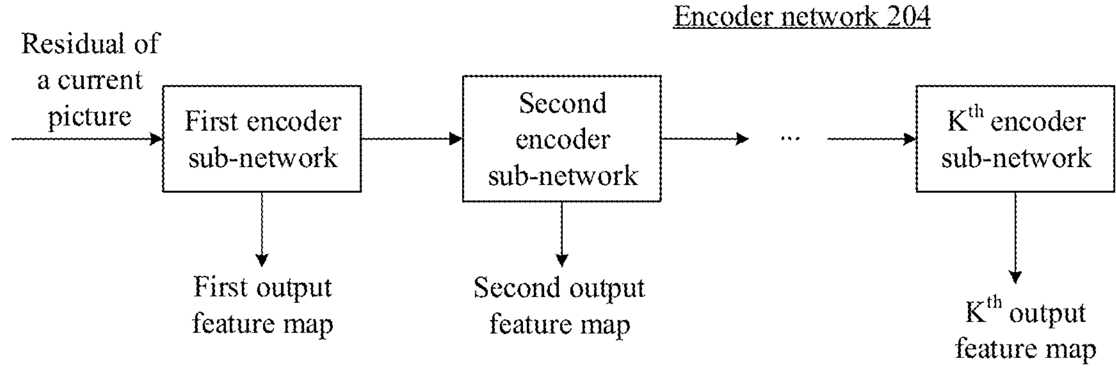
FIG. 6D is a schematic diagram of a structure of an encoder network according to an embodiment of this application.

In a possibility, the encoder network 204 is shown in FIG. 6D, the encoder network 204 includes K encoder sub-networks, and each encoder sub-network corresponds to a feature layer at which the encoder sub-network is located and a corresponding output feature map. The residual of the current picture is input to a first encoder sub-network for feature extraction, to obtain a first output feature map; then the first output feature map is input to a second encoder sub-network for feature extraction, to obtain a second output feature map; and by analogy, a $(K-1)^{th}$ output feature map is input to a $K^{th}$ encoder sub-network for feature extraction, to obtain a $K^{th}$ output feature map. In this case, K output feature maps are output, where K≥A feature map of the residual of the current picture may be any one of the K output feature maps, or the $K^{th}$ output feature map, or a multi-channel feature map obtained by performing a concatenation operation on the K output feature maps. The feature map has a multi-scale feature.

Figure 6E:
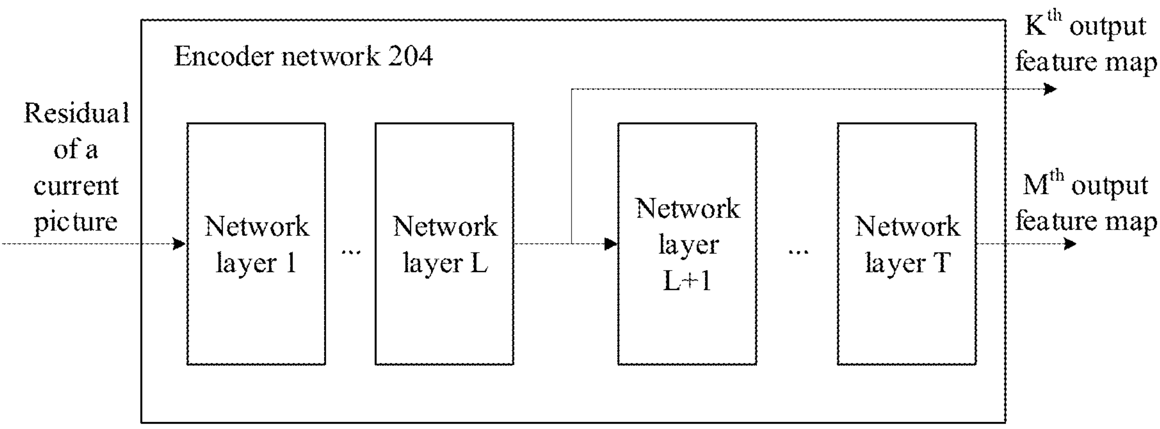
FIG. 6E is a schematic diagram of a structure of another encoder network according to an embodiment of this application.

In a possibility, a structure of the encoder network 204 is shown in FIG. 6E. The encoder network 204 includes T network layers, where M, L, T, and K are positive integers. Both an $M^{th}$ output feature map and the $K^{th}$ output feature map are outputs of the encoder network, the $K^{th}$ output feature map output by the encoder network is output after a network layer L of the encoder network 204, and the $M^{th}$ output feature map is output after the network layer T. It may be understood that a plurality of output feature maps may be output after locations of different network layers in the encoder network 204. This is not limited herein. The feature map of the residual of the current picture may be the $M^{th}$ output feature map, or a multi-channel feature map obtained by performing a concatenation operation on the plurality of output feature maps. The feature map has a multi-scale feature.

It should be noted herein that, before the concatenation operation is performed on the plurality of output feature maps, if sizes of the plurality of output feature maps are inconsistent, the plurality of output feature maps are processed, for example, upsampled and downsampled, so that the sizes of the plurality of output feature maps are consistent.

Any network layer in FIG. 6E may be a convolutional layer, a normalization layer, a nonlinear activation layer, or the like.

Figure 6F:
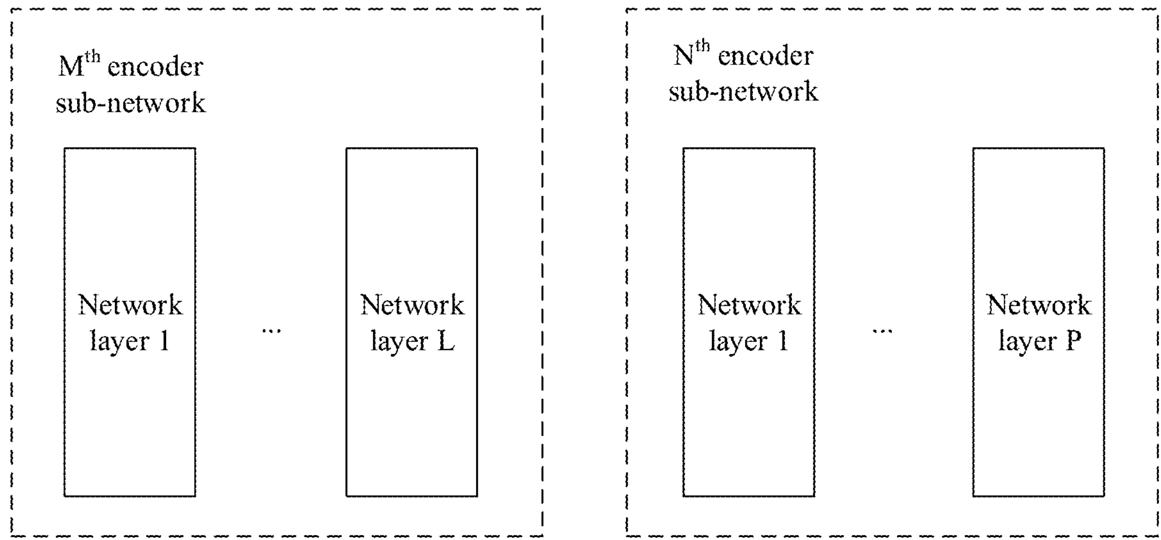
FIG. 6F is a schematic diagram of a structure of another encoder network according to an embodiment of this application.

In a possibility, structures of the encoder sub-networks corresponding to FIG. 6D in the encoder network 204 may be the same or different from each other, and structures of an $M^{th}$ encoder sub-network and an $N^{th}$ encoder sub-network are shown in FIG. 6F. A network layer 1 of an $M^{th}$ encoder sub-network and any network layer of an $N^{th}$ encoder sub-network may be different from each other, L and P may be the same or different, and both L and P are positive integers greater than 0.

Figure 6G:
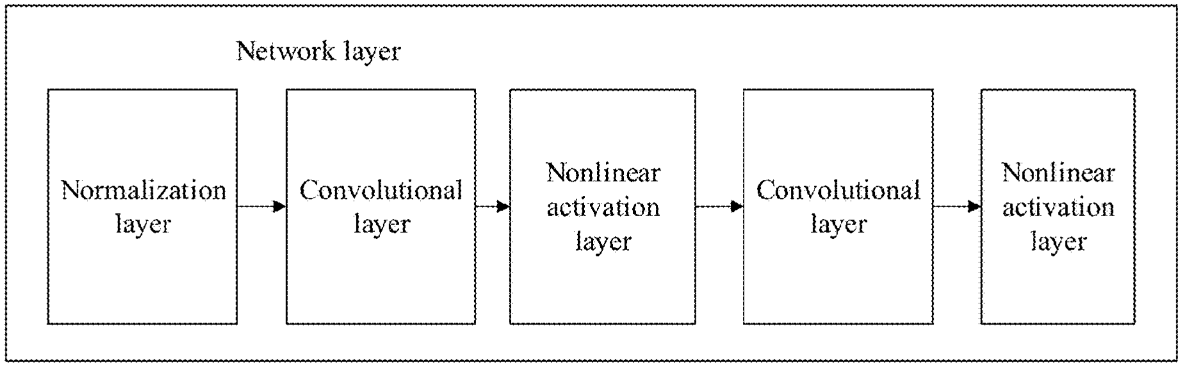
FIG. 6G is a schematic diagram of a structure of a network layer according to an embodiment of this application.

In a possibility, an example of a network structure of any encoder sub-network in the encoder network 204 is shown in FIG. 6G. It can be learned that the $N^{th}$ encoder sub-network in the example includes five network layers, and specifically includes one normalization layer, two convolutional layers, and two nonlinear activation layers.

Rounding Unit 206

The rounding unit 206 is configured to round the output feature map 205 by, for example, scalar quantization or vector quantization, to obtain a rounded feature map 207.

In a possibility, the video encoder 20 (and correspondingly, the rounding unit 206) may be configured to output a quantization parameter (quantization parameter, QP), for example, directly or after being encoded or compressed by the entropy encoding unit 208, so that, for example, the video decoder 30 may receive and use the quantization parameter for decoding.

Neural Network 210 for Probability Estimation

The neural network 210 for probability estimation is configured to estimate, based on input data, probability distribution of residual values of a plurality of samples and included in a residual of a current picture.

In one embodiment, the probability distribution represents probability distribution of a plurality of differences between original values of a plurality of samples included in the current picture and predicted values of the plurality of samples, represents probability distribution of residual values of all sample points in a plurality of samples of the current picture, or represents probability distribution corresponding to residual values of a plurality of samples of the current picture.

Figure 6H:
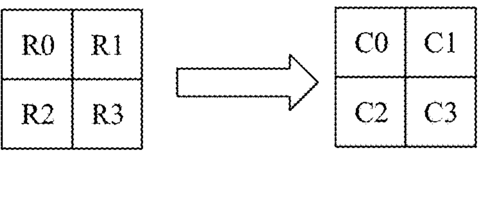
FIG. 6H is a schematic diagram of explanation of probability distribution.
Figure 6H:
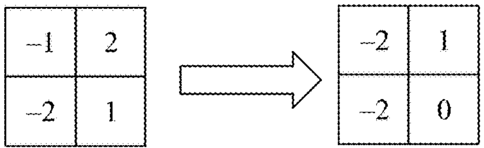

Information about the probability distribution of the residual values of the plurality of samples and included in the residual of the current picture is explained as follows:

A 2×2 picture is used as an example. As shown in FIG. 6H, C0, C1, C2, and C3 are residuals of four samples of the current picture, and values of the residuals are respectively −2, 1, −2, and 0; R0, R1, R2, and R3 are residuals of four samples of a reference picture, and values of the residuals are respectively −1, 2, −2, and 1. It is assumed that a value range of a residual value is [−2,2], to be specific, an integer from −2 to 2. The neural network 210 for probability estimation is used to perform probability estimation on the residual of the reference picture, to obtain probability distribution of the residual values of the four samples and included in the residual of the current picture:

In one case, the probability distribution of the residual values of the four samples and included in the residual of the current picture is specifically probability distribution of residual values of all sample points in the four samples of the current picture, to be specific, probability distribution of a residual value at a location C0, probability distribution of a residual value at a location C1, probability distribution of a residual value at a location C2, and probability distribution of a residual value at a location C3 are shown in Table 1.

TABLE 1

| Location | Probability of −2 | Probability of −1 | Probability of 0 | Probability of 1 | Probability of 2 |
|---|---|---|---|---|---|
| C0 | 0.6 | 0.1 | 0.1 | 0.1 | 0.1 |
| C1 | 0.1 | 0.1 | 0.1 | 0.5 | 0.2 |
| C2 | 0.5 | 0.2 | 0.1 | 0.1 | 0.1 |
| C3 | 0.1 | 0.2 | 0.4 | 0.2 | 0.1 |

Arithmetic entropy encoding may be performed on the residual based on the foregoing probability distribution.

In another possible case, the probability distribution of the residual values of the four samples included in the current picture is obtained based on the residual values of the four samples R0, R1, R2, and R3 included in the reference picture. For example, based on the residual values of the four samples R0, R1, R2, and R3, which are respectively −1, 2, −2, and 1, the probability distribution of the residual values of the four samples of the current picture is obtained, and is shown in Table 2 below:

TABLE 2

| Location | Probability of −2 | Probability of −1 | Probability of 0 | Probability of 1 | Probability of 2 |
|---|---|---|---|---|---|
| C0, C1, C2, and C3 | 0.5 | 0.2 | 0.1 | 0.1 | 0.1 |

Alternatively, the probability distribution is shown in Table 3 below:

TABLE 3

| Location | Probability of −2 | Probability of −1 | Probability of 0 | Probability of 1 | Probability of 2 |
|---|---|---|---|---|---|
| C0 | 0.5 | 0.2 | 0.1 | 0.1 | 0.1 |
| C1 | 0.5 | 0.2 | 0.1 | 0.1 | 0.1 |
| C2 | 0.5 | 0.2 | 0.1 | 0.1 | 0.1 |
| C3 | 0.5 | 0.2 | 0.1 | 0.1 | 0.1 |

Compared with Table 1, probability distribution shown in Table 2 and probability distribution shown in Table 3 are probability distribution of values in a value range of residual values, and locations of samples are not distinguished. In other words, probability distribution of residual values of a plurality of samples is the same.

The foregoing residual may be encoded based on the foregoing method for performing arithmetic entropy encoding on the residual based on the probability distribution.

In one embodiment, input data of the neural network 210 for probability estimation includes the residual of the reference picture; or the residual of the reference picture, a prediction of the current picture, and a prediction of the reference picture; or residuals of a plurality of reference pictures; or residuals of a plurality of reference pictures and predictions of the plurality of pictures.

It should be noted that the parameter picture or the plurality of reference pictures are encoded pictures before the current picture is encoded.

Figure 7A:
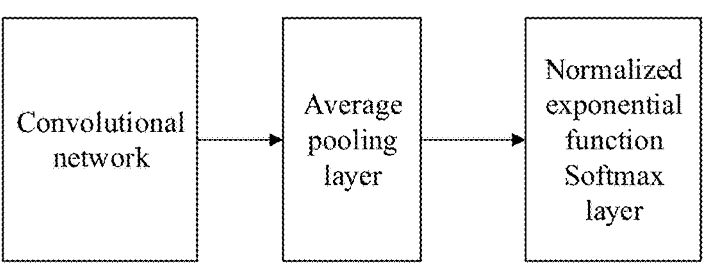
FIG. 7A is a schematic diagram of a structure of a neural network used for probability estimation according to an embodiment of this application.

In an example, as shown in FIG. 7A, the neural network 210 for probability estimation includes a convolutional network, an average pooling layer, and a normalized exponential function Softmax layer. The convolutional network includes an activation ReLU layer and a plurality of convolutional layers.

When the input data of the neural network 210 for probability estimation includes the residual of the reference picture, the convolutional network extracts feature information of the residual of the reference picture; or when the input data of the neural network 210 for probability estimation includes the residual of the reference picture, the prediction of the reference picture, and the prediction of the current picture, the convolutional network extracts feature information of the residual of the reference picture, the prediction of the reference picture, and the prediction of the current picture; or when the input data of the neural network 210 for probability estimation includes the residuals of the plurality of reference pictures, the convolutional network extracts feature information of the residuals of the plurality of reference pictures; or when the input data of the neural network 210 for probability estimation includes the residuals of the plurality of reference pictures, the predictions of the plurality of reference pictures, and the prediction of the current picture, the convolutional network extracts feature information of the residuals of the plurality of reference pictures, the predictions of the plurality of reference pictures, and the prediction of the current picture. Then, probability estimation is performed, by using the average pooling layer and the Softmax layer, on the feature information extracted by the convolutional network, and the probability distribution of the residual values of the plurality of samples and included in the residual of the current picture is output.

In one embodiment, when an input of the neural network 210 for probability estimation includes a plurality of pictures (for example, the residual of the reference picture, the prediction of the reference picture, and the prediction of the current picture, or the residuals of the plurality of reference pictures, or the residuals of the plurality of reference pictures, the predictions of the plurality of reference pictures, and the prediction of the current picture), before the plurality of pictures are input to the neural network 210 for probability estimation, a concatenation operation is first performed on the plurality of pictures to obtain a multi-channel picture, and then, the multi-channel picture is input to the neural network 210 for probability estimation. A convolutional network in the neural network 210 for probability estimation extracts feature information of the multi-channel picture, and then probability estimation is performed, by using the average pooling layer and the Softmax layer, on the feature information extracted by the convolutional network, to output the probability distribution of the residual values of the plurality of samples and included in the residual of the current picture.

Figure 7B:
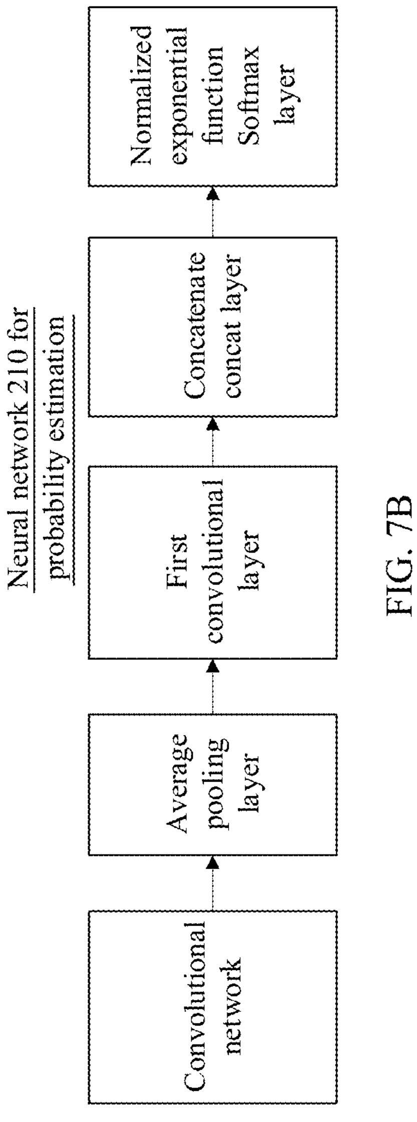
FIG. 7B is a schematic diagram of a structure of another neural network used for probability estimation according to an embodiment of this application.

In an example, input data of the neural network 210 for probability estimation further includes hyper prior information. In this case, a structure of the neural network 210 for probability estimation is different from that in FIG. 7A. As shown in FIG. 7B, the neural network includes a convolutional network, a convolution pooling layer, a first convolutional layer, a concatenate (concat) layer, and a Softmax layer. The convolutional network includes a plurality of convolutional layers and ReLU layers.

When the input data of the neural network 210 for probability estimation includes the residual of the reference picture and hyper prior information, the convolutional network extracts feature information of the residual of the reference picture and the hyper prior information; or when the input data of the neural network 210 for probability estimation includes the residual of the reference picture, the prediction of the reference picture, hyper prior information, and the prediction of the current picture, the convolutional network extracts feature information of the residual of the reference picture, the prediction of the reference picture, the hyper prior information, and the prediction of the current picture; or when the input data of the neural network 210 for probability estimation includes the residuals of the plurality of reference pictures and hyper prior information, the convolutional network extracts feature information of the residuals of the plurality of reference pictures and the hyper prior information; or when the input data of the neural network 210 for probability estimation includes the residuals of the plurality of reference pictures, the predictions of the plurality of reference pictures, hyper prior information, and the prediction of the current picture, the convolutional network extracts feature information of the residuals of the plurality of reference pictures, the predictions of the plurality of reference pictures, the hyper prior information, and the prediction of the current picture. Then, probability estimation is performed, by using the concatenate layer, the first convolutional layer, the average pooling layer, and the Softmax layer, on the feature information extracted by the convolutional network, and the probability distribution of the residual values of the plurality of samples and included in the residual of the current picture is output.

In one embodiment, the first convolutional layer may be the same as or different from a convolutional layer in the convolutional network.

In an example, when input data of the neural network 210 for probability estimation includes the residual of the reference picture, the prediction of the current picture, and the prediction of the reference picture, before the residual of the reference picture, the prediction of the current picture, and the prediction of the reference picture are input to the neural network 210 for probability estimation, a concatenation operation is performed on the residual of the reference picture, the prediction of the current picture, and the prediction of the reference picture, to obtain a three-channel picture, and then the three-channel picture is input to the neural network 210 for probability estimation for processing; or when input data of the neural network 210 for probability estimation includes the residuals of the plurality of reference pictures, before the residuals of the plurality of reference pictures are input to the neural network 210 for probability estimation, a concatenation operation is performed on the residuals of the plurality of reference pictures, to obtain a multi-channel picture, and then the multi-channel picture is input to the neural network 210 for probability estimation for processing; or when input data of the neural network 210 for probability estimation includes the residuals of the plurality of reference pictures, the predictions of the plurality of pictures, and the prediction of the current picture, before the residuals of the plurality of reference pictures, the predictions of the plurality of pictures, and the prediction of the current picture are input to the neural network 210 for probability estimation, a concatenation operation is performed on the residuals of the plurality of reference pictures, the predictions of the plurality of pictures, and the prediction of the current picture, to obtain a multi-channel picture, and then the multi-channel picture is input to the neural network 210 for probability estimation for processing.

In another example, when the input data of the neural network 210 for probability estimation includes the residuals of the plurality of reference pictures, before the residuals of the plurality of reference pictures are input to the neural network 210 for probability estimation, the residuals of the plurality of reference pictures are processed by using a recurrent neural network to obtain first latent information, and then the first latent information is input to the neural network 210 for probability estimation for processing.

Specifically, a residual $P_j$ and latent information $H_{j-1}$ of a $j^{th}$ reference picture in the residuals of the plurality of reference pictures are input to a recurrent neural network for processing to obtain latent information $H_j$. The residuals of the plurality of reference pictures are processed in this manner to obtain the first latent information. When the residual of the $j^{th}$ reference picture is the first residual in the plurality of reference pictures, the latent information $H_{j-1}$ is 0. When the residual of the $j^{th}$ reference picture is the last residual in the residuals of the plurality of reference pictures, the latent information $H_j$ is the first latent information.

A difference between timestamps of two adjacent reference pictures in the plurality of reference pictures is the foregoing preset threshold.

Figure 7C:
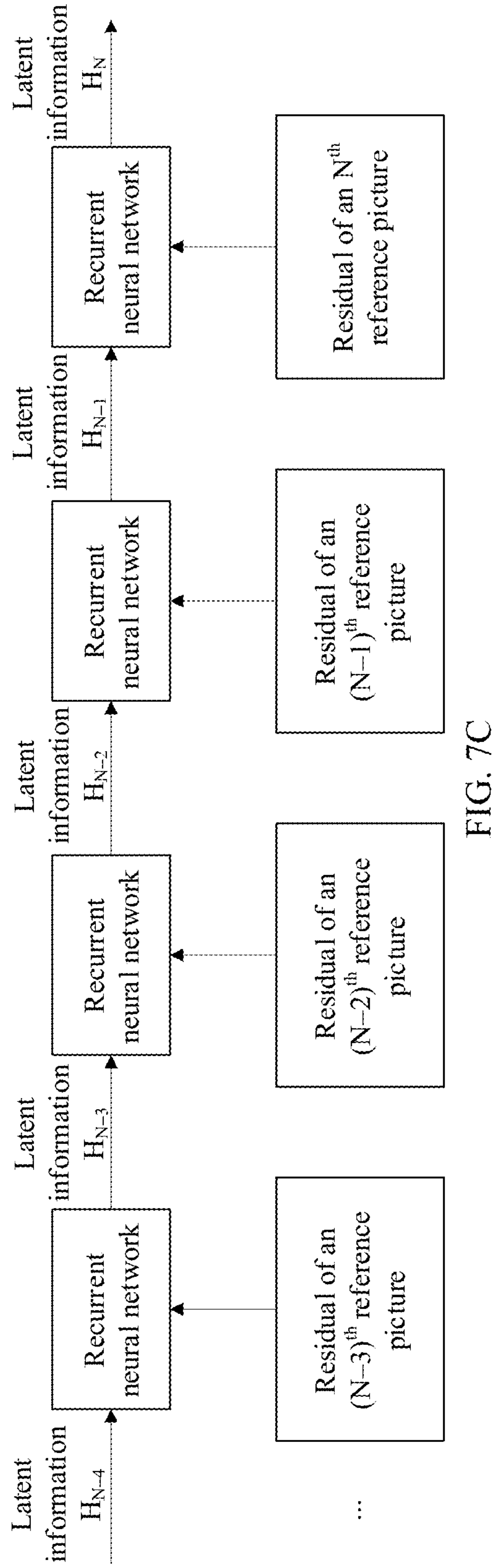
FIG. 7C is a schematic diagram of a latent information obtaining principle according to an embodiment of this application.

For example, as shown in FIG. 7C, it is assumed that the first latent information is obtained from residuals of N reference pictures by using a recurrent neural network, and this specifically includes the following:

First, a residual of a first reference picture is input to the recurrent neural network for processing, to obtain latent information $H_1$; then, the latent information $H_1$ and a residual of a second reference picture are input to the recurrent neural network for processing, to obtain latent information $H_2$; . . . ; latent information $H_{N-3}$ and a residual of an $(N-2)^{th}$ reference picture are input to the recurrent neural network for processing, to obtain latent information $H_{N-2}$; the latent information $H_{N-2}$ and a residual of an $(N-1)^{th}$ reference picture are input to the recurrent neural network for processing, to obtain latent information $H_{N-1}$; and the latent information $H_{N-1}$ and a residual of an $N^{th}$ reference picture are input to the recurrent neural network for processing, to obtain latent information $H_N$. The latent information $H_N$ is the first latent information.

In another example, when input data of the neural network 210 for probability estimation includes the residuals of the plurality of reference pictures, predictions of the plurality of reference pictures, and the prediction of the current picture, before the residuals of the plurality of reference pictures, predictions of the plurality of reference pictures, and the prediction of the current picture are input to the neural network 210 for probability estimation, second latent information is obtained from the residuals of the plurality of reference pictures and the predictions of the plurality of reference pictures by using the recurrent neural network, and then the second latent information and the prediction of the current picture are input to the neural network 210 for probability estimation for processing. The second latent information is essentially a feature map. Therefore, after the second latent information is obtained, a concatenation operation may be performed on the second latent information and the prediction of the current picture to obtain a two-channel picture, and then the two-channel picture is input to the neural network 210 for probability estimation for processing.

In one embodiment, obtaining the second latent information based on the residuals of the plurality of reference pictures and the predictions of the plurality of reference pictures includes:

inputting a residual $P_j$ of a $j^{th}$ reference picture in the residuals of the plurality of reference pictures, a prediction $P_j'$ of the $j^{th}$ reference picture in the predictions of the plurality of reference pictures, and latent information $H_{j-1}'$ into the recurrent neural network for processing, to obtain latent information $H_j'$; and processing the residuals of the plurality of reference pictures and the predictions of the plurality of reference pictures in this manner to obtain the second latent information. When the residual of the $j^{th}$ reference picture is the first residual in the residuals of the plurality of reference pictures and the prediction of the $j^{th}$ reference picture is the first prediction in the predictions of the plurality of reference pictures, the latent information $H_{j-1}'$ is 0; when the residual of the $j^{th}$ reference picture is the last residual in the residuals of the plurality of reference pictures, and the prediction of the $j^{th}$ reference picture is the last prediction in the predictions of the plurality of reference pictures, the latent information $H_j'$ is the second latent information.

Figure 7D:
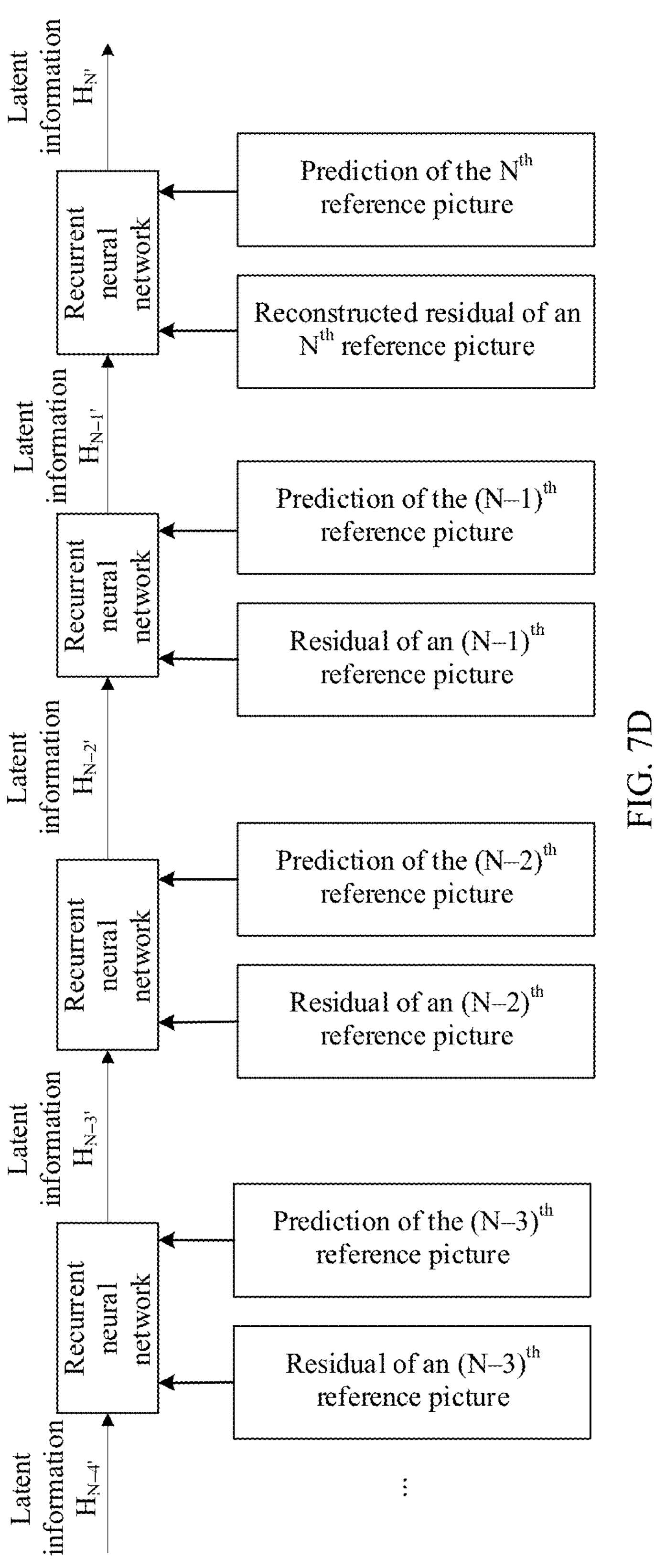
FIG. 7D is a schematic diagram of another latent information obtaining principle according to an embodiment of this application.

For example, as shown in FIG. 7D, it is assumed that the second latent information is obtained from residuals of N reference pictures and predictions of the N reference pictures, and this specifically includes the following:

First, a residual of a first reference picture a prediction of the first reference picture are input to the recurrent neural network for processing, to obtain latent information $H_1'$; then, the latent information $H_1'$, a residual of a second reference picture, and a prediction of the second reference picture are input to the recurrent neural network for processing, to obtain latent information $H_2'$; . . . ; latent information $H_{N-3}'$, a residual of an $(N-2)^{th}$ reference picture, and a prediction of the $(N-2)^{th}$ reference picture are input to the recurrent neural network for processing, to obtain latent information $H_{N-2}'$; the latent information $H_{N-2}'$, a residual of an $(N-1)^{th}$ reference picture, and a prediction of the $(N-1)^{th}$ reference picture are input to the recurrent neural network for processing, to obtain latent information $H_{N-1}'$; and the latent information $H_{N-1}$, a residual of an $N^{th}$ reference picture, and a prediction of the $N^{th}$ reference picture are input to the recurrent neural network for processing, to obtain latent information $H_N'$. The latent information $H_N'$ is the second latent information.

It should be noted herein that in the neural network structures shown in FIG. 7A and FIG. 7B, an execution sequence between layers is not limited to the execution sequences shown in FIG. 7A and FIG. 7B, or certainly may be another execution sequence.

In one embodiment, the video encoder 20 further includes a hyper prior encoder network 218 and a hyper prior network decoder network 220. The hyper prior encoder network 218 performs further feature extraction on the feature map, of the residual of the current picture, that is output by the encoder network 204, to obtain a feature vector of the hyper prior information. Then, the feature vector of the hyper prior information is input to the rounding unit 206, and the rounding unit 206 rounds the feature vector of the hyper prior information to obtain a rounded feature vector of the hyper prior information. Then, the rounded feature vector of the hyper prior information is input to the hyper prior decoder network 220 for processing, to obtain the hyper prior information.

In one embodiment, for a network architecture of the hyper prior encoder network 218, refer to the network architecture of the encoder network 204. Alternatively, the network architecture of the hyper prior encoder network 218 may be an architecture in another form. Details are not described herein again. A function of the hyper prior encoder network 218 is opposite to a function of the hyper prior decoder network 220. Therefore, for a network structure of the hyper prior decoder network 218, refer to the network structure of the hyper prior encoder network 218.

The hyper prior information is optional for the neural network 210 for probability estimation, and further, for the video encoder 20, the hyper prior encoder network 218 and the hyper prior information decoder network 220 are also optional. Therefore, the hyper prior encoder network 218 and the hyper prior information decoder network 220 are represented by using dashed boxes.

Entropy Encoding Unit 208

The entropy encoding unit 208 is configured to apply an entropy encoding algorithm or scheme (for example, a variable length coding (VLC) scheme, a context adaptive VLC (CALVC) scheme, an arithmetic encoding scheme, a binarization algorithm, context-adaptive binary arithmetic coding (CABAC), syntax-based context-adaptive binary arithmetic coding (SBAC), probability interval partitioning entropy (PIPE) coding, or another entropy encoding method or technology) to the rounded feature map and probability distribution of residual values of a plurality of samples and included in the residual of the current picture, to obtain encoded picture data 21 that can be output in a form of an encoded bitstream 21 through the output end 212, so that the video decoder 30 and the like can receive and use a parameter used for decoding. The encoded bitstream 21 may be transmitted to the video decoder 30, or stored in a memory for later transmission or retrieval by the video decoder 30.

In an example, because entropy encoding does not know a real character probability of the rounded feature map, statistics needs to be collected from the information or related information and added to the entropy encoding unit 208, so as to transmit the information to a decoder side.

In an example, on an encoder side, the neural network 210 for probability estimation uses the hyper prior information when estimating the probability distribution of the residual values of the plurality of samples and included in the residual of the current picture. Therefore, after the hyper prior information is obtained, entropy encoding is performed on the hyper prior information to obtain a bitstream of the hyper prior information, and the bitstream is transmitted to the video decoder 30 for decoding, so that the video decoder 30 obtains the hyper prior information and estimates the probability distribution by using the hyper prior information.

Figure 7E:
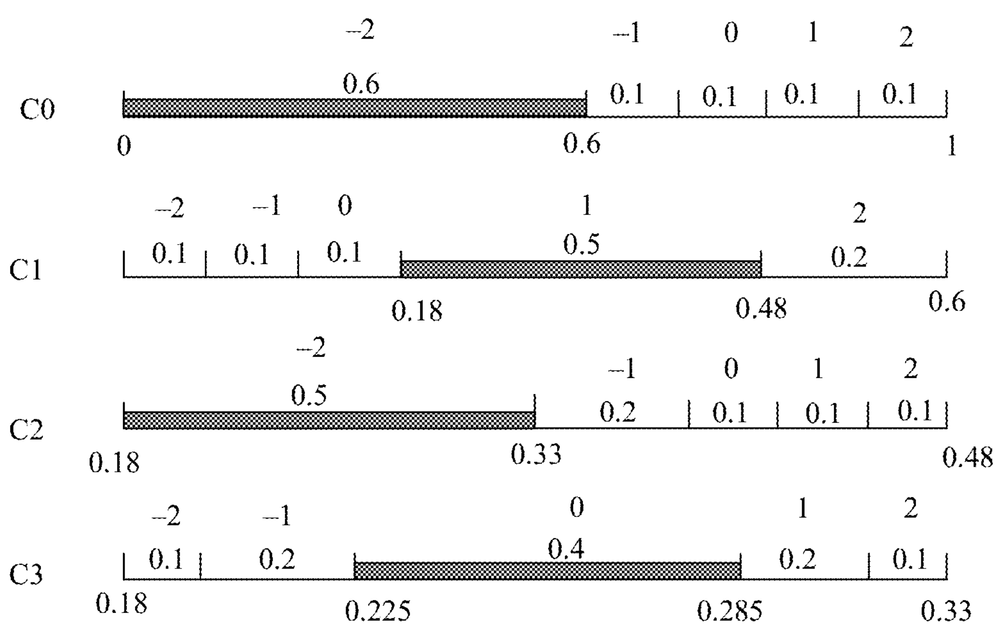
FIG. 7E is a schematic diagram of arithmetic encoding interval division.

The following describes a process of arithmetic entropy encoding:

FIG. 6H is still used as an example. It is assumed that arithmetic entropy encoding needs to be performed on residual values of four samples C0, C1, C2, and C3, which are respectively −2, 1, −2, and 0, and probability distribution of the residual values is shown in Table 1. According to an arithmetic encoding algorithm, based on the probability distribution of the residual values of the samples C0, C1, C2, and C3, an interval from 0 to 1 is divided, and the residual values of the samples C0, C1, C2, and C3 are represented as a spacing between real numbers 0 and 1. A lower boundary of a finally output "current interval" is an encoded code word. A specific process is shown in FIG. 7E, where 0.285 is a last encoded code word. In actual encoding, the value may be fixed to indicate that the code word is written into a bitstream.

Similarly, when the probability distribution is shown in Table 2 or Table 3, arithmetic encoding is performed based on the foregoing similar method.

Figure 8A:
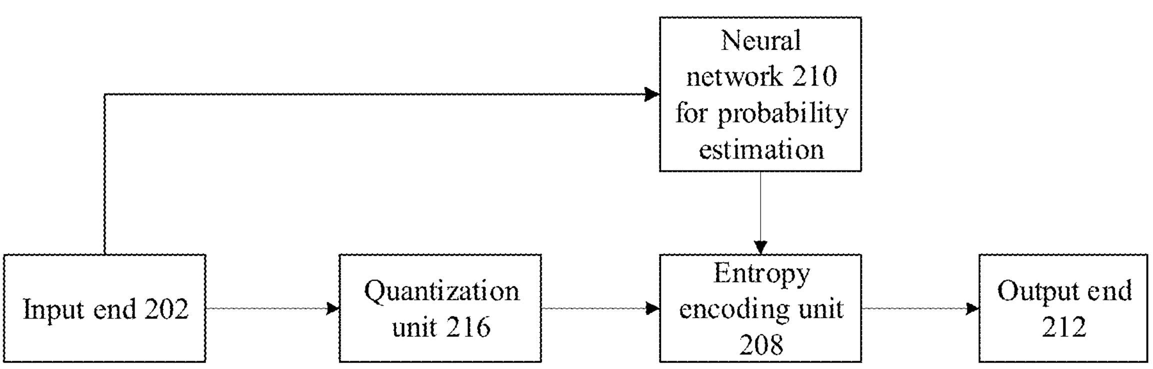
FIG. 8A is a schematic diagram of a structure of another video encoder according to an embodiment of this application.

FIG. 8A is a schematic block diagram of another example of a video encoder used to implement a technology of this application. In an example in FIG. 8A, a video encoder 20 includes an input end (or an input interface) 202, a quantization unit 216, an entropy encoding unit 208, a neural network 210 for probability estimation, and an output end (or an output interface) 212. The video encoder 20 shown in FIG. 8A may also be referred to as an end-to-end video encoder or a video encoder based on an end-to-end video encoder.

The encoder 20 may receive input data 203 by using the input end 202 or the like, and a picture of the input data includes a residual of a current picture and is used as an input to the quantization unit 216.

The input data 203 further includes a residual of a reference picture;

residuals of a plurality of reference pictures;

residuals of a plurality of reference pictures and a prediction of the current picture; or residuals of a plurality of reference pictures, predictions of the plurality of reference pictures, and a prediction of the current picture, as an input to the neural network 210 for probability estimation.

Quantization Unit 216

The quantization unit 216 is configured to quantize the residual of the current picture to obtain a quantized residual of the current picture, and the quantized residual of the current picture is used as an input to the entropy encoding unit 208.

In one embodiment, the quantization may be uniform quantization or non-uniform quantization.

Neural Network 210 for Probability Estimation

For a detailed function of the neural network 210 for probability estimation, refer to related descriptions of the neural network 210 for probability estimation in FIG. 6A. In other words, a function of the neural network 210 for probability estimation in FIG. 8A is the same as a function of the neural network 210 for probability estimation in FIG. 6A. Details are not described herein again.

Entropy Encoding Unit 208

The entropy encoding unit 208 is configured to apply an entropy encoding algorithm or scheme (for example, a VLC scheme, a CALVC scheme, an arithmetic encoding scheme, a binarization algorithm, CABAC, SBAC, PIPE coding, or another entropy encoding method or technology) to a quantized feature map and probability distribution of residual values of a plurality of samples and included in the residual of the current picture, to obtain encoded picture data 21 that can be output in a form of an encoded bitstream 21 through the output end 212, so that the video decoder 30 and the like can receive and use a parameter used for decoding. The encoded bitstream 21 may be transmitted to the video decoder 30, or stored in a memory for later transmission or retrieval by the video decoder 30.

It should be noted herein that for a detailed function of the entropy encoding unit 208, refer to related descriptions of the entropy encoding unit 208 in FIG. 6A. In other words, a function of the entropy encoding unit 208 in FIG. 8A is the same as a function of the entropy encoding unit 208 in FIG. 6A. Details are not described herein again.

Figure 8B:
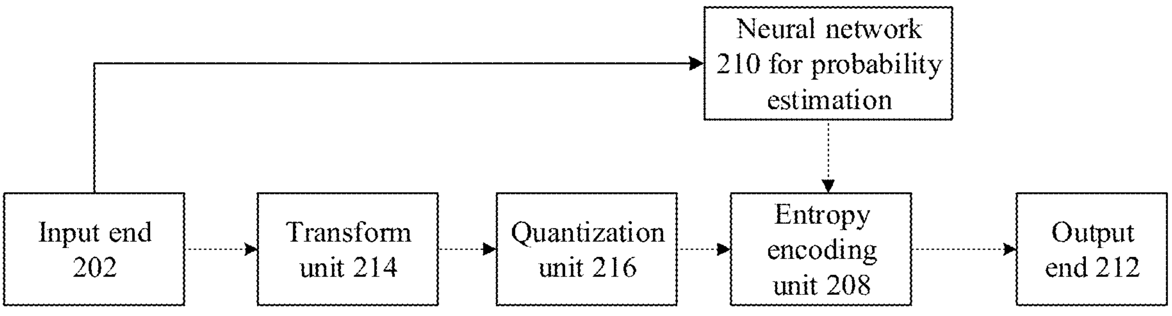
FIG. 8B is a schematic diagram of a structure of another video encoder according to an embodiment of this application.

FIG. 8B is a schematic block diagram of another example of a video encoder used to implement a technology of this application. In an example in FIG. 8B, a video encoder 20 includes an input end (or an input interface) 202, a transform unit 214, a quantization unit 216, an entropy encoding unit 208, a neural network 210 for probability estimation, and an output end (or an output interface) 212. The video encoder 20 shown in FIG. 8B may also be referred to as an end-to-end video encoder or a video encoder based on an end-to-end video encoder.

The encoder 20 may receive input data 203 by using the input end 202 or the like, and a picture of the input data includes a residual of a current picture and is used as an input to the transform unit 214.

The input data 203 further includes a residual of a reference picture;

residuals of a plurality of reference pictures;

residuals of a plurality of reference pictures and a prediction of the current picture; or residuals of a plurality of reference pictures, predictions of the plurality of reference pictures, and a prediction of the current picture, as an input to the neural network 210 for probability estimation.

Transform Unit 214

The transform unit 214 is configured to transform the residual of the current picture to obtain a transformed residual of the current picture, and the transformed residual of the current picture is used as an input to the quantization unit 216.

In one embodiment, the foregoing transformation may be discrete cosine transform (discrete cosine transform, DCT).

In addition, discrete sine transform (discrete sine transform, DST), discrete wavelet transform (discrete wavelet transform, DWT), or the like may be further performed.

Quantization Unit 216

The quantization unit 216 is configured to quantize the transformed residual of the current picture to obtain a transformed and quantized residual of the current picture, and the transformed and quantized residual of the current picture is used as an input to the entropy encoding unit 208.

In one embodiment, the quantization may be uniform quantization or non-uniform quantization.

Neural Network 210 for Probability Estimation

For a detailed function of the neural network 210 for probability estimation, refer to related descriptions of the neural network 210 for probability estimation in FIG. 6A. In other words, a function of the neural network 210 for probability estimation in FIG. 8A is the same as a function of the neural network 210 for probability estimation in FIG. 6A. Details are not described herein again.

Entropy Encoding Unit 208

The entropy encoding unit 208 is configured to apply an entropy encoding algorithm or scheme (for example, a VLC scheme, a CALVC scheme, an arithmetic encoding scheme, a binarization algorithm, CABAC, SBAC, PIPE coding, or another entropy encoding method or technology) to a transformed and quantized feature map and probability distribution of residual values of a plurality of samples and included in the residual of the current picture, to obtain encoded picture data 21 that can be output in a form of an encoded bitstream 21 through the output end 212, so that the video decoder 30 and the like can receive and use a parameter used for decoding. The encoded bitstream 21 may be transmitted to the video decoder 30, or stored in a memory for later transmission or retrieval by the video decoder 30.

It should be noted herein that for a detailed function of the entropy encoding unit 208, refer to related descriptions of the entropy encoding unit 208 in FIG. 6A. In other words, a function of the entropy encoding unit 208 in FIG. 8A is the same as a function of the entropy encoding unit 208 in FIG. 6A. Details are not described herein again.

It should be noted herein that, on an encoder side, except that the residual of the current picture, as an input to the encoder network 204 in FIG. 6A, the quantization unit 216 in FIG. 8A, and the transform unit 214 in FIG. 8B, is a residual obtained by performing a difference operation between original values of the plurality of samples of the current picture and predicted values of the plurality of samples, residuals (including the residual of the current picture and the residual of the reference picture) described in other places are reconstructed residuals. The reconstructed residuals of the picture are a plurality of differences between reconstructed values of the plurality of samples of the picture and predicted values of the plurality of samples.

Decoder and Decoding Method

Figure 9A:
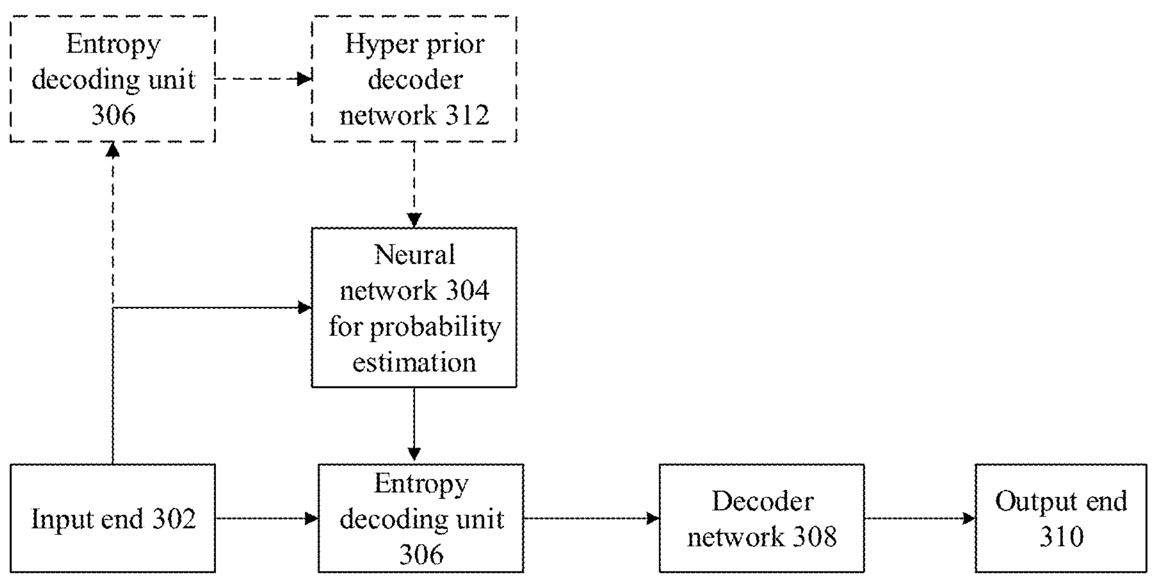
FIG. 9A is a schematic diagram of a structure of a video decoder according to an embodiment of this application.

FIG. 9A is a schematic block diagram of an example of a video decoder used to implement a technology of this application. In an example in FIG. 9A, a video decoder 30 includes an input end (or an input interface) 302, a neural network 304 for probability estimation, an entropy decoding unit 306, a decoder network 308, and an output end (or an output interface) 310. The video decoder 30 shown in FIG. 9A may also be referred to as an end-to-end video decoder or a video decoder based on an end-to-end video decoder.

The decoder 30 may receive input data by using the input end 302 or the like, and the input data includes a bitstream of a current picture and is used as an input to the entropy decoding unit 306.

The input data further includes a residual of a reference picture;

residuals of a plurality of reference pictures;

residuals of a plurality of reference pictures and a prediction of the current picture; or residuals of a plurality of reference pictures, predictions of the plurality of reference pictures, and a prediction of the current picture, as an input to the neural network 304 for probability estimation.

The residual of the current picture is obtained based on a reconstructed value of the current picture and the prediction of the current picture. Specifically, a reconstruction of the current picture includes reconstructed values of a plurality of samples (pixel samples), and the prediction of the current picture includes predicted values of the plurality of samples (pixel samples). The reconstructed values of the samples (pixel samples) in the current picture are obtained by subtracting, one by one, predicted values of samples at corresponding locations in the prediction of the current picture, to obtain the residual of the current picture. Therefore, after the residual of the current picture is obtained, the residual values of the plurality of samples (pixel samples) and included in the residual of the current picture may be added one by one to the predicted values of the plurality of samples (pixel samples) and included in the prediction of the current picture, to obtain the reconstructed values of the current picture.

In an example, the prediction of the current picture is obtained by predicting a reconstructed sample value of the reference picture, or upsampling is performed on a reconstructed sample value of a low-resolution picture of the current picture, to obtain a sampled picture. Resolution of the sampled picture is the same as resolution of the current picture, and the sampled picture is the prediction of the current picture. The low-resolution picture of the current picture is obtained by downsampling the current picture.

Neural Network 304 for Probability Estimation

The neural network 304 for probability estimation is configured to estimate, based on input data, probability distribution of residual values of a plurality of samples and included in a residual of a current picture.

It should be noted herein that for explanations and descriptions of the probability distribution of the residual values of the plurality of samples and included in the residual of the current picture, refer to related descriptions in the embodiment shown in FIG. 6A. Details are not described herein again.

In an example, to improve decoding accuracy, input data of the neural network 304 for probability estimation further includes hyper prior information, and the hyper prior information is used to represent a deeper feature of the residual of the current picture.

It should be noted herein that a function of the neural network 304 for probability estimation is consistent with a function of the neural network 210 for probability estimation on an encoder side. For descriptions of the function of the neural network 304 for probability estimation, refer to related descriptions of the neural network 210 for probability estimation on the encoder side. Details are not described herein again.

In one embodiment, the video decoder 30 further includes a hyper prior decoder network 312. The hyper prior decoder network 312 processes the rounded feature vector, of the hyper prior information, obtained by the entropy decoding unit 306 by performing arithmetic entropy decoding on a hyper prior bitstream, to obtain the hyper prior information. A function of the hyper prior encoder network 218 is opposite to a function of the hyper prior decoder network 312. Therefore, for a network structure of the hyper prior decoder network 312, refer to the network structure of the hyper prior encoder network 218.

The hyper prior information is optional for the neural network 304 for probability estimation, and further, for the video decoder 30, the hyper prior information decoder network 312 is also optional. Therefore, the hyper prior information decoder network 312 is represented by using a dashed box.

Entropy Decoding Unit 306

The entropy decoding unit 306 is configured to apply an entropy decoding algorithm or scheme to a bitstream of the current picture and the probability distribution of the residual values of the plurality of samples and included in the residual of the current picture, to obtain a feature map of the residual of the current picture.

The entropy decoding unit 306 may use a decoding algorithm or scheme corresponding to the encoding scheme of the entropy encoding unit 208 that uses the encoder 20.

Decoder Network 308

The residual of the current picture that can be output through the output end 310 is obtained based on the feature map of the residual of the current picture by using the decoder network 308. Subsequently, the video decoder 30 may obtain a reconstructed sample value of the current picture by using the residual of the current picture, in other words, a reconstruction of the current picture.

Figure 9B:
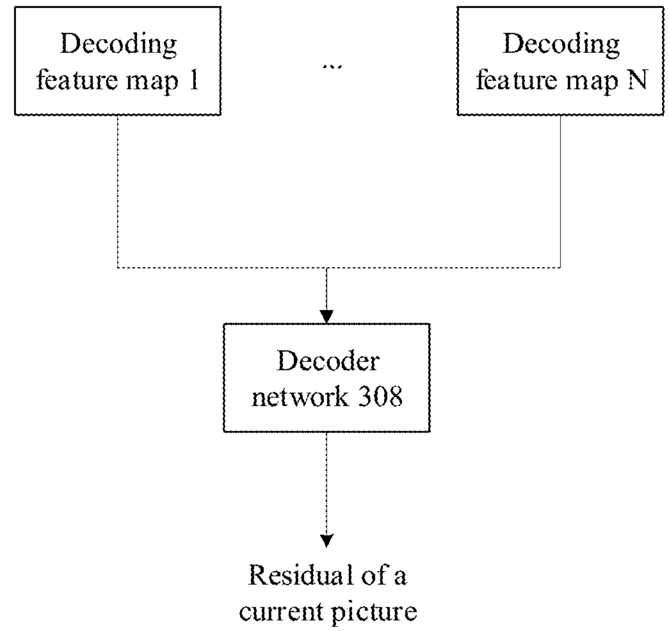
FIG. 9B is a schematic diagram of a function of a decoder network according to an embodiment of this application.

In one embodiment, the feature map of the residual of the current picture is a multi-channel feature map, and the multi-channel feature map includes N decoding feature maps, where N is greater than 1. FIG. 9B is a schematic diagram of inputting N decoding feature maps to a decoder network 308.

Figure 9C:
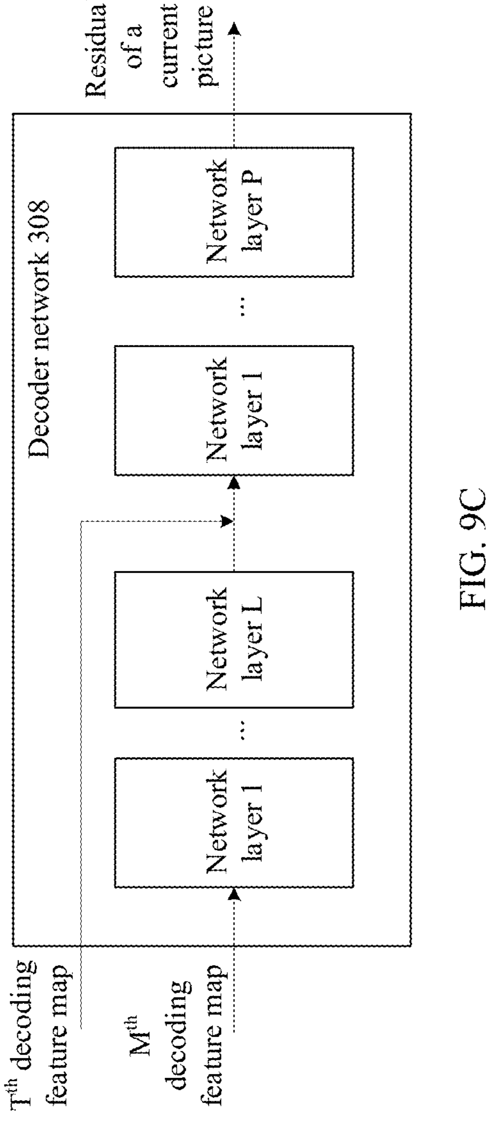
FIG. 9C is a schematic diagram of a structure of a decoder network according to an embodiment of this application.

In a possibility, an input/output structure of the decoder network 308 is shown in FIG. 9C. The decoder network 308 includes P network layers, where P>L, and M, L, T, and P are all positive integers. A $T^{th}$ decoding feature map is input after a network layer L of the decoder network 308308. Both the $T^{th}$ decoding feature map and an $M^{th}$ decoding feature map are inputs to the decoder network. It may be understood that a plurality of decoding feature maps may be used as inputs after different network layer locations in the decoder network 308. This is not limited herein.

Any network layer in FIG. 9C may be a convolutional layer, an inverse normalization layer, a nonlinear activation layer, or the like.

In a possibility, there may be operations including addition, subtraction, and the like in the decoder network 308.

In a possibility, the network layer structures in the decoder network 308 may be the same or different from each other.

Figure 9D:
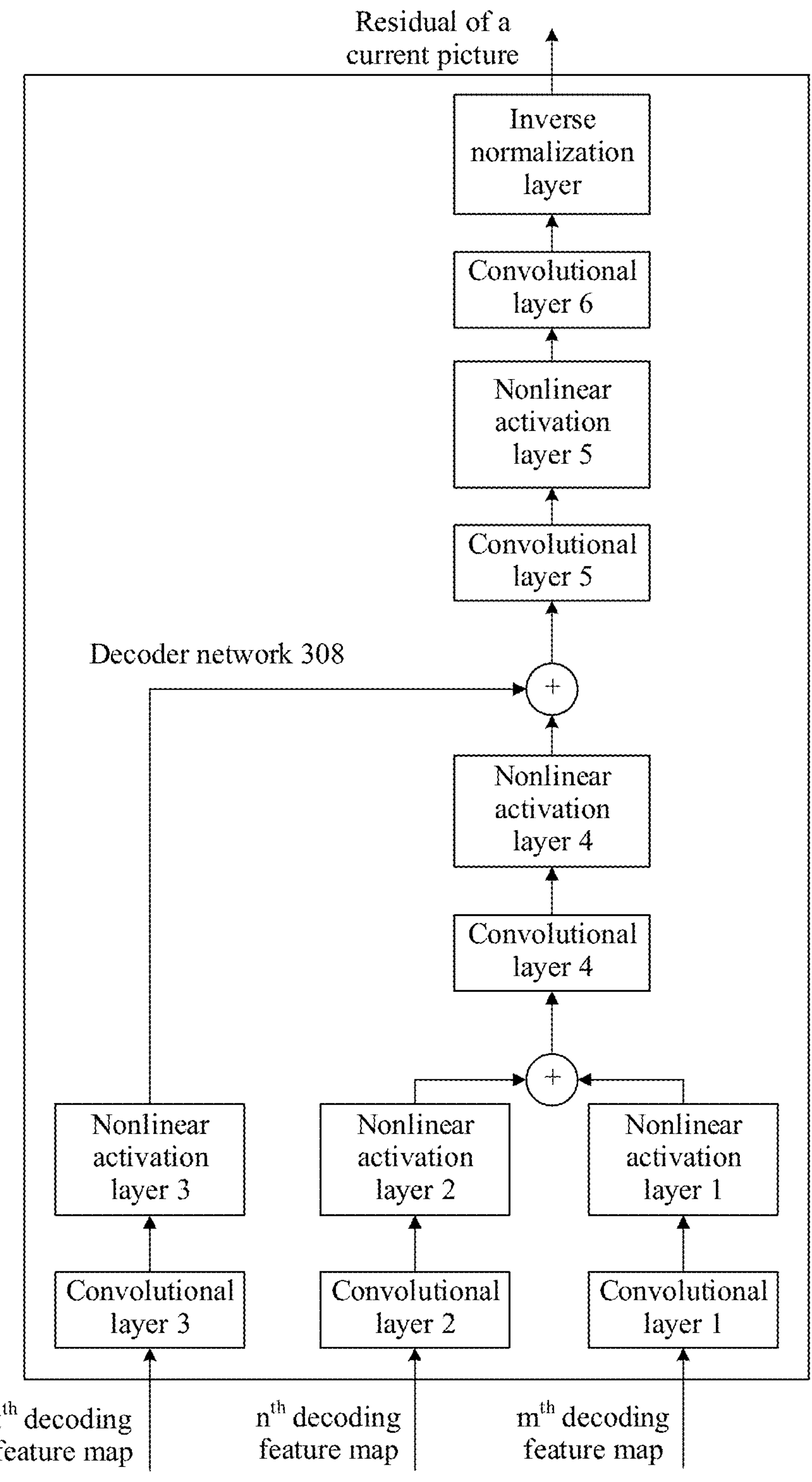
FIG. 9D is a schematic diagram of a structure of another decoder network according to an embodiment of this application.

In a possibility, an example of a structure of the decoder network 308 is shown in FIG. 9D. It can be learned that the decoder network in the example includes 12 network layers, and specifically includes one inverse normalization layer, six convolutional layers, and four nonlinear activation layers. Herein, m, n, and t are all positive integers, and an output of the decoder network 308 is the residual of the current picture. A $t^{th}$ decoding feature map, an $n^{th}$ decoding feature map, and an $m^{th}$ decoding feature map are all inputs to the decoder network, where t, n, and m are all integers.

Figure 9E:
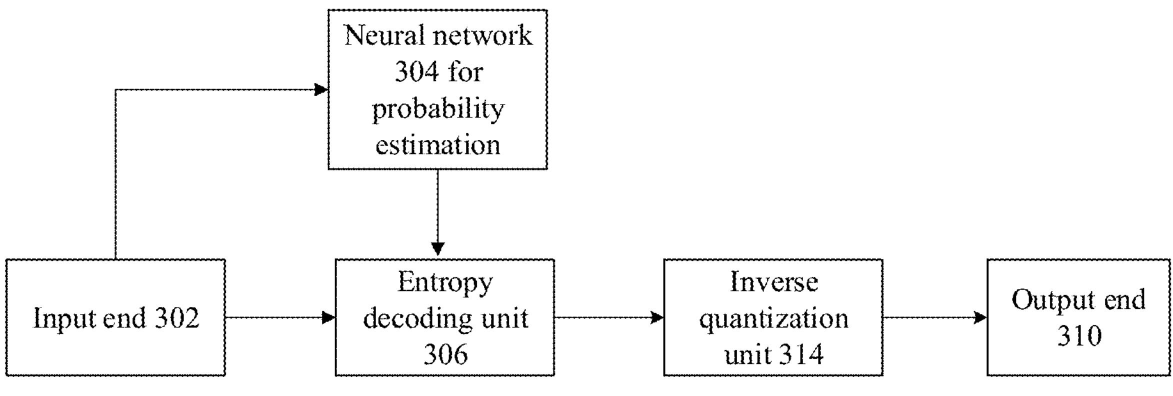
FIG. 9E is a schematic diagram of a structure of another video decoder according to an embodiment of this application.

FIG. 9E is a schematic block diagram of an example of a video decoder used to implement a technology of this application. In an example in FIG. 9E, a video decoder 30 includes an input end (or an input interface) 302, a neural network 304 for probability estimation, an entropy decoding unit 306, an inverse quantization unit 314, and an output end (or an output interface) 310. The video decoder 30 shown in FIG. 9E may also be referred to as an end-to-end video decoder or a video decoder based on an end-to-end video decoder.

The decoder 30 may receive input data by using the input end 302 or the like, and a picture of the input data includes a bitstream of a current picture and is used as an input to the entropy decoding unit 306.

The input data further includes a residual of a reference picture;

- residuals of a plurality of reference pictures;
- residuals of a plurality of reference pictures and a prediction of the current picture; or
- residuals of a plurality of reference pictures, predictions of the plurality of reference pictures, and a prediction of the current picture, as an input to the neural network 304 for probability estimation.

Neural Network 304 for Probability Estimation

For a detailed function of the neural network 304 for probability estimation, refer to related descriptions of the neural network 210 for probability estimation in FIG. 6A. In other words, a function of the neural network 304 for probability estimation in FIG. 9B is the same as a function of the neural network 210 for probability estimation in FIG. 6A. Details are not described herein again.

Entropy Decoding Unit 306

The entropy decoding unit 306 is configured to apply an entropy decoding algorithm or scheme to a bitstream of the current picture and the probability distribution of the residual values of the plurality of samples and included in the residual of the current picture, to obtain a quantized residual of the current picture.

The entropy decoding unit 306 may use a decoding algorithm or scheme corresponding to the encoding scheme of the entropy encoding unit 208 that uses the encoder 20.

Inverse Quantization Unit 314

The inverse quantization unit 314 is configured to perform inverse quantization on the quantized residual of the current picture, to obtain the residual of the current picture that can be output through the output end 310. Subsequently, the video decoder 30 may obtain a reconstructed sample value of the current picture by using the residual of the current picture, in other words, a reconstruction of the current picture.

In one embodiment, the quantization may be uniform quantization or non-uniform quantization.

Figure 9F:
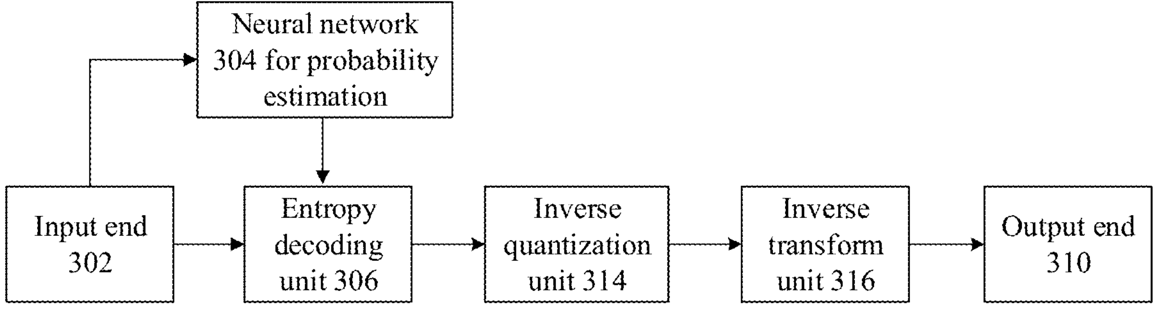
FIG. 9F is a schematic diagram of a structure of another video decoder according to an embodiment of this application.

FIG. 9F is a schematic block diagram of an example of a video decoder used to implement a technology of this application. In an example in FIG. 9F, a video decoder 30 includes an input end (or an input interface) 302, a neural network 304 for probability estimation, an entropy decoding unit 306, an inverse quantization unit 314, an inverse transform unit 316, and an output end (or an output interface) 310. The video decoder 30 shown in FIG. 9F may also be referred to as an end-to-end video decoder or a video decoder based on an end-to-end video decoder.

The decoder 30 may receive input data by using the input end 302 or the like, and a picture of the input data includes a bitstream of a current picture and is used as an input to the entropy decoding unit 306.

The input data further includes a residual of a reference picture;

- residuals of a plurality of reference pictures;
- residuals of a plurality of reference pictures and a prediction of the current picture; or
- residuals of a plurality of reference pictures, predictions of the plurality of reference pictures, and a prediction of the current picture, as an input to the neural network 304 for probability estimation.

Neural Network 304 for Probability Estimation

For a detailed function of the neural network 304 for probability estimation, refer to related descriptions of the neural network 210 for probability estimation in FIG. 6A. In other words, a function of the neural network 304 for probability estimation in FIG. 9B is the same as a function of the neural network 210 for probability estimation in FIG. 6A. Details are not described herein again.

Entropy Decoding Unit 306

The entropy decoding unit 306 is configured to apply an entropy decoding algorithm or scheme to a bitstream of the current picture and the probability distribution of the residual values of the plurality of samples and included in the residual of the current picture, to obtain a transformed and quantized residual of the current picture.

The entropy decoding unit 306 may use a decoding algorithm or scheme corresponding to the encoding scheme of the entropy encoding unit 208 that uses the encoder 20.

Inverse Quantization Unit 314

The inverse quantization unit 314 is configured to perform inverse quantization on the transformed and quantized residual of the current picture, and obtain a transformed residual of the current picture.

In one embodiment, the quantization may be uniform quantization or non-uniform quantization.

Inverse Transform Unit 316

The inverse transform unit 316 is configured to perform inverse transformation on the transformed residual of the current picture, to obtain the residual of the current picture that can be output through the output end 310. Subsequently, the video decoder 30 may obtain a reconstructed sample value of the current picture by using the residual of the current picture, in other words, a reconstruction of the current picture.

The foregoing transformation may be DCT. In addition, DST, DWT, or the like may be further performed.

It should be understood that, in the encoder 20 and the decoder 30, a processing result of a current operation may be further processed and then output to the next operation. For example, after the encoder 20 and the decoder 30, a further operation or processing, for example, a clip (clip) operation or a shift (shift) operation or filtering processing, may be performed on processing results of the encoder 20 and the decoder 30.

It should be noted herein that all residuals on a decoder side are reconstructed residuals, and the reconstructed residuals are a plurality of differences between reconstructed values of the plurality of samples of the picture and predicted values of the plurality of samples. The reconstructed residual may also be referred to as a reconstructed residual signal.

Figure 10:
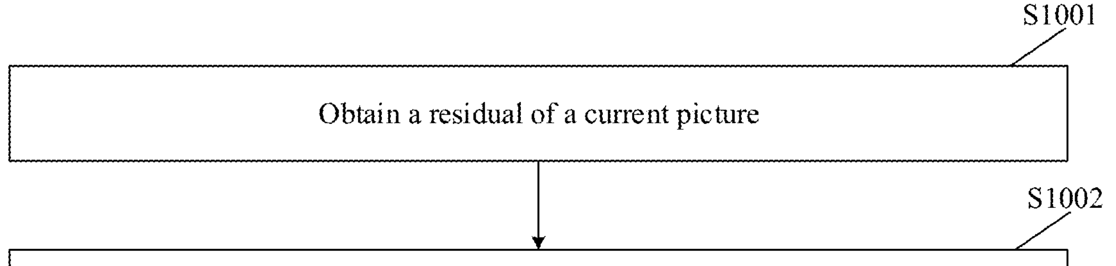
FIG. 10 is a flowchart of a process 1000 of an encoding method according to an embodiment of this application.

FIG. 10 is a flowchart of a process 1000 of an encoding method according to an embodiment of this application. The process 1000 may be performed by a video encoder 20. The process 1000 is described as a series of operations or operations. It should be understood that the operations or operations of the process 1000 may be performed in various sequences and/or may be performed simultaneously, and are not limited to an execution sequence shown in FIG. 10.

As shown in FIG. 10, the encoding method includes the following operations.

S1001: Obtain a residual of a current picture.

The current picture includes a plurality of samples, and the residual of the current picture is differences between original values of the plurality of samples included in the current picture and predicted values.

Specifically, the obtaining a residual of a current picture includes: performing a difference operation on the original values of the plurality of samples of the current picture and the predicted values of the plurality of samples of the current picture one by one to obtain residual values of the plurality of samples of the current picture, where the residual of the current picture includes the residual values of the plurality of samples, and resolution of the current picture is the same as resolution of a prediction of the current picture.

It should be noted herein that the prediction of the current picture includes the predicted values of the plurality of samples of the current picture. For a process of determining the prediction of the current picture, refer to related descriptions in FIG. 6B and FIG. 6C. Details are not described herein again.

In one embodiment, the current picture and the reference picture are consecutive frames, or may be nonconsecutive frames. For example, a difference between a timestamp of the current picture and a timestamp of an encoded picture is a preset threshold. The low-resolution picture of the current picture may be obtained by performing downsampling on the current picture. The timestamp of the picture may be a moment at which the picture is collected.

S1002: Perform probability estimation on input data by using a neural network, to obtain probability distribution of residual values of the plurality of samples and included in the residual of the current picture, where the input data includes at least a residual of a reference picture, and the reference picture is an encoded picture obtained before the current picture is encoded.

In one embodiment, the neural network is a neural network obtained through training, and the method in this implementation further includes:

obtaining the input data for the training, where the input data for the training includes an encoded picture obtained before a sample picture is encoded, and the sample picture is a known encoded picture; performing, by using the neural network, probability estimation on the input data for the training, to obtain estimated probability distribution of residual values of a plurality of samples and included in a residual of the sample picture; obtaining a loss value based on known probability distribution of the residual values of the plurality of samples and included in the residual of the sample picture and the estimated probability distribution; and when the loss value converges to a first threshold, or a current quantity of training times of the neural network is greater than or equal to a second threshold, determining that a current neural network is a corresponding neural network obtained after the training of the neural network is completed.

The input data for the training includes:

residual values of a plurality of samples and included in a residual of a first reference picture;

residual values of a plurality of samples and included in a residual of the first reference picture and residual values of a plurality of samples and included in a residual of a second reference picture;

predicted values of a plurality of samples and included in a prediction of the sample picture, residual values of a plurality of samples and included in a residual of the first reference picture, and predicted values of a plurality of samples and included in a prediction of the first reference picture; or predicted values of a plurality of samples and included in a prediction of the sample picture, residual values of a plurality of samples and included in a residual of the first reference picture, predicted values of a plurality of samples and included in a prediction of the first reference picture, predicted values of a plurality of samples and included in a prediction of a second reference picture, and residual values of a plurality of samples and included in a residual of the second reference picture, where the first reference picture and the second reference picture are encoded pictures obtained before the sample picture is encoded.

In one embodiment, the probability distribution represents probability distribution of a plurality of differences between original values of a plurality of samples included in the current picture and predicted values of the plurality of samples, represents probability distribution of residual values of all sample points in a plurality of samples of the current picture, or represents probability distribution corresponding to residual values of a plurality of samples of the current picture.

In one embodiment, the first entropy encoding data includes the residual of the current picture, or a feature map of the residual of the current picture, or a transformed and quantized residual of the current picture.

In one embodiment, when the first entropy encoding data is the feature map of the residual of the current picture, the method in this implementation further includes: performing feature extraction on the residual of the current picture by using the encoder network, to obtain the feature map of the residual of the current picture.

It should be noted herein that, for specific structural functions of the foregoing encoder network, refer to related descriptions of FIG. 6D, FIG. 6E, FIG. 6F, and FIG. 6G. Details are not described herein again.

In one embodiment, when the first entropy encoding data is the transformed and quantized residual of the current picture, the method in this implementation further includes:

transforming and quantizing the residual of the current picture to obtain a transformed and quantized residual of the current picture. The transformation may be DCT, DST, DWT, or another transformation; and the quantization may be uniform quantization, non-uniform quantization, or another quantization.

Figure 11A:
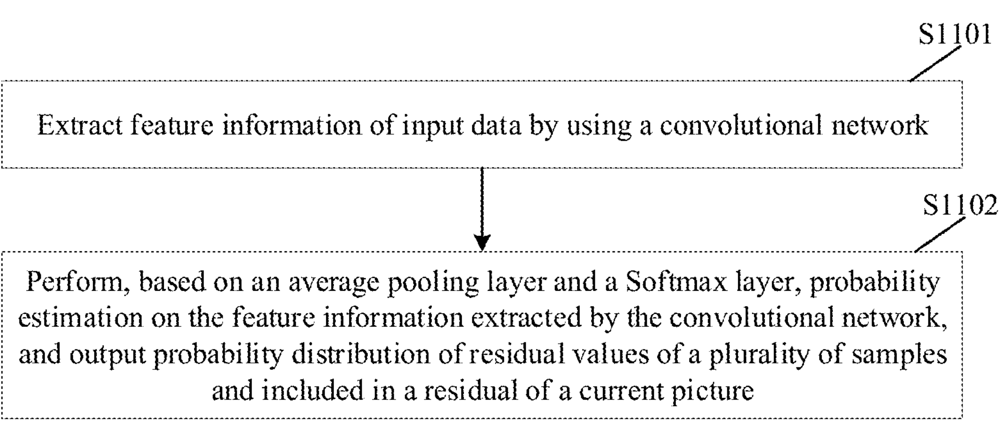
FIG. 11A is a flowchart of a probability distribution estimation process according to this application.

In one embodiment, the neural network includes a convolutional network, an average pooling layer, and a Softmax layer, and the convolutional network includes a plurality of convolutional layers and a ReLU layer. As shown in FIG. 11A, the performing probability estimation on input data by using a neural network, to obtain probability distribution of residual values of the plurality of samples of the current picture includes the following operations:

S1101: Extract feature information of the input data by using the convolutional network.

The input data includes the residual of the reference picture;

the residual of the reference picture, a prediction of the reference picture, and a prediction of the current picture;

residuals of a plurality of reference pictures; or residuals of a plurality of reference pictures, predictions of the plurality of reference pictures, and the prediction of the current picture.

The prediction of the reference picture is obtained by performing prediction based on a reconstructed sample value of an encoded picture obtained before the reference picture, or upsampling is performed on a reconstructed sample value of a low-resolution picture of the reference picture, to obtain a sampled picture. Resolution of the sampled picture is the same as resolution of the reference picture, and the sampled picture is the prediction of the reference picture. The low-resolution picture of the reference picture may be obtained by performing downsampling on the reference picture.

S1102: Perform, based on the average pooling layer and the Softmax layer, probability estimation on the feature information extracted by the convolutional network, and output the probability distribution of the residual values of the plurality of samples and included in the residual of the current picture.

Figure 11B:
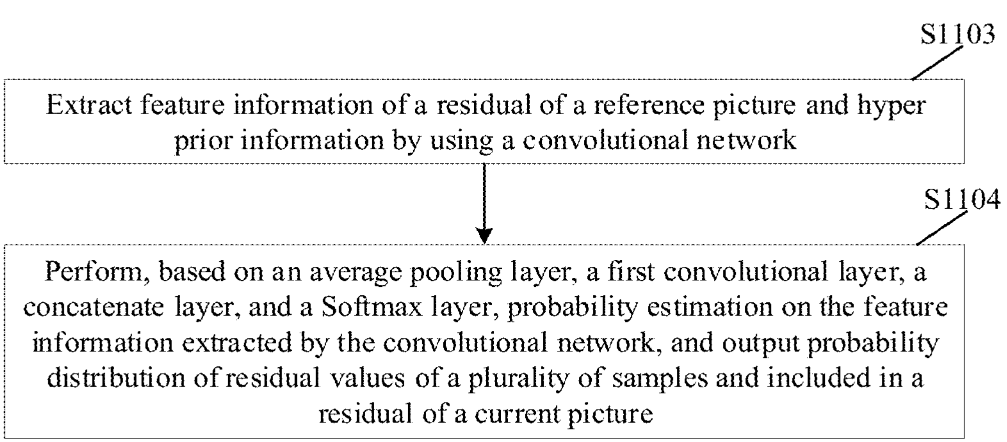
FIG. 11B is a flowchart of a probability distribution estimation process according to this application.

In one embodiment, when the feature map of the residual of the current picture is encoded, to improve encoding precision, the hyper prior information is introduced when the probability distribution of the residual values of the plurality of samples and included in the residual of the current picture is calculated. The neural network includes a convolutional network, an average pooling layer, a first convolutional layer, a concatenate layer, and a Softmax layer, and the convolutional network includes a plurality of convolutional layers and a ReLU layer. As shown in FIG. 11B, the performing probability estimation on input data by using a neural network, to obtain probability distribution of residual values of the plurality of samples of the current picture includes the following operations:

S1103: Extract feature information of the residual of the reference picture and the hyper prior information by using the convolutional network.

The convolutional neural network separately extracts the feature information of the residual of the reference picture and the feature information of the hyper prior information.

S1104: Perform, based on the average pooling layer, the first convolutional layer, the concatenate layer, and the Softmax layer, probability estimation on the feature information extracted by the convolutional network, and output the probability distribution of the residual values of the plurality of samples and included in the residual of the current picture.

It should be noted herein that, for a specific process of processing the input data by using the neural network, refer to the descriptions of the function of the neural network 210 for probability estimation. Details are not described herein again.

In one embodiment, the hyper prior information is obtained in the following manner:

The feature map of the residual of the current picture is input to the hyper prior encoder network for feature extraction, to obtain a feature vector of the hyper prior information; the feature vector of the hyper prior information is rounded to obtain a rounded feature vector of the hyper prior information; and the rounded feature vector of the hyper prior information is input to the hyper prior decoder network for processing, to obtain the hyper prior information.

A function of the hyper prior encoder network is opposite to a function of the hyper prior decoder network.

To enable a decoder side to obtain the hyper prior information, after the feature vector of the rounded hyper prior information is obtained, arithmetic entropy encoding is performed on the rounded feature vector of the hyper prior information, to obtain a hyper prior bitstream.

S1003: Perform arithmetic entropy encoding on first entropy encoding data based on the probability distribution of the residual values of the plurality of samples and included in the residual of the current picture, to obtain a bitstream of the current picture, where the first entropy data represents the residual of the current picture.

It can be learned that, in this embodiment of this application, there is a correlation between the residual of the current picture and the residual of the reference picture. Therefore, data that includes at least the residual of the reference picture is input to the neural network, to obtain the probability distribution of the residual values of the plurality of samples and included in the residual of the current picture. The first entropy data that represents the residual of the current picture is encoded by using the probability distribution, thereby improving encoding accuracy. When the probability distribution of the residual values of the plurality of samples and included in the residual of the current picture is determined, the hyper prior information is introduced, so that a more precise probability distribution of the residual values of the plurality of samples and included in the residual of the current picture can be obtained, thereby improving encoding precision.

FIG. 12 is a flowchart of a process 1200 of a decoding method according to an embodiment of this application. The process 1200 may be performed by a video decoder 30. The process 1200 is described as a series of operations or operations. It should be understood that the operations or operations of the process 1200 may be performed in various sequences and/or may be performed simultaneously, and are not limited to an execution sequence shown in FIG. 12.

As shown in FIG. 12, the decoding method includes the following operations.

S1201: Receive a bitstream of a current picture.

S1202: Perform probability estimation on input data by using a neural network, to obtain probability distribution of residual values of a plurality of samples and included in a residual of the current picture, where the input data includes at least a residual of a reference picture, and the reference picture is a decoded picture obtained before the current picture is decoded.

The residual of the reference picture includes a plurality of samples, and the residual of the reference picture includes a plurality of differences between reconstructed values of the plurality of samples and predicted values of the plurality of samples.

The prediction of the reference picture includes the predicted values of the plurality of samples. The residual of the reference picture is obtained by predicting the reference picture based on a reconstructed sample value of a decoded picture obtained before the reference picture, or is obtained by performing upsampling on a reconstructed sample value of a low-resolution picture of the reference picture, to obtain a sampled picture. Resolution of the sampled picture is the same as resolution of the reference picture, and the sampled picture is the prediction of the reference picture. The low-resolution picture of the reference picture may be obtained by performing downsampling on the reference picture.

In one embodiment, a first picture and the current picture may be consecutive frames, or may be nonconsecutive frames. For example, the first picture is an $(n-1)^{th}$ picture frame, and the current picture is an $n^{th}$ picture frame; or the first picture is an $(n-2)^{th}$ picture frame, and the current picture is an $n^{th}$ picture frame. For another example, a difference between a timestamp of the current picture and a timestamp of an encoded picture is a preset threshold. The low-resolution picture of the current picture may be obtained by performing downsampling on the current picture. The timestamp of the picture may be a moment at which the picture is collected.

In one embodiment, the neural network is a neural network obtained through training, and the method in this embodiment further includes:

obtaining the input data for the training, where the input data for the training includes a decoded picture obtained before a sample picture is decoded, and the sample picture is a known decoded picture; performing, by using the neural network, probability estimation on the input data for the training, to obtain estimated probability distribution of residual values of a plurality of samples and included in a residual of the sample picture; obtaining a loss value based on known probability distribution of the residual values of the plurality of samples and included in the residual of the sample picture and the estimated probability distribution; and when the loss value converges to a first threshold, or a current quantity of training times of the neural network is greater than or equal to a second threshold, determining that a current neural network is a corresponding neural network obtained after the training of the neural network is completed.

The input data for the training includes: residual values of a plurality of samples and included in a residual of a first reference picture;

residual values of a plurality of samples and included in a residual of the first reference picture and residual values of a plurality of samples and included in a residual of a second reference picture;

predicted values of a plurality of samples and included in a prediction of the sample picture, residual values of a plurality of samples and included in a residual of the first reference picture, and predicted values of a plurality of samples and included in a prediction of the first reference picture; or predicted values of a plurality of samples and included in a prediction of the sample picture, residual values of a plurality of samples and included in a residual of the first reference picture, predicted values of a plurality of samples and included in a prediction of the first reference picture, predicted values of a plurality of samples and included in a prediction of a second reference picture, and residual values of a plurality of samples and included in a residual of the second reference picture, where the first reference picture and the second reference picture are decoded pictures obtained before the sample picture is decoded. For a specific training process, refer to the foregoing manner.

In one embodiment, the probability distribution represents probability distribution of a plurality of differences between original values of a plurality of samples included in the current picture and predicted values of the plurality of samples, represents probability distribution of residual values of all sample points in a plurality of samples of the current picture, or represents probability distribution corresponding to residual values of a plurality of samples of the current picture.

In one embodiment, the neural network includes a convolutional network, an average pooling layer, and a Softmax layer, and the convolutional network includes a plurality of convolutional layers and a ReLU layer. As shown in FIG. 12A, the performing probability estimation on input data by using a neural network, to obtain probability distribution of residual values of the plurality of samples of the current picture includes the following operations:

S1201*a*: Extract feature information of the input data by using the convolutional network.

The input data includes the residual of the reference picture;

the residual of the reference picture, a prediction of the reference picture, and a prediction of the current picture;

residuals of a plurality of reference pictures; or residuals of a plurality of reference pictures, predictions of the plurality of reference pictures, and the prediction of the current picture.

The prediction of the reference picture is obtained by performing prediction based on a reconstructed sample value of a decoded picture obtained before the reference picture, or upsampling is performed on a reconstructed sample value of a low-resolution picture of the reference picture, to obtain a sampled picture. Resolution of the sampled picture is the same as resolution of the reference picture, and the sampled picture is the prediction of the reference picture. The low-resolution picture of the reference picture may be obtained by performing downsampling on the reference picture.

S1202*a*: Perform, based on the average pooling layer and the Softmax layer, probability estimation on the feature information extracted by the convolutional network, and output the probability distribution of the residual values of the plurality of samples and included in the residual of the current picture.

Figure 12B:
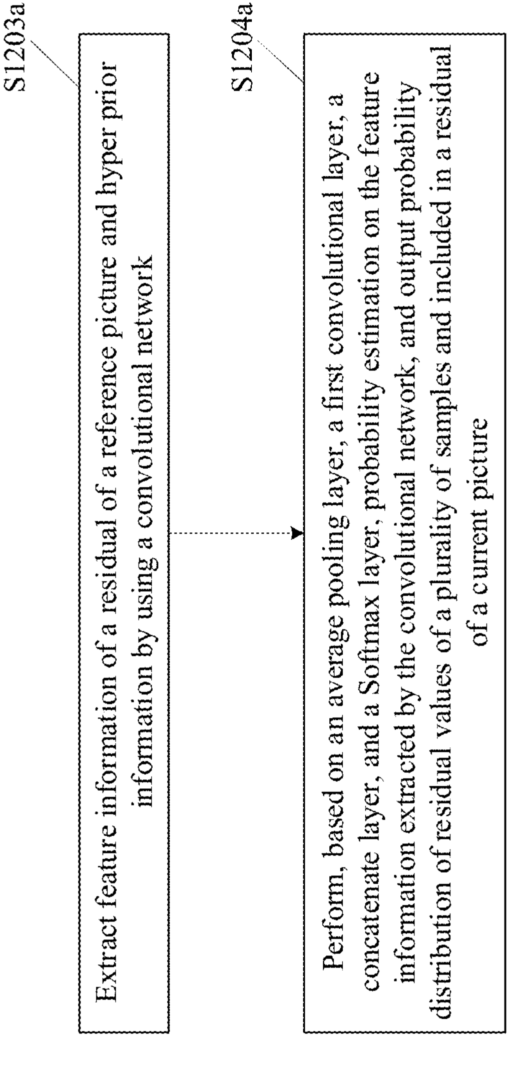
FIG. 12B is a flowchart of a probability distribution estimation process according to this application.

In one embodiment, when the feature map of the residual of the current picture is decoded, to improve decoding precision, the hyper prior information is introduced when the probability distribution of the residual values of the plurality of samples and included in the residual of the current picture is calculated. The neural network includes a convolutional network, an average pooling layer, a first convolutional layer, a concatenate layer, and a Softmax layer, and the convolutional network includes a plurality of convolutional layers and a ReLU layer. As shown in FIG. 12B, the performing probability estimation on input data by using a neural network, to obtain probability distribution of residual values of the plurality of samples of the current picture includes the following operations:

S1203*a*: Extract feature information of the residual of the reference picture and the hyper prior information by using the convolutional network.

The convolutional neural network separately extracts the feature information of the residual of the reference picture and the feature information of the hyper prior information.

S1204*a*: Perform, based on the average pooling layer, the first convolutional layer, the concatenate layer, and the Softmax layer, probability estimation on the feature information extracted by the convolutional network, and output the probability distribution of the residual values of the plurality of samples and included in the residual of the current picture.

It should be noted herein that, for a specific process of processing the input data by using the neural network, refer to the descriptions of the function of the neural network 210 for probability estimation. Details are not described herein again.

In one embodiment, the hyper prior information is obtained in the following manner:

Arithmetic entropy decoding is performed on the hyper prior bitstream to obtain a rounded feature vector of the hyper prior information, and then the rounded feature vector of the hyper prior information is processed by using a hyper prior decoder network, to obtain the hyper prior information. A function of the hyper prior encoder network is opposite to a function of the hyper prior decoder network.

S1203: Perform arithmetic entropy decoding on the bitstream based on the probability distribution of the residual values of the plurality of samples and included in the residual of the current picture, to obtain first entropy decoding data, where the first entropy decoding data represents the residual of the current picture; and obtain a reconstructed sample value of the current picture based on the residual of the current picture.

It should be noted that the first entropy decoding data may be partial entropy decoding data obtained by decoding the bitstream. Therefore, the bitstream may not only have residual data, but also may have other entropy decoding data obtained by performing entropy decoding on the bitstream. Therefore, "first" is added as a definition.

In one embodiment, the first entropy decoding data includes the residual of the current picture, or a feature map of the residual of the current picture, or a transformed and quantized residual of the current picture.

In one embodiment, when the first entropy decoding data is the feature map of the residual of the current picture, the method in this implementation further includes: obtaining the residual of the current picture based on the feature map of the residual of the current picture by using the decoder network.

It should be noted herein that a function of the decoder network is opposite to a function of the encoder network. Therefore, for a structure of the decoder network, refer to the structure of the encoder network shown in FIG. 6D, FIG. 6E, FIG. 6F, and FIG. 6G. Details are not described herein again.

In one embodiment, when the first entropy decoding data is the transformed and quantized residual of the current picture, the method in this implementation further includes:

performing inverse quantization and inverse transformation on the transformed and quantized residual of the current picture, to obtain the residual of the current picture. The inverse transformation may be inverse DCT, inverse DST, inverse DWT, or another inverse transformation; and the inverse quantization may be uniform inverse quantization, non-uniform inverse quantization, or another inverse quantization.

It should be noted herein that arithmetic entropy decoding and arithmetic entropy encoding are a pair of inverse processes. For the arithmetic entropy decoding process, refer to the foregoing entropy encoding process. Details are not described herein again.

It can be learned that, in this embodiment of this application, there is a correlation between the residual of the current picture and the residual of the reference picture. Therefore, data that includes at least the residual of the reference picture is input to the neural network, to obtain the probability distribution of the residual values of the plurality of samples and included in the residual of the current picture. The first entropy data that represents the residual of the current picture is decoded by using the probability distribution, thereby improving decoding accuracy. When the probability distribution of the residual values of the plurality of samples and included in the residual of the current picture is determined, the hyper prior information is introduced, so that a more precise probability distribution of the residual values of the plurality of samples and included in the residual of the current picture can be obtained, thereby improving decoding precision.

The following comprehensively describes an encoding process and a decoding process with reference to the accompanying drawings.

Figure 13:
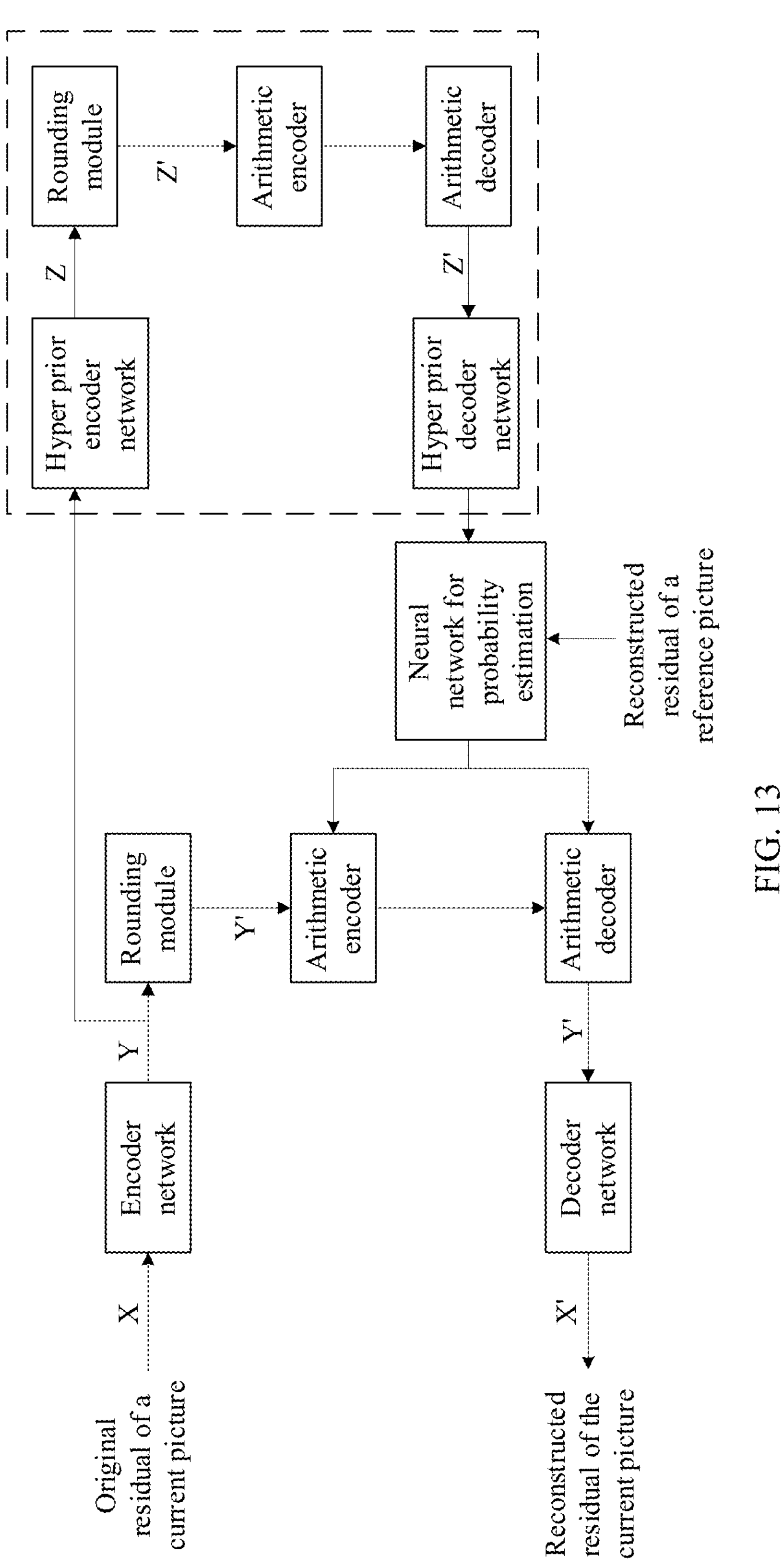
FIG. 13 is a schematic diagram of an encoding and decoding process according to an embodiment of this application.

FIG. 13 is a schematic diagram of an encoding and decoding process according to an embodiment of this application. As shown in FIG. 13, an encoding apparatus obtains an original residual of a current picture. The original residual of the current picture is a plurality of differences between original values of a plurality of samples included in the current picture and predicted values of the plurality of samples. For a specific process of the original residual of the current picture, refer to the foregoing related descriptions. Details are not described herein again. The encoding apparatus performs feature extraction on the original residual of the current picture by using an encoder network, to obtain a feature map Y of the original residual of the current picture. The feature map Y of the residual is processed by a rounding module to obtain a rounded feature map Y'. The encoding apparatus performs, based on probability distribution of residual values of the plurality of samples and included in the residual of the current picture, arithmetic entropy encoding on the rounded feature map Y' by using an arithmetic encoder, to obtain a bitstream of the current picture. Before this, the encoding apparatus inputs a reconstructed residual of a reference picture to a neural network for probability estimation, to obtain the probability distribution of the residual values of the plurality of samples and included in the residual of the current picture. It should be noted that the residual of the current picture in this embodiment is the original residual of the current picture. The reconstructed residual of the reference picture is a plurality of differences between reconstructed values of a plurality of samples included in the reference picture and predicted values of the plurality of samples.

In one embodiment, the encoding apparatus inputs the reconstructed residual of the reference picture and hyper prior information to the neural network (that is, the foregoing neural network) for probability estimation, to obtain the probability distribution of residual values of the plurality of samples and included in the residual of the current picture. Before this, the encoding apparatus performs, by using a hyper prior encoder network, hyper prior feature extraction on the feature map of the residual of the current picture, to obtain a feature vector Z of the hyper prior information. The feature vector Z of the hyper prior information is rounded to obtain a rounded feature vector Z' of the hyper prior information. Then, the encoding apparatus processes the rounded feature vector of the hyper prior information by using a hyper prior decoder network, to obtain the hyper prior information of the current picture.

To facilitate a decoding apparatus in using the hyper prior information during decoding, the encoding apparatus uses an arithmetic encoder to encode the rounded feature vector of the hyper prior information, to obtain a bitstream of the hyper prior information.

The decoding apparatus inputs the reconstructed residual of the reference picture to the neural network (namely, the foregoing neural network) for probability estimation for processing, to obtain the probability distribution of the residual values of the plurality of samples and included in the reconstructed residual of the current picture. After the bitstream of the current picture is obtained, the decoding apparatus performs arithmetic entropy decoding on the bitstream of the current picture by using an arithmetic decoder based on the probability distribution of the residual values of the plurality of samples and included in the reconstructed residual of the current picture, to obtain a feature map of the reconstructed residual of the current picture. The feature map of the reconstructed residual of the current picture is processed by using the decoder network, to obtain the reconstructed residual of the current picture.

In one embodiment, the decoding apparatus decodes the bitstream of the hyper prior information by using the arithmetic decoder, to obtain the feature vector of the hyper prior information, processes the feature vector of the hyper prior information by using the hyper prior decoder network, to obtain the hyper prior information, and inputs the hyper prior information and the reconstructed residual of the reference frame picture to the neural network for probability estimation for processing, to obtain the probability distribution of the residual values of the plurality of samples and included in the residual of the current picture.

Figure 14:
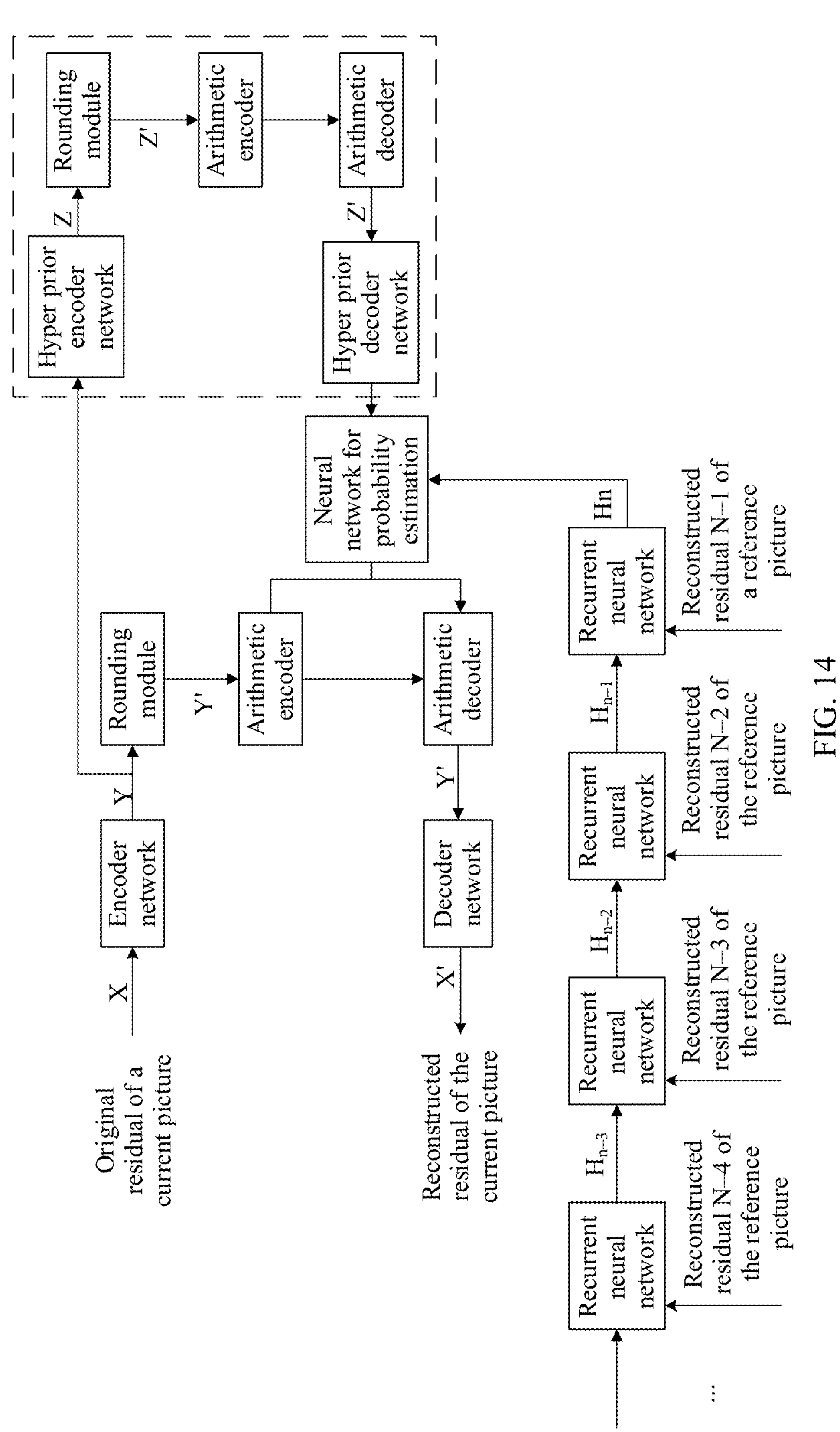
FIG. 14 is a schematic diagram of another encoding and decoding process according to an embodiment of this application.

FIG. 14 is a schematic diagram of another encoding and decoding process according to an embodiment of this application. As shown in FIG. 14, an encoding apparatus obtains an original residual of a current picture. The original residual of the current picture is a plurality of differences between original values of a plurality of samples included in the current picture and predicted values of the plurality of samples. For a specific process of the original residual of the current picture, refer to the foregoing related descriptions. Details are not described herein again. The encoding apparatus performs feature extraction on the residual of the current picture by using an encoder network, to obtain a feature map Y of the residual ResiPicN of the current picture. The feature map of the residual of the current picture is processed by a rounding module to obtain a rounded feature map Y'. The encoding apparatus performs, based on probability distribution of residual values of the plurality of samples and included in the residual of the current picture, arithmetic entropy encoding on the rounded feature map Y' by using an arithmetic encoder, to obtain a bitstream of the current picture. Before this, the encoding apparatus obtains latent information Hn based on the reconstructed residuals of the plurality of reference pictures by using a recurrent neural network. For a specific process, refer to related descriptions in the foregoing embodiment. Details are not described herein again. The encoding apparatus inputs the latent information Hn to the neural network (namely, the foregoing neural network) for probability estimation, to obtain the probability distribution of the residual values of the plurality of samples and included in the residual of the current picture. It should be noted that the residual of the current picture in this embodiment is the original residual of the current picture. The reconstructed residual of the reference picture is a plurality of differences between reconstructed values of a plurality of samples included in the reference picture and predicted values of the plurality of samples.

In one embodiment, the encoding apparatus inputs the latent information Hn and hyper prior information to the neural network for probability estimation, to obtain the probability distribution of residual values of the plurality of samples and included in the residual of the current picture. Before this, the encoding apparatus performs, by using a hyper prior encoder network, hyper prior feature extraction on the feature map of the residual of the current picture, to obtain a feature vector Z of the hyper prior information. The feature vector Z of the hyper prior information is rounded to obtain a rounded feature vector Z' of the hyper prior information. Then, the encoding apparatus processes the rounded feature vector of the hyper prior information by using a hyper prior decoder network, to obtain the hyper prior information of the current picture.

To facilitate a decoding apparatus in using the hyper prior information during decoding, the encoding apparatus uses an arithmetic encoder to encode the rounded feature vector of the hyper prior information, to obtain a bitstream of the hyper prior information.

The decoding apparatus obtains the latent information Hn based on the reconstructed residuals of the plurality of reference pictures by using the recurrent neural network. For a specific process, refer to related descriptions in the foregoing embodiment. Details are not described herein again. The latent information Hn is input to the neural network for probability estimation for processing, to obtain the probability distribution of the residual values of the plurality of samples and included in the reconstructed residual of the current picture. After the bitstream of the current picture is obtained, the decoding apparatus performs arithmetic entropy decoding on the bitstream of the current picture by using an arithmetic decoder based on the probability distribution of the residual values of the plurality of samples and included in the reconstructed residual of the current picture, to obtain a feature map of the reconstructed residual of the current picture. The feature map of the reconstructed residual of the current picture is processed by using the decoder network, to obtain the reconstructed residual of the current picture.

In one embodiment, the decoding apparatus decodes the bitstream of the hyper prior information by using the arithmetic decoder, to obtain the rounded feature vector of the hyper prior information, processes the rounded feature vector of the hyper prior information by using the hyper prior decoder network, to obtain the hyper prior information, and inputs the hyper prior information and the latent information Hn to the neural network for probability estimation for processing, to obtain the probability distribution of the residual values of the plurality of samples and included in the residual of the current picture.

Figure 15:
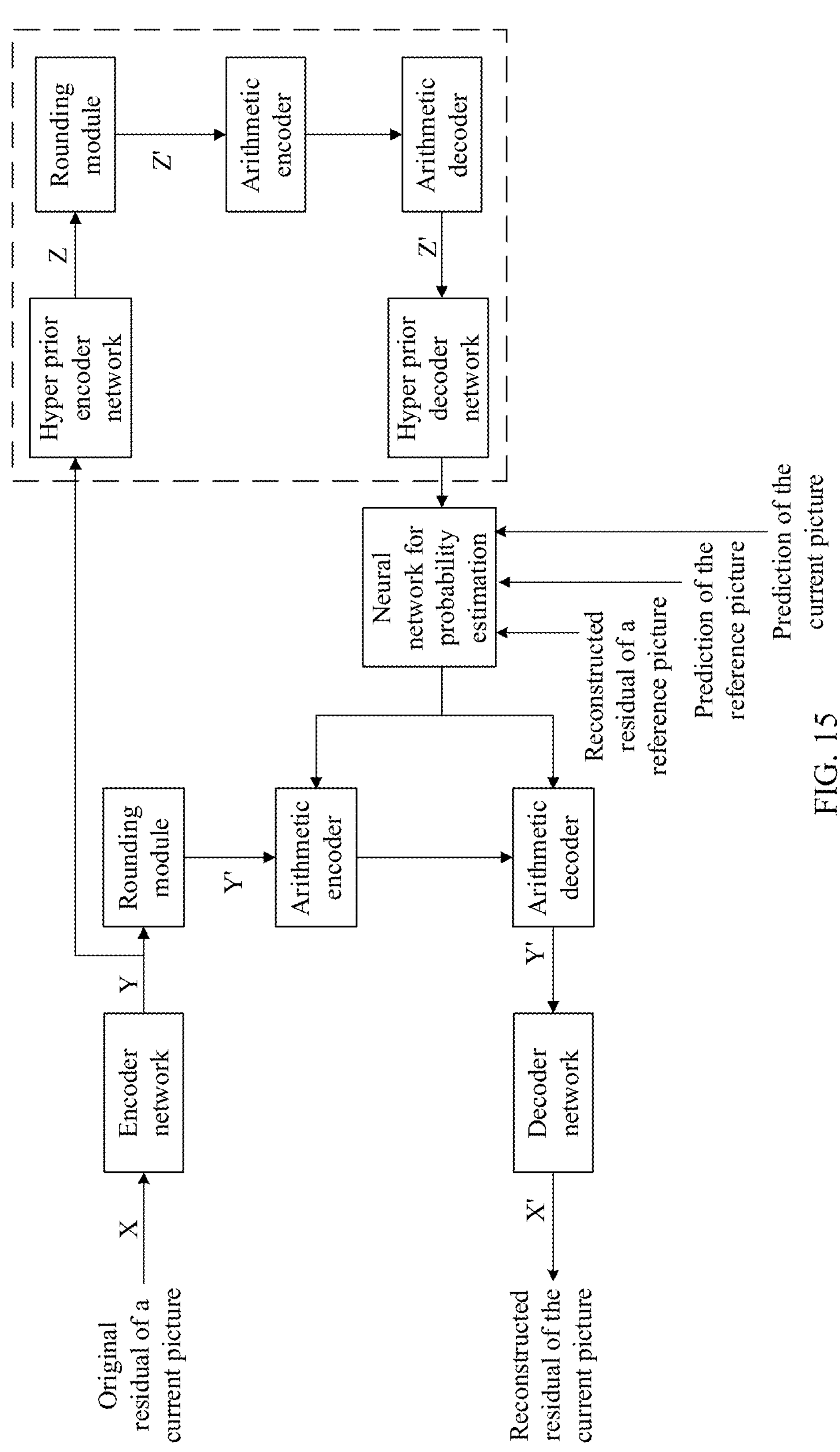
FIG. 15 is a schematic diagram of another encoding and decoding process according to an embodiment of this application.

FIG. 15 is a schematic diagram of another encoding and decoding process according to an embodiment of this application. As shown in FIG. 15, an encoding apparatus obtains an original residual of a current picture. The original residual of the current picture is a plurality of differences between original values of a plurality of samples included in the current picture and predicted values of the plurality of samples. For a specific process of the original residual of the current picture, refer to the foregoing related descriptions. Details are not described herein again. The encoding apparatus performs feature extraction on the original residual of the current picture by using an encoder network, to obtain a feature map Y of the original residual of the current picture. The feature map Y of the original residual of the current picture is processed by a rounding module to obtain a rounded feature map Y'. The encoding apparatus performs, based on probability distribution of residual values of the plurality of samples and included in the residual of the current picture, arithmetic entropy encoding on the rounded feature map Y' by using an arithmetic encoder, to obtain a bitstream of the current picture. Before this, the encoding apparatus inputs a reconstructed residual of a reference picture, a prediction of the reference picture, and a prediction of the current picture to a neural network for probability estimation, to obtain the probability distribution of the residual values of the plurality of samples and included in the residual of the current picture. It should be noted that the residual of the current picture in this embodiment is the original residual of the current picture. The reconstructed residual of the reference picture is a plurality of differences between reconstructed values of a plurality of samples included in the reference picture and predicted values of the plurality of samples.

In one embodiment, the encoding apparatus inputs the reconstructed residual of the reference picture, the prediction of the reference picture, the prediction of the current picture, and hyper prior information to the neural network for probability estimation, to obtain the probability distribution of residual values of the plurality of samples and included in the residual of the current picture. Before this, the encoding apparatus performs, by using a hyper prior encoder network, hyper prior feature extraction on the feature map of the residual, to obtain a feature vector Z of the hyper prior information. The feature vector Z of the hyper prior information is rounded to obtain a rounded feature vector Z' of the hyper prior information. Then, the encoding apparatus processes the rounded feature vector of the hyper prior information by using a hyper prior decoder network, to obtain the hyper prior information of the current picture.

To facilitate a decoding apparatus in using the hyper prior information during decoding, the encoding apparatus uses an arithmetic encoder to encode the rounded feature vector of the hyper prior information, to obtain a bitstream of the hyper prior information.

The decoding apparatus inputs the reconstructed residual of the reference picture, the prediction of the reference picture, and the prediction of the current picture to the neural network for probability estimation for processing, to obtain the probability distribution of the residual values of the plurality of samples and included in the reconstructed residual of the current picture. After the bitstream of the current picture is obtained, the decoding apparatus performs arithmetic entropy decoding on the bitstream of the current picture by using an arithmetic decoder based on the probability distribution of the residual values of the plurality of samples and included in the reconstructed residual of the current picture, to obtain a feature map of the reconstructed residual of the current picture. The feature map of the reconstructed residual of the current picture is processed by using the decoder network, to obtain the reconstructed residual of the current picture.

In one embodiment, the decoding apparatus decodes the bitstream of the hyper prior information by using the arithmetic decoder, to obtain the rounded feature vector of the hyper prior information, processes the rounded feature vector of the hyper prior information by using the hyper prior decoder network, to obtain the hyper prior information, and inputs the hyper prior information, the reconstructed residual of the reference picture, the prediction of the reference picture, and the prediction of the current picture to the neural network for probability estimation for processing, to obtain the probability distribution of the residual values of the plurality of samples and included in the residual of the current picture.

Figure 16:
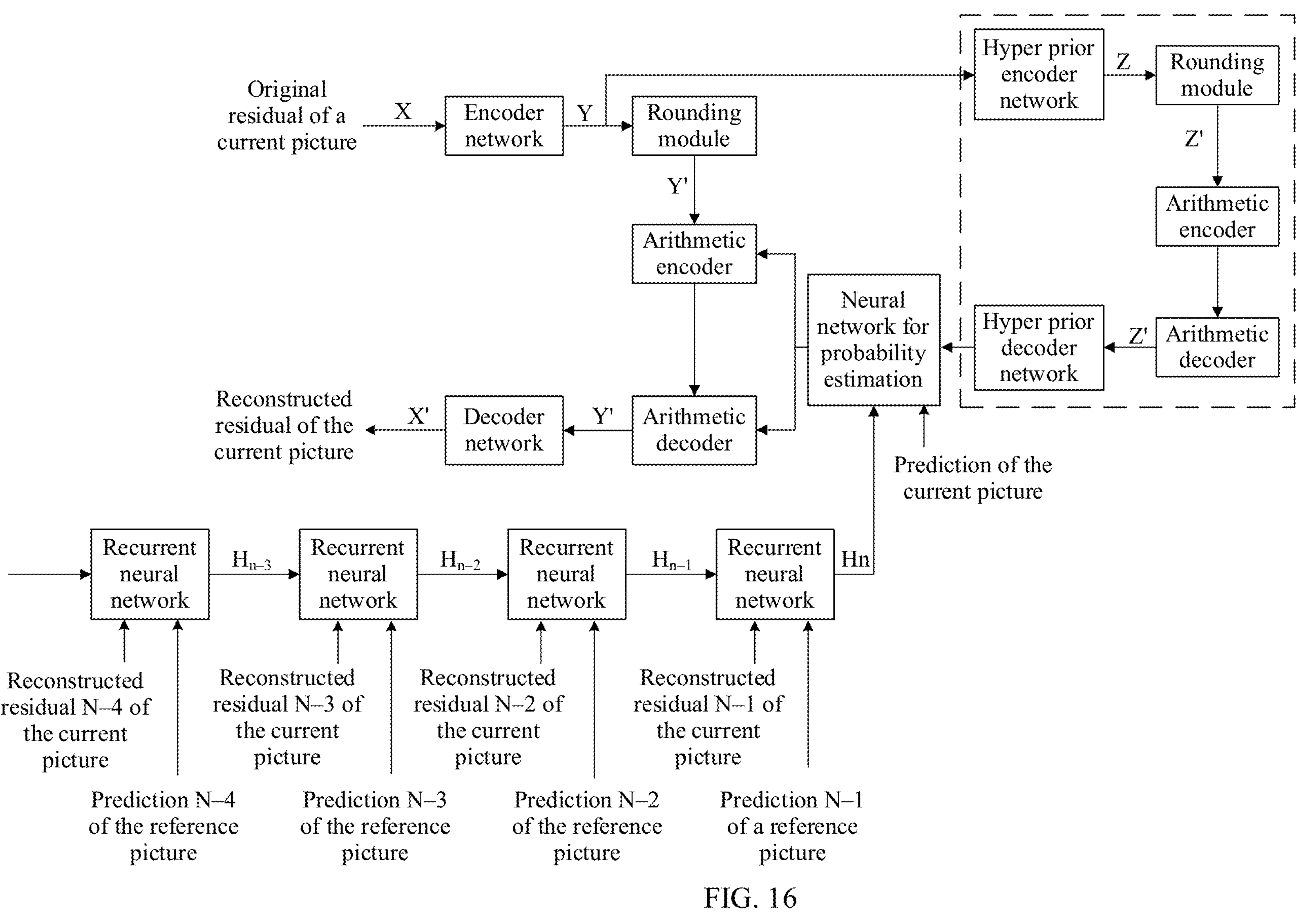
FIG. 16 is a schematic diagram of another encoding and decoding process according to an embodiment of this application.

FIG. 16 is a schematic diagram of another encoding and decoding process according to an embodiment of this application. As shown in FIG. 16, an encoding apparatus obtains an original residual of a current picture. The original residual of the current picture is a plurality of differences between original values of a plurality of samples included in the current picture and predicted values of the plurality of samples. For a specific process of the original residual of the current picture, refer to the foregoing related descriptions. Details are not described herein again. The encoding apparatus performs feature extraction on the original residual of the current picture by using an encoder network, to obtain a feature map Y of the original residual of the current picture. The feature map Y of the original residual of the current picture is processed by a rounding module to obtain a rounded feature map Y'. The encoding apparatus performs, based on probability distribution of residual values of the plurality of samples and included in the residual of the current picture, arithmetic entropy encoding on the rounded feature map Y' by using an arithmetic encoder, to obtain a bitstream of the current picture. Before this, the encoding apparatus obtains latent information Hn based on the reconstructed residuals of the plurality of reference pictures and the predictions of the plurality of reference pictures by using a recurrent neural network. For a specific process, refer to related descriptions in the foregoing embodiment. Details are not described herein again. The encoding apparatus inputs the latent information Hn and the prediction of the current picture to the neural network for probability estimation, to obtain the probability distribution of the residual values of the plurality of samples and included in the residual of the current picture. It should be noted that the residual of the current picture in this embodiment is the original residual of the current picture. The reconstructed residual of the reference picture is a plurality of differences between reconstructed values of a plurality of samples included in the reference picture and predicted values of the plurality of samples.

In one embodiment, the encoding apparatus inputs the latent information Hn, the prediction of the current picture, and hyper prior information to the neural network for probability estimation, to obtain the probability distribution of residual values of the plurality of samples and included in the residual of the current picture. Before this, the encoding apparatus performs, by using a hyper prior encoder network, hyper prior feature extraction on the feature map of the residual of the current picture, to obtain a feature vector Z of the hyper prior information. The feature vector Z of the hyper prior information is rounded to obtain a rounded feature vector Z' of the hyper prior information. Then, the encoding apparatus processes the rounded feature vector of the hyper prior information by using a hyper prior decoder network, to obtain the hyper prior information of the current picture.

To facilitate a decoding apparatus in using the hyper prior information during decoding, the encoding apparatus uses an arithmetic encoder to encode the rounded feature vector of the hyper prior information, to obtain a bitstream of the hyper prior information.

The decoding apparatus obtains the latent information Hn based on the reconstructed residuals of the plurality of reference pictures and the predictions of the plurality of reference pictures by using the recurrent neural network. For a specific process, refer to related descriptions in the foregoing embodiment. Details are not described herein again. The latent information Hn and the prediction of the current picture are input to the neural network for probability estimation for processing, to obtain the probability distribution of the residual values of the plurality of samples and included in the reconstructed residual of the current picture. After the bitstream of the current picture is obtained, the decoding apparatus performs arithmetic entropy decoding on the bitstream of the current picture by using an arithmetic decoder based on the probability distribution of the residual values of the plurality of samples and included in the reconstructed residual of the current picture, to obtain a feature map of the reconstructed residual of the current picture. The feature map of the reconstructed residual of the current picture is processed by using the decoder network, to obtain the reconstructed residual of the current picture.

In one embodiment, the decoding apparatus decodes the bitstream of the hyper prior information by using the arithmetic decoder, to obtain the rounded feature vector of the hyper prior information, processes the rounded feature vector of the hyper prior information by using the hyper prior decoder network, to obtain the hyper prior information, and inputs the hyper prior information, the latent information Hn, and the prediction of the current picture to the neural network for probability estimation for processing, to obtain the probability distribution of the residual values of the plurality of samples and included in the residual of the current picture.

Figures 17, 18:
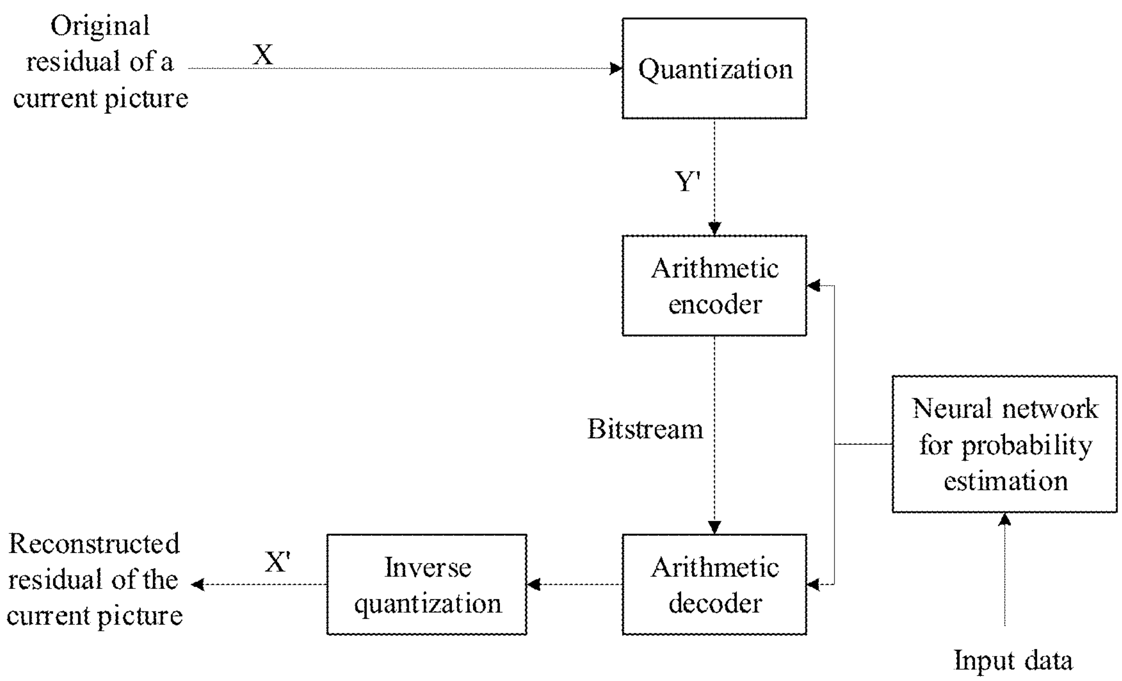
FIG. 17 is a schematic diagram of another encoding and decoding process according to an embodiment of this application.
FIG. 18 is a schematic diagram of another encoding and decoding process according to an embodiment of this application.

FIG. 17 is a schematic diagram of an encoding and decoding process according to an embodiment of this application. As shown in FIG. 17, an encoding apparatus obtains an original residual of a current picture. The original residual of the current picture is a plurality of differences between original values of a plurality of samples included in the current picture and predicted values of the plurality of samples. For a specific process of the original residual of the current picture, refer to the foregoing related descriptions. Details are not described herein again. The encoding apparatus quantizes the original residual of the current picture, to obtain a quantized original residual of the current picture. The encoding apparatus performs, based on probability distribution of residual values of the plurality of samples and included in the residual of the current picture, arithmetic entropy encoding on the quantized residual of the current picture by using an arithmetic encoder, to obtain a bitstream of the current picture. It should be noted that the residual of the current picture in this embodiment is the original residual of the current picture.

Input data of the neural network for probability estimation includes the following cases:

As shown in FIG. 13, the encoding apparatus inputs the reconstructed residual of the reference picture to the neural network for probability estimation, to obtain the probability distribution of the residual values of the plurality of samples and included in the residual of the current picture.

Alternatively, as shown in FIG. 14, the encoding apparatus obtains latent information Hn based on the reconstructed residuals of the plurality of reference pictures by using a recurrent neural network. For a specific process, refer to related descriptions in the foregoing embodiment. Details are not described herein again. The encoding apparatus inputs the latent information Hn to the neural network for probability estimation, to obtain the probability distribution of the residual values of the plurality of samples and included in the residual of the current picture.

Alternatively, as shown in FIG. 15, the encoding apparatus inputs the reconstructed residual of the reference picture, the prediction of the reference picture, and the prediction of the current picture to the neural network for probability estimation, to obtain the probability distribution of the residual values of the plurality of samples and included in the residual of the current picture.

Alternatively, as shown in FIG. 16, the encoding apparatus obtains latent information Hn based on the reconstructed residuals of the plurality of reference pictures and the predictions of the plurality of reference pictures by using a recurrent neural network. For a specific process, refer to related descriptions in the foregoing embodiment. Details are not described herein again. The encoding apparatus inputs the latent information Hn and the prediction of the current picture to the neural network for probability estimation, to obtain the probability distribution of the residual values of the plurality of samples and included in the residual of the current picture.

After obtaining the bitstream of the current picture, the decoding apparatus performs arithmetic entropy decoding on the bitstream of the current picture by using an arithmetic decoder based on the probability distribution of the residual values of the current picture, to obtain a quantized residual of the current picture; and performs inverse quantization on the quantized residual of the current picture, to obtain a reconstructed residual of the current picture. As shown in FIG. 13, the decoding apparatus inputs a reconstructed residual of the reference to the neural network for probability estimation for processing, to obtain the probability distribution of the residual value of the current picture. Alternatively, as shown in FIG. 14, the decoding apparatus obtains latent information Hn based on reconstructed residuals of a plurality of reference pictures by using a recurrent neural network. For a specific process, refer to related descriptions in the foregoing embodiment. Details are not described herein again. The latent information Hn is input to the neural network for probability estimation for processing, to obtain the probability distribution of the residual values of the plurality of samples and included in the residual of the current picture. Alternatively, as shown in FIG. 15, the decoding apparatus inputs the reconstructed residual of the reference picture, the prediction of the reference picture, and the prediction of the current picture to the neural network for probability estimation for processing, to obtain the probability distribution of the residual values of the plurality of samples and included in the residual of the current picture. Alternatively, as shown in FIG. 16, the decoding apparatus obtains latent information Hn based on the reconstructed residuals of the plurality of reference pictures and the predictions of the plurality of reference pictures by using a recurrent neural network. For a specific process, refer to related descriptions in the foregoing embodiment. Details are not described herein again. The latent information Hn and the prediction of the current picture are input to the neural network for probability estimation for processing, to obtain the probability distribution of the residual values of the plurality of samples and included in the residual of the current picture.

FIG. 18 is a schematic diagram of an encoding and decoding process according to an embodiment of this application. As shown in FIG. 18, an encoding apparatus obtains an original residual of a current picture. The original residual of the current picture is a plurality of differences between original values of a plurality of samples included in the current picture and predicted values of the plurality of samples. For a specific process of the original residual of the current picture, refer to the foregoing related descriptions. Details are not described herein again. The encoding apparatus transforms (for example, performs DCT, DST, or DWT) and quantizes the original residual of the current picture, to obtain a transformed and quantized original residual of the current picture. The encoding apparatus performs, based on probability distribution of residual values of the plurality of samples and included in the residual of the current picture, arithmetic entropy encoding on the transformed and quantized original residual of the current picture by using an arithmetic encoder, to obtain a bitstream of the current picture. It should be noted that the residual of the current picture in this embodiment is the original residual of the current picture.

Input data of the neural network for probability estimation includes the following cases:

As shown in FIG. 13, the encoding apparatus inputs the reconstructed residual of the reference picture to the neural network for probability estimation, to obtain the probability distribution of the residual values of the plurality of samples and included in the residual of the current picture.

Alternatively, as shown in FIG. 14, the encoding apparatus obtains latent information Hn based on the reconstructed residuals of the plurality of reference pictures by using a recurrent neural network. For a specific process, refer to related descriptions in the foregoing embodiment. Details are not described herein again. The encoding apparatus inputs the latent information Hn to the neural network for probability estimation, to obtain the probability distribution of the residual values of the plurality of samples and included in the residual of the current picture.

Alternatively, as shown in FIG. 15, the encoding apparatus inputs the reconstructed residual of the reference picture, the prediction of the reference picture, and the prediction of the current picture to the neural network for probability estimation, to obtain the probability distribution of the residual values of the plurality of samples and included in the residual of the current picture.

Alternatively, as shown in FIG. 16, the encoding apparatus obtains latent information Hn based on the reconstructed residuals of the plurality of reference pictures and the predictions of the plurality of reference pictures by using a recurrent neural network. For a specific process, refer to related descriptions in the foregoing embodiment. Details are not described herein again. The encoding apparatus inputs the latent information Hn and the prediction of the current picture to the neural network for probability estimation, to obtain the probability distribution of the residual values of the plurality of samples and included in the residual of the current picture.

After obtaining the bitstream of the current picture, the decoding apparatus performs arithmetic entropy decoding on the bitstream of the current picture by using an arithmetic decoder based on the probability distribution of the residual values of the current picture, to obtain a transformed and quantized residual of the current picture; and performs inverse quantization and inverse transformation on the transformed and quantized residual of the current picture, to obtain a reconstructed residual of the current picture. As shown in FIG. 13, the decoding apparatus inputs a reconstructed residual of the reference to the neural network for probability estimation for processing, to obtain the probability distribution of the residual value of the current picture. Alternatively, as shown in FIG. 14, the decoding apparatus obtains latent information Hn based on reconstructed residuals of a plurality of reference pictures by using a recurrent neural network. For a specific process, refer to related descriptions in the foregoing embodiment. Details are not described herein again. The latent information Hn is input to the neural network for probability estimation for processing, to obtain the probability distribution of the residual values of the plurality of samples and included in the residual of the current picture. Alternatively, as shown in FIG. 15, the decoding apparatus inputs the reconstructed residual of the reference picture, the prediction of the reference picture, and the prediction of the current picture to the neural network for probability estimation for processing, to obtain the probability distribution of the residual values of the plurality of samples and included in the residual of the current picture. Alternatively, as shown in FIG. 16, the decoding apparatus obtains latent information Hn based on the reconstructed residuals of the plurality of reference pictures and the predictions of the plurality of reference pictures by using a recurrent neural network. For a specific process, refer to related descriptions in the foregoing embodiment. Details are not described herein again.

The latent information Hn and the prediction of the current picture are input to the neural network for probability estimation for processing, to obtain the probability distribution of the residual values of the plurality of samples and included in the residual of the current picture.

It should be noted herein that the encoder network and the decoder network may be implemented by using a neural network, for example, a convolutional neural network.

A person skilled in the art can understand that the functions described with reference to various illustrative logical blocks, modules, and algorithm operations disclosed and described in this specification can be implemented by hardware, software, firmware, or any combination thereof. If the functions are implemented by software, the functions described with reference to the illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or a communication medium including any medium that facilitates transfer of a computer program from one place to another (for example, according to a communication protocol). In this manner, the computer-readable medium may generally correspond to: (1) a non-transitory tangible computer-readable storage medium, or (2) a communication medium, for example, a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of an example instead of a limitation, such computer-readable storage media may include a RAM, a ROM, an EEPROM, a CD-ROM, another compact disc storage apparatus, another magnetic disk storage apparatus, another magnetic storage apparatus, a flash memory, or any other medium that can be used to store required program code in a form of instructions or a data structure and that is accessible by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items should also be included in the scope of the computer-readable media.

An instruction may be executed by one or more processors such as one or more digital signal processors (DSP), a general microprocessor, an application-specific integrated circuit (ASIC), a field programmable gate array (FPGA), or other equivalent integrated circuits or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of apparatuses configured to perform the disclosed technologies, but do not necessarily require implementation by different hardware units. Actually, as described above, various units may be combined into a codec hardware unit in combination with appropriate software and/or firmware, or may be provided by interoperable hardware units (including the one or more processors described above).

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video picture decoding method, comprising:

receiving a bitstream of a current picture;

performing a probability estimation on input data by using a neural network obtained through training, to obtain a probability distribution of residual values of a plurality of samples comprised in a residual of the current picture, wherein the input data comprises at least a residual of a reference picture, and wherein the reference picture is a decoded picture obtained before the current picture is decoded;

performing an arithmetic entropy decoding on the bitstream based on the probability distribution of the residual values of the plurality of samples comprised in the residual of the current picture, to obtain first entropy decoding data, wherein the first entropy decoding data represents the residual of the current picture; and obtaining a reconstructed sample value of the current picture based on the residual of the current picture.

2. The method according to claim 1, wherein the neural network is trained via a training process, including:

obtaining the input data for the training, wherein the input data for the training comprises a decoded picture obtained before a sample picture is decoded, and wherein the sample picture is a known decoded picture;

performing, by using the neural network, a probability estimation on the input data for the training, to obtain estimated probability distribution of residual values of a plurality of samples comprised in a residual of the sample picture;

obtaining a loss value based on known probability distribution of the residual values of the plurality of samples comprised in the residual of the sample picture and the estimated probability distribution; and when the loss value converges to a first threshold, or a current quantity of training times of the neural network is greater than or equal to a second threshold, determining that a current neural network is a corresponding neural network obtained after the training of the neural network is completed.

3. The method according to claim 2, wherein the input data for the training comprises:

residual values of a plurality of samples comprised in a residual of a first reference picture;

residual values of a plurality of samples comprised in a residual of the first reference picture and residual values of a plurality of samples comprised in a residual of a second reference picture;

predicted values of a plurality of samples comprised in a prediction of the sample picture, residual values of a plurality of samples comprised in a residual of the first reference picture, and predicted values of a plurality of samples comprised in a prediction of the first reference picture; or predicted values of a plurality of samples comprised in a prediction of the sample picture, residual values of a plurality of samples comprised in a residual of the first reference picture, predicted values of a plurality of samples comprised in a prediction of the first reference picture, predicted values of a plurality of samples comprised in a prediction of a second reference picture, and residual values of a plurality of samples comprised in a residual of the second reference picture, wherein the first reference picture and the second reference picture are decoded pictures obtained before the sample picture is decoded.

4. The method according to claim 1, wherein the probability distribution represents probability distribution of a plurality of differences between reconstructed values of the plurality of samples comprised in the residual of the current picture and predicted values of the plurality of samples;

the probability distribution represents probability distribution of residual values of all samples in a plurality of samples of the current picture; or the probability distribution represents the probability distribution of the residual values of the plurality of samples of the current picture.

5. The method according to claim 1, wherein the first entropy decoding data is the residual of the current picture, or a feature map of the residual of the current picture, or a transformed and quantized residual of the current picture.

6. The method according to claim 5, wherein the first entropy decoding data is the feature map of the residual of the current picture, the method further comprising:

obtaining the residual of the current picture based on the feature map of the residual of the current picture by using a decoder network.

7. The method according to claim 5, wherein the first entropy decoding data is the transformed and quantized residual of the current picture, the method further comprising:

performing inverse transformation and inverse quantization on the transformed and quantized residual of the current picture, to obtain the residual of the current picture.

8. The method according to claim 6, wherein the input data further comprises hyper prior information;

wherein the neural network comprises a convolutional network, an average pooling layer, a first convolutional layer, a concatenate concat layer, and a normalized exponential function Softmax layer, and wherein the convolutional network comprises a plurality of convolutional layers and an activation ReLU layer; and wherein the performing the probability estimation on input data by using a neural network, to obtain probability distribution of a residual of the current picture comprises:

separately extracting, by using the convolutional network, feature information from the residual of the reference picture and the hyper prior information; and performing, by using the concatenate concat layer, the first convolutional layer, the average pooling layer, and the Softmax layer, probability estimation on the feature information extracted by the convolutional network, and outputting the probability distribution of the residual values of the plurality of samples and comprised in the residual of the current picture.

9. The method according to claim 1, wherein the input data further comprises a prediction of the reference picture and a prediction of the current picture;

wherein the neural network comprises a convolutional network, an average pooling layer, and a normalized exponential function Softmax layer, and wherein the convolutional network comprises a plurality of convolutional layers and an activation ReLU layer; and wherein the performing the probability estimation on input data by using a neural network, to obtain probability distribution of residual values of a plurality of samples comprised in a residual of the current picture comprises:

extracting, by using the convolutional network, feature information of the residual of the reference picture, the prediction of the reference picture, and the prediction of the current picture, performing, by using the average pooling layer and the Softmax layer, probability estimation on the feature information extracted by the convolutional network, and outputting the probability distribution of the residual values of the plurality of samples comprised in the residual of the current picture.

10. The method according to claim 1, wherein the input data comprises:

residuals of a plurality of reference pictures, wherein the plurality of reference pictures are a plurality of decoded pictures obtained before the current picture is decoded;

wherein the neural network comprises a convolutional network, an average pooling layer, and a normalized exponential function Softmax layer, and wherein the convolutional network comprises a plurality of convolutional layers and an activation ReLU layer; and wherein the performing the probability estimation on input data by using a neural network, to obtain probability distribution of residual values of a plurality of samples comprised in a residual of the current picture comprises:

extracting, by using the convolutional network, feature information of the residuals of the plurality of reference pictures, performing, by using the average pooling layer and the Softmax layer, probability estimation on the feature information extracted by the convolutional network, and outputting the probability distribution of the residual values of the plurality of samples comprised in the residual of the current picture.

11. The method according to claim 1, wherein the input data comprises:

residuals of a plurality of reference pictures, predictions of the plurality of reference pictures, and a prediction of the current picture, wherein the plurality of reference pictures are a plurality of decoded pictures obtained before the current picture is decoded;

wherein the neural network comprises a convolutional network, an average pooling layer, and a normalized exponential function Softmax layer, and wherein the convolutional network comprises a plurality of convolutional layers and an activation ReLU layer; and wherein the performing the probability estimation on input data by using a neural network, to obtain probability distribution of residual values of a plurality of samples comprised in a residual of the current picture comprises:

extracting, by using the convolutional network, feature information of the residuals of the plurality of reference pictures, the predictions of the plurality of reference pictures, and the prediction of the current picture, performing, by using the average pooling layer and the Softmax layer, probability estimation on the feature information extracted by the convolutional network, and outputting the probability distribution of the residual values of the plurality of samples comprised in the residual of the current picture.

12. A video picture encoding method, comprising:

obtaining a residual of a current picture having a plurality of samples, wherein the residual is differences between original values of the samples and predicted values of the samples;

performing a probability estimation on input data by using a neural network obtained through training, to obtain probability distribution of residual values of the plurality of samples comprised in the residual of the current picture, wherein the input data comprises at least a residual of a reference picture, and wherein the reference picture is an encoded picture obtained before the current picture is encoded; and performing an arithmetic entropy encoding on first entropy encoding data based on the probability distribution of the residual values of the plurality of samples comprised in the residual of the current picture, to obtain a bitstream of the current picture, wherein the first entropy encoding data represents the residual of the current picture.

13. The method according to claim 12, wherein the neural network is trained via a training process, including:

obtaining the input data for the training, wherein the input data for the training comprises an encoded picture obtained before a sample picture is encoded, and the sample picture is a known encoded picture;

performing, by using the neural network, probability estimation on the input data for the training, to obtain estimated probability distribution of residual values of a plurality of samples comprised in a residual of the sample picture;

obtaining a loss value based on known probability distribution of the residual values of the plurality of samples comprised in the residual of the sample picture and the estimated probability distribution; and when the loss value converges to a first threshold, or a current quantity of training times of the neural network is greater than or equal to a second threshold, determining that a current neural network is a corresponding neural network obtained after the training of the neural network is completed.

14. The method according to claim 13, wherein the input data for the training comprises:

residual values of a plurality of samples comprised in a residual of a first reference picture;

residual values of a plurality of samples comprised in a residual of the first reference picture and residual values of a plurality of samples comprised in a residual of a second reference picture;

predicted values of a plurality of samples comprised in a prediction of the sample picture, residual values of a plurality of samples comprised in a residual of the first reference picture, and predicted values of a plurality of samples comprised in a prediction of the first reference picture; or predicted values of a plurality of samples comprised in a prediction of the sample picture, residual values of a plurality of samples comprised in a residual of the first reference picture, predicted values of a plurality of samples comprised in a prediction of the first reference picture, predicted values of a plurality of samples comprised in a prediction of a second reference picture, and residual values of a plurality of samples comprised in a residual of the second reference picture, wherein the first reference picture and the second reference picture are encoded pictures obtained before the sample picture is encoded.

15. The method according to claim 12, wherein the probability distribution represents probability distribution of a plurality of differences between original values of the plurality of samples comprised in the residual of the current picture and predicted values of the plurality of samples;

the probability distribution represents probability distribution of residual values of all sample points in a plurality of samples of the current picture; or the probability distribution represents the probability distribution corresponding to the residual values of the plurality of samples of the current picture.

16. The method according to claim 12, wherein the first entropy encoding data comprises the residual of the current picture, or a feature map of the residual of the current picture, or a transformed and quantized residual of the current picture.

17. The method according to claim 16, wherein the first entropy encoding data is the feature map of the residual of the current picture, the method further comprising:

obtaining the feature map of the residual of the current picture from the residual of the current picture by using an encoder network.

18. The method according to claim 16, wherein the first entropy encoding data is the transformed and quantized residual of the current picture, the method further comprising:

transforming and quantizing the residual of the current picture to obtain a transformed and quantized residual of the current picture.

19. The method according to claim 17, wherein the input data further comprises hyper prior information;

wherein the neural network comprises a convolutional network, an average pooling layer, a first convolutional layer, a concatenate concat layer, and a normalized exponential function Softmax layer, and wherein the convolutional network comprises a plurality of convolutional layers and an activation ReLU layer; and wherein the performing the probability estimation on input data by using a neural network, to obtain probability distribution of residual values of a plurality of samples comprised in a residual of the current picture comprises:

extracting, by using the convolutional network, feature information from the residual of the reference picture and the hyper prior information; and performing, by using the average pooling layer, the first convolutional layer, the concat layer, and the Softmax layer, probability estimation on the feature information extracted by the convolutional network, and outputting the probability distribution of the residual values of the plurality of samples and comprised in the residual of the current picture.

20. The method according to claim 19, further comprising:

inputting the feature map of the residual of the current picture into a hyper prior encoder network, to obtain a feature vector of the hyper prior information;

rounding the feature vector of the hyper prior information to obtain a rounded feature vector of the hyper prior information; and inputting the rounded feature vector of the hyper prior information into a hyper prior decoder network, to obtain the hyper prior information.

21. The method according to claim 12, wherein the input data further comprises a prediction of the reference picture and a prediction of the current picture;

wherein the neural network comprises a convolutional network, an average pooling layer, and a normalized exponential function Softmax layer, and wherein the convolutional network comprises a plurality of convolutional layers and an activation ReLU layer; and wherein the performing the probability estimation on input data by using a neural network, to obtain probability distribution of residual values of a plurality of samples comprised in a residual of the current picture comprises:

extracting, by using the convolutional network, feature information of the residual of the reference picture, the prediction of the reference picture, and the prediction of the current picture, performing, by using the average pooling layer and the Softmax layer, probability estimation on the feature information extracted by the convolutional network, and outputting the probability distribution of the residual values of the plurality of samples of the current picture.

22. The method according to claim 12, wherein the input data comprises residuals of a plurality of reference pictures, prediction signals of the plurality of reference pictures, and a prediction signal of the current picture, wherein the plurality of reference pictures are a plurality of encoded pictures obtained before the current picture is encoded;

wherein the neural network comprises a convolutional network, an average pooling layer, and a normalized exponential function Softmax layer, and wherein the convolutional network comprises a plurality of convolutional layers and an activation ReLU layer; and wherein the performing the probability estimation on input data by using a neural network, to obtain probability distribution of residual values of a plurality of samples and comprised in a residual of the current picture comprises:

extracting, by using the convolutional network, feature information of the residuals of the plurality of reference pictures, the predictions of the plurality of reference pictures, and the prediction of the current picture, performing, by using the average pooling layer and the Softmax layer, probability estimation on the feature information extracted by the convolutional network, and outputting the probability distribution of the residual values of the plurality of samples comprised in the residual of the current picture.

23. The method according to claim 12, wherein the input data comprises residuals of a plurality of reference pictures, wherein the plurality of reference pictures are a plurality of encoded pictures obtained before the current picture is encoded;

wherein the neural network comprises a convolutional network, an average pooling layer, and a normalized exponential function Softmax layer, and wherein the convolutional network comprises a plurality of convolutional layers and an activation ReLU layer; and wherein the performing the probability estimation on input data by using a neural network, to obtain probability distribution of residual values of a plurality of samples comprised in a residual of the current picture comprises:

extracting, by using the convolutional network, feature information of the residuals of the plurality of reference pictures, performing, by using the average pooling layer and the Softmax layer, probability estimation on the feature information extracted by the convolutional network, and outputting the probability distribution of the residual values of the plurality of samples comprised in the residual of the current picture.

24. A decoder, comprising:

a processing circuit; and a memory coupled to the processing circuit to store instructions, which when executed by the processing circuit, cause the processing circuit to receive a bitstream of a current picture;

perform a probability estimation on input data by using a neural network obtained through training, to obtain a probability distribution of residual values of a plurality of samples comprised in a residual of the current picture, wherein the input data comprises at least a residual of a reference picture, and wherein the reference picture is a decoded picture obtained before the current picture is decoded;

perform an arithmetic entropy decoding on the bitstream based on the probability distribution of the residual values of the plurality of samples comprised in the residual of the current picture, to obtain first entropy decoding data, wherein the first entropy decoding data represents the residual of the current picture; and obtain a reconstructed sample value of the current picture based on the residual of the current picture.

25. An encoder, comprising:

a processing circuit; and a memory coupled to the processing circuit to store instructions, which when executed by the processing circuit, cause the processing circuit to perform the method according to claim 12.

26. A decoder, comprising:

one or more processors; and a non-transitory computer-readable storage medium, coupled to the processor and storing a program for execution by the processor, wherein when executed by the processor, the program enables the decoder to perform the method according to claim 1.

27. An encoder, comprising:

one or more processors; and a non-transitory computer-readable storage medium, coupled to the processor and storing a program for execution by the processor, wherein when executed by the processor, the program enables the decoder to perform the method according to claim 12.

* * * * *